US012467061B2

United States Patent
Cahill et al.

(10) Patent No.: US 12,467,061 B2
(45) Date of Patent: Nov. 11, 2025

(54) PLANT PATHOGEN EFFECTOR AND DISEASE RESISTANCE GENE IDENTIFICATION, COMPOSITIONS, AND METHODS OF USE

(71) Applicant: PIONEER HI-BRED INTERNATIONAL, INC., Johnston, IA (US)

(72) Inventors: James Cahill, Des Moines, IA (US); April L Leonard, Des Moines, IA (US); Bailin Li, Johnston, IA (US); Yurong Li, Johnston, IA (US); Shawn Thatcher, Urbandale, IA (US)

(73) Assignee: PIONEER HI-BRED INTERNATIONAL, INC., Johnston, IA (US)

( * ) Notice: Subject to any disclaimer, the term of this patent is extended or adjusted under 35 U.S.C. 154(b) by 177 days.

(21) Appl. No.: 17/995,707

(22) PCT Filed: Mar. 9, 2021

(86) PCT No.: PCT/US2021/021505
§ 371 (c)(1),
(2) Date: Oct. 7, 2022

(87) PCT Pub. No.: WO2021/211227
PCT Pub. Date: Oct. 21, 2021

(65) Prior Publication Data
US 2023/0151382 A1 May 18, 2023

Related U.S. Application Data

(60) Provisional application No. 63/010,452, filed on Apr. 15, 2020, provisional application No. 63/010,462, filed on Apr. 15, 2020.

(51) Int. Cl.
*C12N 15/82* (2006.01)
*C07K 14/375* (2006.01)

(52) U.S. Cl.
CPC ........ *C12N 15/8282* (2013.01); *C07K 14/375* (2013.01)

(58) Field of Classification Search
None
See application file for complete search history.

(56) References Cited

FOREIGN PATENT DOCUMENTS

| WO | 2018/101824 A1 | 6/2018 |
| WO | 2019/236257 A1 | 12/2019 |

OTHER PUBLICATIONS

Saur et al., A cell death assay in barley and wheat protoplasts for identification and validation of matching pathogen AVR effector and plant NLR immune receptors, 2019, Plant Methods, vol. 15(118), pp. 1-17 (Year: 2019).*
Condon et al., Comparative Genome Structure, Secondary Metabolite, and Effector Coding Capacity across Cochliobolus Pathogens, 2013, PLOS Genetics, vol. 9(1), pp. 1-29 (Year: 2013).*
Saur et al., A cell death assay in barley and wheat protoplasts for identifcation and validation of matching pathogen AVR effector and plant NLR immune receptors, 2019, Plant Methods, vol. 15(1), pp. 1-17. (Year: 2019).*
Sun et al., Southern corn rust caused by Puccinia polysora Underw: a review, 2021, Phytopathology Research, vol. 3(25), pp. 1-11 (Year: 2021).*
Dodds et al.,Plant immunity: towards an integrated view of plant-pathogen interactions, 2010, Genetics, vol. 11, pp. 539-548 (Year: 2010).*
International Preliminary Report on Patentability for International Application No. PCT/US2021/021505, mailed Oct. 27, 2022, 13 Pages.
Mclouglin, Austein G .; et al.: "Identification and application of exogenous dsRNA confers plant protection against Sclerotinia sclerotiorum and Botrytis cinerea," Scientific Reports, May 9, 2018 (May 9, 2018), vol. 8, No. 1.
Crouch, Jo Anne; et al.: "Real-Time PCR Detection and Discrimination of the Southern and Common Com Rust Pathogens Puccinia polysora and Puccinia sorghi," Plant Disease, Jun. 1, 2011 (Jun. 1, 2011), vol. 95, No. 6.
Database UniProt EBI Accession No. A0A5B0MQM1, Nov. 13, 2019 (Nov. 13, 2019). XP002803296.
Saur, Isabel M.; et al.: "A cell death assay in barley and wheat protoplasts for identification and validation of matching pathogen AVR effector and plant NLR immune receptors," Plant Methods, Dec. 1, 2019 (Dec. 1, 2019), vol. 15, No. 1, p. 118.
Zhao, Shuqing; et al.: "Genome-Wide Identification of Effector Candidates With Conserved Motifs From the Wheat Leaf Rust Fungus Puccinia triticina," Frontiers in Microbiology, Jan. 3, 2020 (Jan. 3, 2020), vol. 11.
International Search Report and Written Opinion for International Application No. PCT/US2021/021505, mailed Aug. 25, 2021.

* cited by examiner

*Primary Examiner* — Bratislav Stankovic
*Assistant Examiner* — Christina L Meadows

(57) ABSTRACT

The compositions and methods are related to plant breeding and methods of identifying and selecting disease resistance genes and plant pathogen effector genes. Provided are methods to identify novel genes that encode plant pathogen effector proteins and proteins providing plant resistance to various diseases and uses thereof. These disease resistant genes are useful in the production of resistant plants through breeding, transgenic modification, or genome editing.

2 Claims, 22 Drawing Sheets

Specification includes a Sequence Listing.

FIG. 3

| SEQ ID NO: | Effector Sequence Name | SEQ ID NO: | Effector Sequence Name |
|---|---|---|---|
| 1 | SOURST_E_1_Full_CDS | 401 | SOURST_E_101_Full_CDS |
| 2 | SOURST_E_1_Full_Protein | 402 | SOURST_E_101_Full_Protein |
| 3 | SOURST_E_1_Trimmed_CDS | 403 | SOURST_E_101_Trimmed_CDS |
| 4 | SOURST_E_1_Trimmed_Protein | 404 | SOURST_E_101_Trimmed_Protein |
| 5 | SOURST_E_2_Full_CDS | 405 | SOURST_E_102_Full_CDS |
| 6 | SOURST_E_2_Full_Protein | 406 | SOURST_E_102_Full_Protein |
| 7 | SOURST_E_2_Trimmed_CDS | 407 | SOURST_E_102_Trimmed_CDS |
| 8 | SOURST_E_2_Trimmed_Protein | 408 | SOURST_E_102_Trimmed_Protein |
| 9 | SOURST_E_3_Full_CDS | 409 | SOURST_E_103_Full_CDS |
| 10 | SOURST_E_3_Full_Protein | 410 | SOURST_E_103_Full_Protein |
| 11 | SOURST_E_3_Trimmed_CDS | 411 | SOURST_E_103_Trimmed_CDS |
| 12 | SOURST_E_3_Trimmed_Protein | 412 | SOURST_E_103_Trimmed_Protein |
| 13 | SOURST_E_4_Full_CDS | 413 | SOURST_E_104_Full_CDS |
| 14 | SOURST_E_4_Full_Protein | 414 | SOURST_E_104_Full_Protein |
| 15 | SOURST_E_4_Trimmed_CDS | 415 | SOURST_E_104_Trimmed_CDS |
| 16 | SOURST_E_4_Trimmed_Protein | 416 | SOURST_E_104_Trimmed_Protein |
| 17 | SOURST_E_5_Full_CDS | 417 | SOURST_E_105_Full_CDS |
| 18 | SOURST_E_5_Full_Protein | 418 | SOURST_E_105_Full_Protein |
| 19 | SOURST_E_5_Trimmed_CDS | 419 | SOURST_E_105_Trimmed_CDS |
| 20 | SOURST_E_5_Trimmed_Protein | 420 | SOURST_E_105_Trimmed_Protein |
| 21 | SOURST_E_6_Full_CDS | 421 | SOURST_E_106_Full_CDS |
| 22 | SOURST_E_6_Full_Protein | 422 | SOURST_E_106_Full_Protein |
| 23 | SOURST_E_6_Trimmed_CDS | 423 | SOURST_E_106_Trimmed_CDS |
| 24 | SOURST_E_6_Trimmed_Protein | 424 | SOURST_E_106_Trimmed_Protein |
| 25 | SOURST_E_7_Full_CDS | 425 | SOURST_E_107_Full_CDS |
| 26 | SOURST_E_7_Full_Protein | 426 | SOURST_E_107_Full_Protein |
| 27 | SOURST_E_7_Trimmed_CDS | 427 | SOURST_E_107_Trimmed_CDS |
| 28 | SOURST_E_7_Trimmed_Protein | 428 | SOURST_E_107_Trimmed_Protein |
| 29 | SOURST_E_8_Full_CDS | 429 | SOURST_E_108_Full_CDS |
| 30 | SOURST_E_8_Full_Protein | 430 | SOURST_E_108_Full_Protein |
| 31 | SOURST_E_8_Trimmed_CDS | 431 | SOURST_E_108_Trimmed_CDS |
| 32 | SOURST_E_8_Trimmed_Protein | 432 | SOURST_E_108_Trimmed_Protein |
| 33 | SOURST_E_9_Full_CDS | 433 | SOURST_E_109_Full_CDS |
| 34 | SOURST_E_9_Full_Protein | 434 | SOURST_E_109_Full_Protein |
| 35 | SOURST_E_9_Trimmed_CDS | 435 | SOURST_E_109_Trimmed_CDS |
| 36 | SOURST_E_9_Trimmed_Protein | 436 | SOURST_E_109_Trimmed_Protein |
| 37 | SOURST_E_10_Full_CDS | 437 | SOURST_E_110_Full_CDS |
| 38 | SOURST_E_10_Full_Protein | 438 | SOURST_E_110_Full_Protein |
| 39 | SOURST_E_10_Trimmed_CDS | 439 | SOURST_E_110_Trimmed_CDS |
| 40 | SOURST_E_10_Trimmed_Protein | 440 | SOURST_E_110_Trimmed_Protein |
| 41 | SOURST_E_11_Full_CDS | 441 | SOURST_E_111_Full_CDS |

FIG. 3 (Cont.)

| 42 | SOURST_E_11_Full_Protein | 442 | SOURST_E_111_Full_Protein |
|---|---|---|---|
| 43 | SOURST_E_11_Trimmed_CDS | 443 | SOURST_E_111_Trimmed_CDS |
| 44 | SOURST_E_11_Trimmed_Protein | 444 | SOURST_E_111_Trimmed_Protein |
| 45 | SOURST_E_12_Full_CDS | 445 | SOURST_E_112_Full_CDS |
| 46 | SOURST_E_12_Full_Protein | 446 | SOURST_E_112_Full_Protein |
| 47 | SOURST_E_12_Trimmed_CDS | 447 | SOURST_E_112_Trimmed_CDS |
| 48 | SOURST_E_12_Trimmed_Protein | 448 | SOURST_E_112_Trimmed_Protein |
| 49 | SOURST_E_13_Full_CDS | 449 | SOURST_E_113_Full_CDS |
| 50 | SOURST_E_13_Full_Protein | 450 | SOURST_E_113_Full_Protein |
| 51 | SOURST_E_13_Trimmed_CDS | 451 | SOURST_E_113_Trimmed_CDS |
| 52 | SOURST_E_13_Trimmed_Protein | 452 | SOURST_E_113_Trimmed_Protein |
| 53 | SOURST_E_14_Full_CDS | 453 | SOURST_E_114_Full_CDS |
| 54 | SOURST_E_14_Full_Protein | 454 | SOURST_E_114_Full_Protein |
| 55 | SOURST_E_14_Trimmed_CDS | 455 | SOURST_E_114_Trimmed_CDS |
| 56 | SOURST_E_14_Trimmed_Protein | 456 | SOURST_E_114_Trimmed_Protein |
| 57 | SOURST_E_15_Full_CDS | 457 | SOURST_E_115_Full_CDS |
| 58 | SOURST_E_15_Full_Protein | 458 | SOURST_E_115_Full_Protein |
| 59 | SOURST_E_15_Trimmed_CDS | 459 | SOURST_E_115_Trimmed_CDS |
| 60 | SOURST_E_15_Trimmed_Protein | 460 | SOURST_E_115_Trimmed_Protein |
| 61 | SOURST_E_16_Full_CDS | 461 | SOURST_E_116_Full_CDS |
| 62 | SOURST_E_16_Full_Protein | 462 | SOURST_E_116_Full_Protein |
| 63 | SOURST_E_16_Trimmed_CDS | 463 | SOURST_E_116_Trimmed_CDS |
| 64 | SOURST_E_16_Trimmed_Protein | 464 | SOURST_E_116_Trimmed_Protein |
| 65 | SOURST_E_17_Full_CDS | 465 | SOURST_E_117_Full_CDS |
| 66 | SOURST_E_17_Full_Protein | 466 | SOURST_E_117_Full_Protein |
| 67 | SOURST_E_17_Trimmed_CDS | 467 | SOURST_E_117_Trimmed_CDS |
| 68 | SOURST_E_17_Trimmed_Protein | 468 | SOURST_E_117_Trimmed_Protein |
| 69 | SOURST_E_18_Full_CDS | 469 | SOURST_E_118_Full_CDS |
| 70 | SOURST_E_18_Full_Protein | 470 | SOURST_E_118_Full_Protein |
| 71 | SOURST_E_18_Trimmed_CDS | 471 | SOURST_E_118_Trimmed_CDS |
| 72 | SOURST_E_18_Trimmed_Protein | 472 | SOURST_E_118_Trimmed_Protein |
| 73 | SOURST_E_19_Full_CDS | 473 | SOURST_E_119_Full_CDS |
| 74 | SOURST_E_19_Full_Protein | 474 | SOURST_E_119_Full_Protein |
| 75 | SOURST_E_19_Trimmed_CDS | 475 | SOURST_E_119_Trimmed_CDS |
| 76 | SOURST_E_19_Trimmed_Protein | 476 | SOURST_E_119_Trimmed_Protein |
| 77 | SOURST_E_20_Full_CDS | 477 | SOURST_E_120_Full_CDS |
| 78 | SOURST_E_20_Full_Protein | 478 | SOURST_E_120_Full_Protein |
| 79 | SOURST_E_20_Trimmed_CDS | 479 | SOURST_E_120_Trimmed_CDS |
| 80 | SOURST_E_20_Trimmed_Protein | 480 | SOURST_E_120_Trimmed_Protein |
| 81 | SOURST_E_21_Full_CDS | 481 | SOURST_E_121_Full_CDS |
| 82 | SOURST_E_21_Full_Protein | 482 | SOURST_E_121_Full_Protein |

FIG. 3 (Cont.)

| 83 | SOURST_E_21_Trimmed_CDS | 483 | SOURST_E_121_Trimmed_CDS |
|---|---|---|---|
| 84 | SOURST_E_21_Trimmed_Protein | 484 | SOURST_E_121_Trimmed_Protein |
| 85 | SOURST_E_22_Full_CDS | 485 | SOURST_E_122_Full_CDS |
| 86 | SOURST_E_22_Full_Protein | 486 | SOURST_E_122_Full_Protein |
| 87 | SOURST_E_22_Trimmed_CDS | 487 | SOURST_E_122_Trimmed_CDS |
| 88 | SOURST_E_22_Trimmed_Protein | 488 | SOURST_E_122_Trimmed_Protein |
| 89 | SOURST_E_23_Full_CDS | 489 | SOURST_E_123_Full_CDS |
| 90 | SOURST_E_23_Full_Protein | 490 | SOURST_E_123_Full_Protein |
| 91 | SOURST_E_23_Trimmed_CDS | 491 | SOURST_E_123_Trimmed_CDS |
| 92 | SOURST_E_23_Trimmed_Protein | 492 | SOURST_E_123_Trimmed_Protein |
| 93 | SOURST_E_24_Full_CDS | 493 | SOURST_E_124_Full_CDS |
| 94 | SOURST_E_24_Full_Protein | 494 | SOURST_E_124_Full_Protein |
| 95 | SOURST_E_24_Trimmed_CDS | 495 | SOURST_E_124_Trimmed_CDS |
| 96 | SOURST_E_24_Trimmed_Protein | 496 | SOURST_E_124_Trimmed_Protein |
| 97 | SOURST_E_25_Full_CDS | 497 | SOURST_E_125_Full_CDS |
| 98 | SOURST_E_25_Full_Protein | 498 | SOURST_E_125_Full_Protein |
| 99 | SOURST_E_25_Trimmed_CDS | 499 | SOURST_E_125_Trimmed_CDS |
| 100 | SOURST_E_25_Trimmed_Protein | 500 | SOURST_E_125_Trimmed_Protein |
| 101 | SOURST_E_26_Full_CDS | 501 | SOURST_E_126_Full_CDS |
| 102 | SOURST_E_26_Full_Protein | 502 | SOURST_E_126_Full_Protein |
| 103 | SOURST_E_26_Trimmed_CDS | 503 | SOURST_E_126_Trimmed_CDS |
| 104 | SOURST_E_26_Trimmed_Protein | 504 | SOURST_E_126_Trimmed_Protein |
| 105 | SOURST_E_27_Full_CDS | 505 | SOURST_E_127_Full_CDS |
| 106 | SOURST_E_27_Full_Protein | 506 | SOURST_E_127_Full_Protein |
| 107 | SOURST_E_27_Trimmed_CDS | 507 | SOURST_E_127_Trimmed_CDS |
| 108 | SOURST_E_27_Trimmed_Protein | 508 | SOURST_E_127_Trimmed_Protein |
| 109 | SOURST_E_28_Full_CDS | 509 | SOURST_E_128_Full_CDS |
| 110 | SOURST_E_28_Full_Protein | 510 | SOURST_E_128_Full_Protein |
| 111 | SOURST_E_28_Trimmed_CDS | 511 | SOURST_E_128_Trimmed_CDS |
| 112 | SOURST_E_28_Trimmed_Protein | 512 | SOURST_E_128_Trimmed_Protein |
| 113 | SOURST_E_29_Full_CDS | 513 | SOURST_E_129_Full_CDS |
| 114 | SOURST_E_29_Full_Protein | 514 | SOURST_E_129_Full_Protein |
| 115 | SOURST_E_29_Trimmed_CDS | 515 | SOURST_E_129_Trimmed_CDS |
| 116 | SOURST_E_29_Trimmed_Protein | 516 | SOURST_E_129_Trimmed_Protein |
| 117 | SOURST_E_30_Full_CDS | 517 | SOURST_E_130_Full_CDS |
| 118 | SOURST_E_30_Full_Protein | 518 | SOURST_E_130_Full_Protein |
| 119 | SOURST_E_30_Trimmed_CDS | 519 | SOURST_E_130_Trimmed_CDS |
| 120 | SOURST_E_30_Trimmed_Protein | 520 | SOURST_E_130_Trimmed_Protein |
| 121 | SOURST_E_31_Full_CDS | 521 | SOURST_E_131_Full_CDS |
| 122 | SOURST_E_31_Full_Protein | 522 | SOURST_E_131_Full_Protein |
| 123 | SOURST_E_31_Trimmed_CDS | 523 | SOURST_E_131_Trimmed_CDS |

FIG. 3 (Cont.)

| 124 | SOURST_E_31_Trimmed_Protein | 524 | SOURST_E_131_Trimmed_Protein |
|---|---|---|---|
| 125 | SOURST_E_32_Full_CDS | 525 | SOURST_E_132_Full_CDS |
| 126 | SOURST_E_32_Full_Protein | 526 | SOURST_E_132_Full_Protein |
| 127 | SOURST_E_32_Trimmed_CDS | 527 | SOURST_E_132_Trimmed_CDS |
| 128 | SOURST_E_32_Trimmed_Protein | 528 | SOURST_E_132_Trimmed_Protein |
| 129 | SOURST_E_33_Full_CDS | 529 | SOURST_E_133_Full_CDS |
| 130 | SOURST_E_33_Full_Protein | 530 | SOURST_E_133_Full_Protein |
| 131 | SOURST_E_33_Trimmed_CDS | 531 | SOURST_E_133_Trimmed_CDS |
| 132 | SOURST_E_33_Trimmed_Protein | 532 | SOURST_E_133_Trimmed_Protein |
| 133 | SOURST_E_34_Full_CDS | 533 | SOURST_E_134_Full_CDS |
| 134 | SOURST_E_34_Full_Protein | 534 | SOURST_E_134_Full_Protein |
| 135 | SOURST_E_34_Trimmed_CDS | 535 | SOURST_E_134_Trimmed_CDS |
| 136 | SOURST_E_34_Trimmed_Protein | 536 | SOURST_E_134_Trimmed_Protein |
| 137 | SOURST_E_35_Full_CDS | 537 | SOURST_E_135_Full_CDS |
| 138 | SOURST_E_35_Full_Protein | 538 | SOURST_E_135_Full_Protein |
| 139 | SOURST_E_35_Trimmed_CDS | 539 | SOURST_E_135_Trimmed_CDS |
| 140 | SOURST_E_35_Trimmed_Protein | 540 | SOURST_E_135_Trimmed_Protein |
| 141 | SOURST_E_36_Full_CDS | 541 | SOURST_E_136_Full_CDS |
| 142 | SOURST_E_36_Full_Protein | 542 | SOURST_E_136_Full_Protein |
| 143 | SOURST_E_36_Trimmed_CDS | 543 | SOURST_E_136_Trimmed_CDS |
| 144 | SOURST_E_36_Trimmed_Protein | 544 | SOURST_E_136_Trimmed_Protein |
| 145 | SOURST_E_37_Full_CDS | 545 | SOURST_E_137_Full_CDS |
| 146 | SOURST_E_37_Full_Protein | 546 | SOURST_E_137_Full_Protein |
| 147 | SOURST_E_37_Trimmed_CDS | 547 | SOURST_E_137_Trimmed_CDS |
| 148 | SOURST_E_37_Trimmed_Protein | 548 | SOURST_E_137_Trimmed_Protein |
| 149 | SOURST_E_38_Full_CDS | 549 | SOURST_E_138_Full_CDS |
| 150 | SOURST_E_38_Full_Protein | 550 | SOURST_E_138_Full_Protein |
| 151 | SOURST_E_38_Trimmed_CDS | 551 | SOURST_E_138_Trimmed_CDS |
| 152 | SOURST_E_38_Trimmed_Protein | 552 | SOURST_E_138_Trimmed_Protein |
| 153 | SOURST_E_39_Full_CDS | 553 | SOURST_E_139_Full_CDS |
| 154 | SOURST_E_39_Full_Protein | 554 | SOURST_E_139_Full_Protein |
| 155 | SOURST_E_39_Trimmed_CDS | 555 | SOURST_E_139_Trimmed_CDS |
| 156 | SOURST_E_39_Trimmed_Protein | 556 | SOURST_E_139_Trimmed_Protein |
| 157 | SOURST_E_40_Full_CDS | 557 | SOURST_E_140_Full_CDS |
| 158 | SOURST_E_40_Full_Protein | 558 | SOURST_E_140_Full_Protein |
| 159 | SOURST_E_40_Trimmed_CDS | 559 | SOURST_E_140_Trimmed_CDS |
| 160 | SOURST_E_40_Trimmed_Protein | 560 | SOURST_E_140_Trimmed_Protein |
| 161 | SOURST_E_41_Full_CDS | 561 | SOURST_E_141_Full_CDS |
| 162 | SOURST_E_41_Full_Protein | 562 | SOURST_E_141_Full_Protein |
| 163 | SOURST_E_41_Trimmed_CDS | 563 | SOURST_E_141_Trimmed_CDS |
| 164 | SOURST_E_41_Trimmed_Protein | 564 | SOURST_E_141_Trimmed_Protein |

FIG. 3 (Cont.)

| 165 | SOURST_E_42_Full_CDS | 565 | SOURST_E_142_Full_CDS |
|---|---|---|---|
| 166 | SOURST_E_42_Full_Protein | 566 | SOURST_E_142_Full_Protein |
| 167 | SOURST_E_42_Trimmed_CDS | 567 | SOURST_E_142_Trimmed_CDS |
| 168 | SOURST_E_42_Trimmed_Protein | 568 | SOURST_E_142_Trimmed_Protein |
| 169 | SOURST_E_43_Full_CDS | 569 | SOURST_E_143_Full_CDS |
| 170 | SOURST_E_43_Full_Protein | 570 | SOURST_E_143_Full_Protein |
| 171 | SOURST_E_43_Trimmed_CDS | 571 | SOURST_E_143_Trimmed_CDS |
| 172 | SOURST_E_43_Trimmed_Protein | 572 | SOURST_E_143_Trimmed_Protein |
| 173 | SOURST_E_44_Full_CDS | 573 | SOURST_E_144_Full_CDS |
| 174 | SOURST_E_44_Full_Protein | 574 | SOURST_E_144_Full_Protein |
| 175 | SOURST_E_44_Trimmed_CDS | 575 | SOURST_E_144_Trimmed_CDS |
| 176 | SOURST_E_44_Trimmed_Protein | 576 | SOURST_E_144_Trimmed_Protein |
| 177 | SOURST_E_45_Full_CDS | 577 | SOURST_E_145_Full_CDS |
| 178 | SOURST_E_45_Full_Protein | 578 | SOURST_E_145_Full_Protein |
| 179 | SOURST_E_45_Trimmed_CDS | 579 | SOURST_E_145_Trimmed_CDS |
| 180 | SOURST_E_45_Trimmed_Protein | 580 | SOURST_E_145_Trimmed_Protein |
| 181 | SOURST_E_46_Full_CDS | 581 | SOURST_E_146_Full_CDS |
| 182 | SOURST_E_46_Full_Protein | 582 | SOURST_E_146_Full_Protein |
| 183 | SOURST_E_46_Trimmed_CDS | 583 | SOURST_E_146_Trimmed_CDS |
| 184 | SOURST_E_46_Trimmed_Protein | 584 | SOURST_E_146_Trimmed_Protein |
| 185 | SOURST_E_47_Full_CDS | 585 | SOURST_E_147_Full_CDS |
| 186 | SOURST_E_47_Full_Protein | 586 | SOURST_E_147_Full_Protein |
| 187 | SOURST_E_47_Trimmed_CDS | 587 | SOURST_E_147_Trimmed_CDS |
| 188 | SOURST_E_47_Trimmed_Protein | 588 | SOURST_E_147_Trimmed_Protein |
| 189 | SOURST_E_48_Full_CDS | 589 | SOURST_E_148_Full_CDS |
| 190 | SOURST_E_48_Full_Protein | 590 | SOURST_E_148_Full_Protein |
| 191 | SOURST_E_48_Trimmed_CDS | 591 | SOURST_E_148_Trimmed_CDS |
| 192 | SOURST_E_48_Trimmed_Protein | 592 | SOURST_E_148_Trimmed_Protein |
| 193 | SOURST_E_49_Full_CDS | 593 | SOURST_E_149_Full_CDS |
| 194 | SOURST_E_49_Full_Protein | 594 | SOURST_E_149_Full_Protein |
| 195 | SOURST_E_49_Trimmed_CDS | 595 | SOURST_E_149_Trimmed_CDS |
| 196 | SOURST_E_49_Trimmed_Protein | 596 | SOURST_E_149_Trimmed_Protein |
| 197 | SOURST_E_50_Full_CDS | 597 | SOURST_E_150_Full_CDS |
| 198 | SOURST_E_50_Full_Protein | 598 | SOURST_E_150_Full_Protein |
| 199 | SOURST_E_50_Trimmed_CDS | 599 | SOURST_E_150_Trimmed_CDS |
| 200 | SOURST_E_50_Trimmed_Protein | 600 | SOURST_E_150_Trimmed_Protein |
| 201 | SOURST_E_51_Full_CDS | 601 | SOURST_E_151_Full_CDS |
| 202 | SOURST_E_51_Full_Protein | 602 | SOURST_E_151_Full_Protein |
| 203 | SOURST_E_51_Trimmed_CDS | 603 | SOURST_E_151_Trimmed_CDS |
| 204 | SOURST_E_51_Trimmed_Protein | 604 | SOURST_E_151_Trimmed_Protein |
| 205 | SOURST_E_52_Full_CDS | 605 | SOURST_E_152_Full_CDS |

FIG. 3 (Cont.)

| 206 | SOURST_E_52_Full_Protein | 606 | SOURST_E_152_Full_Protein |
|---|---|---|---|
| 207 | SOURST_E_52_Trimmed_CDS | 607 | SOURST_E_152_Trimmed_CDS |
| 208 | SOURST_E_52_Trimmed_Protein | 608 | SOURST_E_152_Trimmed_Protein |
| 209 | SOURST_E_53_Full_CDS | 609 | SOURST_E_153_Full_CDS |
| 210 | SOURST_E_53_Full_Protein | 610 | SOURST_E_153_Full_Protein |
| 211 | SOURST_E_53_Trimmed_CDS | 611 | SOURST_E_153_Trimmed_CDS |
| 212 | SOURST_E_53_Trimmed_Protein | 612 | SOURST_E_153_Trimmed_Protein |
| 213 | SOURST_E_54_Full_CDS | 613 | SOURST_E_154_Full_CDS |
| 214 | SOURST_E_54_Full_Protein | 614 | SOURST_E_154_Full_Protein |
| 215 | SOURST_E_54_Trimmed_CDS | 615 | SOURST_E_154_Trimmed_CDS |
| 216 | SOURST_E_54_Trimmed_Protein | 616 | SOURST_E_154_Trimmed_Protein |
| 217 | SOURST_E_55_Full_CDS | 617 | SOURST_E_155_Full_CDS |
| 218 | SOURST_E_55_Full_Protein | 618 | SOURST_E_155_Full_Protein |
| 219 | SOURST_E_55_Trimmed_CDS | 619 | SOURST_E_155_Trimmed_CDS |
| 220 | SOURST_E_55_Trimmed_Protein | 620 | SOURST_E_155_Trimmed_Protein |
| 221 | SOURST_E_56_Full_CDS | 621 | SOURST_E_156_Full_CDS |
| 222 | SOURST_E_56_Full_Protein | 622 | SOURST_E_156_Full_Protein |
| 223 | SOURST_E_56_Trimmed_CDS | 623 | SOURST_E_156_Trimmed_CDS |
| 224 | SOURST_E_56_Trimmed_Protein | 624 | SOURST_E_156_Trimmed_Protein |
| 225 | SOURST_E_57_Full_CDS | 625 | SOURST_E_157_Full_CDS |
| 226 | SOURST_E_57_Full_Protein | 626 | SOURST_E_157_Full_Protein |
| 227 | SOURST_E_57_Trimmed_CDS | 627 | SOURST_E_157_Trimmed_CDS |
| 228 | SOURST_E_57_Trimmed_Protein | 628 | SOURST_E_157_Trimmed_Protein |
| 229 | SOURST_E_58_Full_CDS | 629 | SOURST_E_158_Full_CDS |
| 230 | SOURST_E_58_Full_Protein | 630 | SOURST_E_158_Full_Protein |
| 231 | SOURST_E_58_Trimmed_CDS | 631 | SOURST_E_158_Trimmed_CDS |
| 232 | SOURST_E_58_Trimmed_Protein | 632 | SOURST_E_158_Trimmed_Protein |
| 233 | SOURST_E_59_Full_CDS | 633 | SOURST_E_159_Full_CDS |
| 234 | SOURST_E_59_Full_Protein | 634 | SOURST_E_159_Full_Protein |
| 235 | SOURST_E_59_Trimmed_CDS | 635 | SOURST_E_159_Trimmed_CDS |
| 236 | SOURST_E_59_Trimmed_Protein | 636 | SOURST_E_159_Trimmed_Protein |
| 237 | SOURST_E_60_Full_CDS | 637 | SOURST_E_160_Full_CDS |
| 238 | SOURST_E_60_Full_Protein | 638 | SOURST_E_160_Full_Protein |
| 239 | SOURST_E_60_Trimmed_CDS | 639 | SOURST_E_160_Trimmed_CDS |
| 240 | SOURST_E_60_Trimmed_Protein | 640 | SOURST_E_160_Trimmed_Protein |
| 241 | SOURST_E_61_Full_CDS | 641 | SOURST_E_161_Full_CDS |
| 242 | SOURST_E_61_Full_Protein | 642 | SOURST_E_161_Full_Protein |
| 243 | SOURST_E_61_Trimmed_CDS | 643 | SOURST_E_161_Trimmed_CDS |
| 244 | SOURST_E_61_Trimmed_Protein | 644 | SOURST_E_161_Trimmed_Protein |
| 245 | SOURST_E_62_Full_CDS | 645 | SOURST_E_162_Full_CDS |
| 246 | SOURST_E_62_Full_Protein | 646 | SOURST_E_162_Full_Protein |

FIG. 3 (Cont.)

| 247 | SOURST_E_62_Trimmed_CDS | 647 | SOURST_E_162_Trimmed_CDS |
|---|---|---|---|
| 248 | SOURST_E_62_Trimmed_Protein | 648 | SOURST_E_162_Trimmed_Protein |
| 249 | SOURST_E_63_Full_CDS | 649 | SOURST_E_163_Full_CDS |
| 250 | SOURST_E_63_Full_Protein | 650 | SOURST_E_163_Full_Protein |
| 251 | SOURST_E_63_Trimmed_CDS | 651 | SOURST_E_163_Trimmed_CDS |
| 252 | SOURST_E_63_Trimmed_Protein | 652 | SOURST_E_163_Trimmed_Protein |
| 253 | SOURST_E_64_Full_CDS | 653 | SOURST_E_164_Full_CDS |
| 254 | SOURST_E_64_Full_Protein | 654 | SOURST_E_164_Full_Protein |
| 255 | SOURST_E_64_Trimmed_CDS | 655 | SOURST_E_164_Trimmed_CDS |
| 256 | SOURST_E_64_Trimmed_Protein | 656 | SOURST_E_164_Trimmed_Protein |
| 257 | SOURST_E_65_Full_CDS | 657 | SOURST_E_165_Full_CDS |
| 258 | SOURST_E_65_Full_Protein | 658 | SOURST_E_165_Full_Protein |
| 259 | SOURST_E_65_Trimmed_CDS | 659 | SOURST_E_165_Trimmed_CDS |
| 260 | SOURST_E_65_Trimmed_Protein | 660 | SOURST_E_165_Trimmed_Protein |
| 261 | SOURST_E_66_Full_CDS | 661 | SOURST_E_166_Full_CDS |
| 262 | SOURST_E_66_Full_Protein | 662 | SOURST_E_166_Full_Protein |
| 263 | SOURST_E_66_Trimmed_CDS | 663 | SOURST_E_166_Trimmed_CDS |
| 264 | SOURST_E_66_Trimmed_Protein | 664 | SOURST_E_166_Trimmed_Protein |
| 265 | SOURST_E_67_Full_CDS | 665 | SOURST_E_167_Full_CDS |
| 266 | SOURST_E_67_Full_Protein | 666 | SOURST_E_167_Full_Protein |
| 267 | SOURST_E_67_Trimmed_CDS | 667 | SOURST_E_167_Trimmed_CDS |
| 268 | SOURST_E_67_Trimmed_Protein | 668 | SOURST_E_167_Trimmed_Protein |
| 269 | SOURST_E_68_Full_CDS | 669 | SOURST_E_168_Full_CDS |
| 270 | SOURST_E_68_Full_Protein | 670 | SOURST_E_168_Full_Protein |
| 271 | SOURST_E_68_Trimmed_CDS | 671 | SOURST_E_168_Trimmed_CDS |
| 272 | SOURST_E_68_Trimmed_Protein | 672 | SOURST_E_168_Trimmed_Protein |
| 273 | SOURST_E_69_Full_CDS | 673 | SOURST_E_169_Full_CDS |
| 274 | SOURST_E_69_Full_Protein | 674 | SOURST_E_169_Full_Protein |
| 275 | SOURST_E_69_Trimmed_CDS | 675 | SOURST_E_169_Trimmed_CDS |
| 276 | SOURST_E_69_Trimmed_Protein | 676 | SOURST_E_169_Trimmed_Protein |
| 277 | SOURST_E_70_Full_CDS | 677 | SOURST_E_170_Full_CDS |
| 278 | SOURST_E_70_Full_Protein | 678 | SOURST_E_170_Full_Protein |
| 279 | SOURST_E_70_Trimmed_CDS | 679 | SOURST_E_170_Trimmed_CDS |
| 280 | SOURST_E_70_Trimmed_Protein | 680 | SOURST_E_170_Trimmed_Protein |
| 281 | SOURST_E_71_Full_CDS | 681 | SOURST_E_171_Full_CDS |
| 282 | SOURST_E_71_Full_Protein | 682 | SOURST_E_171_Full_Protein |
| 283 | SOURST_E_71_Trimmed_CDS | 683 | SOURST_E_171_Trimmed_CDS |
| 284 | SOURST_E_71_Trimmed_Protein | 684 | SOURST_E_171_Trimmed_Protein |
| 285 | SOURST_E_72_Full_CDS | 685 | SOURST_E_172_Full_CDS |
| 286 | SOURST_E_72_Full_Protein | 686 | SOURST_E_172_Full_Protein |
| 287 | SOURST_E_72_Trimmed_CDS | 687 | SOURST_E_172_Trimmed_CDS |

FIG. 3 (Cont.)

| 288 | SOURST_E_72_Trimmed_Protein | 688 | SOURST_E_172_Trimmed_Protein |
|---|---|---|---|
| 289 | SOURST_E_73_Full_CDS | 689 | SOURST_E_173_Full_CDS |
| 290 | SOURST_E_73_Full_Protein | 690 | SOURST_E_173_Full_Protein |
| 291 | SOURST_E_73_Trimmed_CDS | 691 | SOURST_E_173_Trimmed_CDS |
| 292 | SOURST_E_73_Trimmed_Protein | 692 | SOURST_E_173_Trimmed_Protein |
| 293 | SOURST_E_74_Full_CDS | 693 | SOURST_E_174_Full_CDS |
| 294 | SOURST_E_74_Full_Protein | 694 | SOURST_E_174_Full_Protein |
| 295 | SOURST_E_74_Trimmed_CDS | 695 | SOURST_E_174_Trimmed_CDS |
| 296 | SOURST_E_74_Trimmed_Protein | 696 | SOURST_E_174_Trimmed_Protein |
| 297 | SOURST_E_75_Full_CDS | 697 | SOURST_E_175_Full_CDS |
| 298 | SOURST_E_75_Full_Protein | 698 | SOURST_E_175_Full_Protein |
| 299 | SOURST_E_75_Trimmed_CDS | 699 | SOURST_E_175_Trimmed_CDS |
| 300 | SOURST_E_75_Trimmed_Protein | 700 | SOURST_E_175_Trimmed_Protein |
| 301 | SOURST_E_76_Full_CDS | 701 | SOURST_E_176_Full_CDS |
| 302 | SOURST_E_76_Full_Protein | 702 | SOURST_E_176_Full_Protein |
| 303 | SOURST_E_76_Trimmed_CDS | 703 | SOURST_E_176_Trimmed_CDS |
| 304 | SOURST_E_76_Trimmed_Protein | 704 | SOURST_E_176_Trimmed_Protein |
| 305 | SOURST_E_77_Full_CDS | 705 | SOURST_E_177_Full_CDS |
| 306 | SOURST_E_77_Full_Protein | 706 | SOURST_E_177_Full_Protein |
| 307 | SOURST_E_77_Trimmed_CDS | 707 | SOURST_E_177_Trimmed_CDS |
| 308 | SOURST_E_77_Trimmed_Protein | 708 | SOURST_E_177_Trimmed_Protein |
| 309 | SOURST_E_78_Full_CDS | 709 | SOURST_E_178_Full_CDS |
| 310 | SOURST_E_78_Full_Protein | 710 | SOURST_E_178_Full_Protein |
| 311 | SOURST_E_78_Trimmed_CDS | 711 | SOURST_E_178_Trimmed_CDS |
| 312 | SOURST_E_78_Trimmed_Protein | 712 | SOURST_E_178_Trimmed_Protein |
| 313 | SOURST_E_79_Full_CDS | 713 | SOURST_E_179_Full_CDS |
| 314 | SOURST_E_79_Full_Protein | 714 | SOURST_E_179_Full_Protein |
| 315 | SOURST_E_79_Trimmed_CDS | 715 | SOURST_E_179_Trimmed_CDS |
| 316 | SOURST_E_79_Trimmed_Protein | 716 | SOURST_E_179_Trimmed_Protein |
| 317 | SOURST_E_80_Full_CDS | 717 | SOURST_E_180_Full_CDS |
| 318 | SOURST_E_80_Full_Protein | 718 | SOURST_E_180_Full_Protein |
| 319 | SOURST_E_80_Trimmed_CDS | 719 | SOURST_E_180_Trimmed_CDS |
| 320 | SOURST_E_80_Trimmed_Protein | 720 | SOURST_E_180_Trimmed_Protein |
| 321 | SOURST_E_81_Full_CDS | 721 | SOURST_E_181_Full_CDS |
| 322 | SOURST_E_81_Full_Protein | 722 | SOURST_E_181_Full_Protein |
| 323 | SOURST_E_81_Trimmed_CDS | 723 | SOURST_E_181_Trimmed_CDS |
| 324 | SOURST_E_81_Trimmed_Protein | 724 | SOURST_E_181_Trimmed_Protein |
| 325 | SOURST_E_82_Full_CDS | 725 | SOURST_E_182_Full_CDS |
| 326 | SOURST_E_82_Full_Protein | 726 | SOURST_E_182_Full_Protein |
| 327 | SOURST_E_82_Trimmed_CDS | 727 | SOURST_E_182_Trimmed_CDS |
| 328 | SOURST_E_82_Trimmed_Protein | 728 | SOURST_E_182_Trimmed_Protein |

FIG. 3 (Cont.)

| | | | |
|---|---|---|---|
| 329 | SOURST_E_83_Full_CDS | 729 | SOURST_E_183_Full_CDS |
| 330 | SOURST_E_83_Full_Protein | 730 | SOURST_E_183_Full_Protein |
| 331 | SOURST_E_83_Trimmed_CDS | 731 | SOURST_E_183_Trimmed_CDS |
| 332 | SOURST_E_83_Trimmed_Protein | 732 | SOURST_E_183_Trimmed_Protein |
| 333 | SOURST_E_84_Full_CDS | 733 | SOURST_E_184_Full_CDS |
| 334 | SOURST_E_84_Full_Protein | 734 | SOURST_E_184_Full_Protein |
| 335 | SOURST_E_84_Trimmed_CDS | 735 | SOURST_E_184_Trimmed_CDS |
| 336 | SOURST_E_84_Trimmed_Protein | 736 | SOURST_E_184_Trimmed_Protein |
| 337 | SOURST_E_85_Full_CDS | 737 | SOURST_E_185_Full_CDS |
| 338 | SOURST_E_85_Full_Protein | 738 | SOURST_E_185_Full_Protein |
| 339 | SOURST_E_85_Trimmed_CDS | 739 | SOURST_E_185_Trimmed_CDS |
| 340 | SOURST_E_85_Trimmed_Protein | 740 | SOURST_E_185_Trimmed_Protein |
| 341 | SOURST_E_86_Full_CDS | 741 | SOURST_E_186_Full_CDS |
| 342 | SOURST_E_86_Full_Protein | 742 | SOURST_E_186_Full_Protein |
| 343 | SOURST_E_86_Trimmed_CDS | 743 | SOURST_E_186_Trimmed_CDS |
| 344 | SOURST_E_86_Trimmed_Protein | 744 | SOURST_E_186_Trimmed_Protein |
| 345 | SOURST_E_87_Full_CDS | 745 | SOURST_E_187_Full_CDS |
| 346 | SOURST_E_87_Full_Protein | 746 | SOURST_E_187_Full_Protein |
| 347 | SOURST_E_87_Trimmed_CDS | 747 | SOURST_E_187_Trimmed_CDS |
| 348 | SOURST_E_87_Trimmed_Protein | 748 | SOURST_E_187_Trimmed_Protein |
| 349 | SOURST_E_88_Full_CDS | 749 | SOURST_E_188_Full_CDS |
| 350 | SOURST_E_88_Full_Protein | 750 | SOURST_E_188_Full_Protein |
| 351 | SOURST_E_88_Trimmed_CDS | 751 | SOURST_E_188_Trimmed_CDS |
| 352 | SOURST_E_88_Trimmed_Protein | 752 | SOURST_E_188_Trimmed_Protein |
| 353 | SOURST_E_89_Full_CDS | 753 | SOURST_E_189_Full_CDS |
| 354 | SOURST_E_89_Full_Protein | 754 | SOURST_E_189_Full_Protein |
| 355 | SOURST_E_89_Trimmed_CDS | 755 | SOURST_E_189_Trimmed_CDS |
| 356 | SOURST_E_89_Trimmed_Protein | 756 | SOURST_E_189_Trimmed_Protein |
| 357 | SOURST_E_90_Full_CDS | 757 | SOURST_E_190_Full_CDS |
| 358 | SOURST_E_90_Full_Protein | 758 | SOURST_E_190_Full_Protein |
| 359 | SOURST_E_90_Trimmed_CDS | 759 | SOURST_E_190_Trimmed_CDS |
| 360 | SOURST_E_90_Trimmed_Protein | 760 | SOURST_E_190_Trimmed_Protein |
| 361 | SOURST_E_91_Full_CDS | 761 | SOURST_E_191_Full_CDS |
| 362 | SOURST_E_91_Full_Protein | 762 | SOURST_E_191_Full_Protein |
| 363 | SOURST_E_91_Trimmed_CDS | 763 | SOURST_E_191_Trimmed_CDS |
| 364 | SOURST_E_91_Trimmed_Protein | 764 | SOURST_E_191_Trimmed_Protein |
| 365 | SOURST_E_92_Full_CDS | 765 | SOURST_E_192_Full_CDS |
| 366 | SOURST_E_92_Full_Protein | 766 | SOURST_E_192_Full_Protein |
| 367 | SOURST_E_92_Trimmed_CDS | 767 | SOURST_E_192_Trimmed_CDS |
| 368 | SOURST_E_92_Trimmed_Protein | 768 | SOURST_E_192_Trimmed_Protein |
| 369 | SOURST_E_93_Full_CDS | 769 | SOURST_E_193_Full_CDS |

FIG. 3 (Cont.)

| | | | |
|---|---|---|---|
| 370 | SOURST_E_93_Full_Protein | 770 | SOURST_E_193_Full_Protein |
| 371 | SOURST_E_93_Trimmed_CDS | 771 | SOURST_E_193_Trimmed_CDS |
| 372 | SOURST_E_93_Trimmed_Protein | 772 | SOURST_E_193_Trimmed_Protein |
| 373 | SOURST_E_94_Full_CDS | 773 | SOURST_E_194_Full_CDS |
| 374 | SOURST_E_94_Full_Protein | 774 | SOURST_E_194_Full_Protein |
| 375 | SOURST_E_94_Trimmed_CDS | 775 | SOURST_E_194_Trimmed_CDS |
| 376 | SOURST_E_94_Trimmed_Protein | 776 | SOURST_E_194_Trimmed_Protein |
| 377 | SOURST_E_95_Full_CDS | 777 | SOURST_E_195_Full_CDS |
| 378 | SOURST_E_95_Full_Protein | 778 | SOURST_E_195_Full_Protein |
| 379 | SOURST_E_95_Trimmed_CDS | 779 | SOURST_E_195_Trimmed_CDS |
| 380 | SOURST_E_95_Trimmed_Protein | 780 | SOURST_E_195_Trimmed_Protein |
| 381 | SOURST_E_96_Full_CDS | 781 | SOURST_E_196_Full_CDS |
| 382 | SOURST_E_96_Full_Protein | 782 | SOURST_E_196_Full_Protein |
| 383 | SOURST_E_96_Trimmed_CDS | 783 | SOURST_E_196_Trimmed_CDS |
| 384 | SOURST_E_96_Trimmed_Protein | 784 | SOURST_E_196_Trimmed_Protein |
| 385 | SOURST_E_97_Full_CDS | 785 | SOURST_E_197_Full_CDS |
| 386 | SOURST_E_97_Full_Protein | 786 | SOURST_E_197_Full_Protein |
| 387 | SOURST_E_97_Trimmed_CDS | 787 | SOURST_E_197_Trimmed_CDS |
| 388 | SOURST_E_97_Trimmed_Protein | 788 | SOURST_E_197_Trimmed_Protein |
| 389 | SOURST_E_98_Full_CDS | 789 | SOURST_E_198_Full_CDS |
| 390 | SOURST_E_98_Full_Protein | 790 | SOURST_E_198_Full_Protein |
| 391 | SOURST_E_98_Trimmed_CDS | 791 | SOURST_E_198_Trimmed_CDS |
| 392 | SOURST_E_98_Trimmed_Protein | 792 | SOURST_E_198_Trimmed_Protein |
| 393 | SOURST_E_99_Full_CDS | 793 | SOURST_E_199_Full_CDS |
| 394 | SOURST_E_99_Full_Protein | 794 | SOURST_E_199_Full_Protein |
| 395 | SOURST_E_99_Trimmed_CDS | 795 | SOURST_E_199_Trimmed_CDS |
| 396 | SOURST_E_99_Trimmed_Protein | 796 | SOURST_E_199_Trimmed_Protein |
| 397 | SOURST_E_100_Full_CDS | 797 | SOURST_E_200_Full_CDS |
| 398 | SOURST_E_100_Full_Protein | 798 | SOURST_E_200_Full_Protein |
| 399 | SOURST_E_100_Trimmed_CDS | 799 | SOURST_E_200_Trimmed_CDS |
| 400 | SOURST_E_100_Trimmed_Protein | 800 | SOURST_E_200_Trimmed_Protein |
| 801 | SOURST_E_201_Full_CDS | 1201 | SOURST_E_301_Full_CDS |
| 802 | SOURST_E_201_Full_Protein | 1202 | SOURST_E_301_Full_Protein |
| 803 | SOURST_E_201_Trimmed_CDS | 1203 | SOURST_E_301_Trimmed_CDS |
| 804 | SOURST_E_201_Trimmed_Protein | 1204 | SOURST_E_301_Trimmed_Protein |
| 805 | SOURST_E_202_Full_CDS | 1205 | SOURST_E_302_Full_CDS |
| 806 | SOURST_E_202_Full_Protein | 1206 | SOURST_E_302_Full_Protein |
| 807 | SOURST_E_202_Trimmed_CDS | 1207 | SOURST_E_302_Trimmed_CDS |
| 808 | SOURST_E_202_Trimmed_Protein | 1208 | SOURST_E_302_Trimmed_Protein |
| 809 | SOURST_E_203_Full_CDS | 1209 | SOURST_E_303_Full_CDS |
| 810 | SOURST_E_203_Full_Protein | 1210 | SOURST_E_303_Full_Protein |

FIG. 3 (Cont.)

| 811 | SOURST_E_203_Trimmed_CDS | 1211 | SOURST_E_303_Trimmed_CDS |
|---|---|---|---|
| 812 | SOURST_E_203_Trimmed_Protein | 1212 | SOURST_E_303_Trimmed_Protein |
| 813 | SOURST_E_204_Full_CDS | 1213 | SOURST_E_304_Full_CDS |
| 814 | SOURST_E_204_Full_Protein | 1214 | SOURST_E_304_Full_Protein |
| 815 | SOURST_E_204_Trimmed_CDS | 1215 | SOURST_E_304_Trimmed_CDS |
| 816 | SOURST_E_204_Trimmed_Protein | 1216 | SOURST_E_304_Trimmed_Protein |
| 817 | SOURST_E_205_Full_CDS | 1217 | SOURST_E_305_Full_CDS |
| 818 | SOURST_E_205_Full_Protein | 1218 | SOURST_E_305_Full_Protein |
| 819 | SOURST_E_205_Trimmed_CDS | 1219 | SOURST_E_305_Trimmed_CDS |
| 820 | SOURST_E_205_Trimmed_Protein | 1220 | SOURST_E_305_Trimmed_Protein |
| 821 | SOURST_E_206_Full_CDS | 1221 | SOURST_E_306_Full_CDS |
| 822 | SOURST_E_206_Full_Protein | 1222 | SOURST_E_306_Full_Protein |
| 823 | SOURST_E_206_Trimmed_CDS | 1223 | SOURST_E_306_Trimmed_CDS |
| 824 | SOURST_E_206_Trimmed_Protein | 1224 | SOURST_E_306_Trimmed_Protein |
| 825 | SOURST_E_207_Full_CDS | 1225 | SOURST_E_307_Full_CDS |
| 826 | SOURST_E_207_Full_Protein | 1226 | SOURST_E_307_Full_Protein |
| 827 | SOURST_E_207_Trimmed_CDS | 1227 | SOURST_E_307_Trimmed_CDS |
| 828 | SOURST_E_207_Trimmed_Protein | 1228 | SOURST_E_307_Trimmed_Protein |
| 829 | SOURST_E_208_Full_CDS | 1229 | SOURST_E_308_Full_CDS |
| 830 | SOURST_E_208_Full_Protein | 1230 | SOURST_E_308_Full_Protein |
| 831 | SOURST_E_208_Trimmed_CDS | 1231 | SOURST_E_308_Trimmed_CDS |
| 832 | SOURST_E_208_Trimmed_Protein | 1232 | SOURST_E_308_Trimmed_Protein |
| 833 | SOURST_E_209_Full_CDS | 1233 | SOURST_E_309_Full_CDS |
| 834 | SOURST_E_209_Full_Protein | 1234 | SOURST_E_309_Full_Protein |
| 835 | SOURST_E_209_Trimmed_CDS | 1235 | SOURST_E_309_Trimmed_CDS |
| 836 | SOURST_E_209_Trimmed_Protein | 1236 | SOURST_E_309_Trimmed_Protein |
| 837 | SOURST_E_210_Full_CDS | 1237 | SOURST_E_310_Full_CDS |
| 838 | SOURST_E_210_Full_Protein | 1238 | SOURST_E_310_Full_Protein |
| 839 | SOURST_E_210_Trimmed_CDS | 1239 | SOURST_E_310_Trimmed_CDS |
| 840 | SOURST_E_210_Trimmed_Protein | 1240 | SOURST_E_310_Trimmed_Protein |
| 841 | SOURST_E_211_Full_CDS | 1241 | SOURST_E_311_Full_CDS |
| 842 | SOURST_E_211_Full_Protein | 1242 | SOURST_E_311_Full_Protein |
| 843 | SOURST_E_211_Trimmed_CDS | 1243 | SOURST_E_311_Trimmed_CDS |
| 844 | SOURST_E_211_Trimmed_Protein | 1244 | SOURST_E_311_Trimmed_Protein |
| 845 | SOURST_E_212_Full_CDS | 1245 | SOURST_E_312_Full_CDS |
| 846 | SOURST_E_212_Full_Protein | 1246 | SOURST_E_312_Full_Protein |
| 847 | SOURST_E_212_Trimmed_CDS | 1247 | SOURST_E_312_Trimmed_CDS |
| 848 | SOURST_E_212_Trimmed_Protein | 1248 | SOURST_E_312_Trimmed_Protein |
| 849 | SOURST_E_213_Full_CDS | 1249 | SOURST_E_313_Full_CDS |
| 850 | SOURST_E_213_Full_Protein | 1250 | SOURST_E_313_Full_Protein |
| 851 | SOURST_E_213_Trimmed_CDS | 1251 | SOURST_E_313_Trimmed_CDS |

FIG. 3 (Cont.)

| 852 | SOURST_E_213_Trimmed_Protein | 1252 | SOURST_E_313_Trimmed_Protein |
|---|---|---|---|
| 853 | SOURST_E_214_Full_CDS | 1253 | SOURST_E_314_Full_CDS |
| 854 | SOURST_E_214_Full_Protein | 1254 | SOURST_E_314_Full_Protein |
| 855 | SOURST_E_214_Trimmed_CDS | 1255 | SOURST_E_314_Trimmed_CDS |
| 856 | SOURST_E_214_Trimmed_Protein | 1256 | SOURST_E_314_Trimmed_Protein |
| 857 | SOURST_E_215_Full_CDS | 1257 | SOURST_E_315_Full_CDS |
| 858 | SOURST_E_215_Full_Protein | 1258 | SOURST_E_315_Full_Protein |
| 859 | SOURST_E_215_Trimmed_CDS | 1259 | SOURST_E_315_Trimmed_CDS |
| 860 | SOURST_E_215_Trimmed_Protein | 1260 | SOURST_E_315_Trimmed_Protein |
| 861 | SOURST_E_216_Full_CDS | 1261 | SOURST_E_316_Full_CDS |
| 862 | SOURST_E_216_Full_Protein | 1262 | SOURST_E_316_Full_Protein |
| 863 | SOURST_E_216_Trimmed_CDS | 1263 | SOURST_E_316_Trimmed_CDS |
| 864 | SOURST_E_216_Trimmed_Protein | 1264 | SOURST_E_316_Trimmed_Protein |
| 865 | SOURST_E_217_Full_CDS | 1265 | SOURST_E_317_Full_CDS |
| 866 | SOURST_E_217_Full_Protein | 1266 | SOURST_E_317_Full_Protein |
| 867 | SOURST_E_217_Trimmed_CDS | 1267 | SOURST_E_317_Trimmed_CDS |
| 868 | SOURST_E_217_Trimmed_Protein | 1268 | SOURST_E_317_Trimmed_Protein |
| 869 | SOURST_E_218_Full_CDS | 1269 | SOURST_E_318_Full_CDS |
| 870 | SOURST_E_218_Full_Protein | 1270 | SOURST_E_318_Full_Protein |
| 871 | SOURST_E_218_Trimmed_CDS | 1271 | SOURST_E_318_Trimmed_CDS |
| 872 | SOURST_E_218_Trimmed_Protein | 1272 | SOURST_E_318_Trimmed_Protein |
| 873 | SOURST_E_219_Full_CDS | 1273 | SOURST_E_319_Full_CDS |
| 874 | SOURST_E_219_Full_Protein | 1274 | SOURST_E_319_Full_Protein |
| 875 | SOURST_E_219_Trimmed_CDS | 1275 | SOURST_E_319_Trimmed_CDS |
| 876 | SOURST_E_219_Trimmed_Protein | 1276 | SOURST_E_319_Trimmed_Protein |
| 877 | SOURST_E_220_Full_CDS | 1277 | SOURST_E_320_Full_CDS |
| 878 | SOURST_E_220_Full_Protein | 1278 | SOURST_E_320_Full_Protein |
| 879 | SOURST_E_220_Trimmed_CDS | 1279 | SOURST_E_320_Trimmed_CDS |
| 880 | SOURST_E_220_Trimmed_Protein | 1280 | SOURST_E_320_Trimmed_Protein |
| 881 | SOURST_E_221_Full_CDS | 1281 | SOURST_E_321_Full_CDS |
| 882 | SOURST_E_221_Full_Protein | 1282 | SOURST_E_321_Full_Protein |
| 883 | SOURST_E_221_Trimmed_CDS | 1283 | SOURST_E_321_Trimmed_CDS |
| 884 | SOURST_E_221_Trimmed_Protein | 1284 | SOURST_E_321_Trimmed_Protein |
| 885 | SOURST_E_222_Full_CDS | 1285 | SOURST_E_322_Full_CDS |
| 886 | SOURST_E_222_Full_Protein | 1286 | SOURST_E_322_Full_Protein |
| 887 | SOURST_E_222_Trimmed_CDS | 1287 | SOURST_E_322_Trimmed_CDS |
| 888 | SOURST_E_222_Trimmed_Protein | 1288 | SOURST_E_322_Trimmed_Protein |
| 889 | SOURST_E_223_Full_CDS | 1289 | SOURST_E_323_Full_CDS |
| 890 | SOURST_E_223_Full_Protein | 1290 | SOURST_E_323_Full_Protein |
| 891 | SOURST_E_223_Trimmed_CDS | 1291 | SOURST_E_323_Trimmed_CDS |
| 892 | SOURST_E_223_Trimmed_Protein | 1292 | SOURST_E_323_Trimmed_Protein |

FIG. 3 (Cont.)

| 893 | SOURST_E_224_Full_CDS | 1293 | SOURST_E_324_Full_CDS |
|---|---|---|---|
| 894 | SOURST_E_224_Full_Protein | 1294 | SOURST_E_324_Full_Protein |
| 895 | SOURST_E_224_Trimmed_CDS | 1295 | SOURST_E_324_Trimmed_CDS |
| 896 | SOURST_E_224_Trimmed_Protein | 1296 | SOURST_E_324_Trimmed_Protein |
| 897 | SOURST_E_225_Full_CDS | 1297 | SOURST_E_325_Full_CDS |
| 898 | SOURST_E_225_Full_Protein | 1298 | SOURST_E_325_Full_Protein |
| 899 | SOURST_E_225_Trimmed_CDS | 1299 | SOURST_E_325_Trimmed_CDS |
| 900 | SOURST_E_225_Trimmed_Protein | 1300 | SOURST_E_325_Trimmed_Protein |
| 901 | SOURST_E_226_Full_CDS | 1301 | SOURST_E_326_Full_CDS |
| 902 | SOURST_E_226_Full_Protein | 1302 | SOURST_E_326_Full_Protein |
| 903 | SOURST_E_226_Trimmed_CDS | 1303 | SOURST_E_326_Trimmed_CDS |
| 904 | SOURST_E_226_Trimmed_Protein | 1304 | SOURST_E_326_Trimmed_Protein |
| 905 | SOURST_E_227_Full_CDS | 1305 | SOURST_E_327_Full_CDS |
| 906 | SOURST_E_227_Full_Protein | 1306 | SOURST_E_327_Full_Protein |
| 907 | SOURST_E_227_Trimmed_CDS | 1307 | SOURST_E_327_Trimmed_CDS |
| 908 | SOURST_E_227_Trimmed_Protein | 1308 | SOURST_E_327_Trimmed_Protein |
| 909 | SOURST_E_228_Full_CDS | 1309 | SOURST_E_328_Full_CDS |
| 910 | SOURST_E_228_Full_Protein | 1310 | SOURST_E_328_Full_Protein |
| 911 | SOURST_E_228_Trimmed_CDS | 1311 | SOURST_E_328_Trimmed_CDS |
| 912 | SOURST_E_228_Trimmed_Protein | 1312 | SOURST_E_328_Trimmed_Protein |
| 913 | SOURST_E_229_Full_CDS | 1313 | SOURST_E_329_Full_CDS |
| 914 | SOURST_E_229_Full_Protein | 1314 | SOURST_E_329_Full_Protein |
| 915 | SOURST_E_229_Trimmed_CDS | 1315 | SOURST_E_329_Trimmed_CDS |
| 916 | SOURST_E_229_Trimmed_Protein | 1316 | SOURST_E_329_Trimmed_Protein |
| 917 | SOURST_E_230_Full_CDS | 1317 | SOURST_E_330_Full_CDS |
| 918 | SOURST_E_230_Full_Protein | 1318 | SOURST_E_330_Full_Protein |
| 919 | SOURST_E_230_Trimmed_CDS | 1319 | SOURST_E_330_Trimmed_CDS |
| 920 | SOURST_E_230_Trimmed_Protein | 1320 | SOURST_E_330_Trimmed_Protein |
| 921 | SOURST_E_231_Full_CDS | 1321 | SOURST_E_331_Full_CDS |
| 922 | SOURST_E_231_Full_Protein | 1322 | SOURST_E_331_Full_Protein |
| 923 | SOURST_E_231_Trimmed_CDS | 1323 | SOURST_E_331_Trimmed_CDS |
| 924 | SOURST_E_231_Trimmed_Protein | 1324 | SOURST_E_331_Trimmed_Protein |
| 925 | SOURST_E_232_Full_CDS | 1325 | SOURST_E_332_Full_CDS |
| 926 | SOURST_E_232_Full_Protein | 1326 | SOURST_E_332_Full_Protein |
| 927 | SOURST_E_232_Trimmed_CDS | 1327 | SOURST_E_332_Trimmed_CDS |
| 928 | SOURST_E_232_Trimmed_Protein | 1328 | SOURST_E_332_Trimmed_Protein |
| 929 | SOURST_E_233_Full_CDS | 1329 | SOURST_E_333_Full_CDS |
| 930 | SOURST_E_233_Full_Protein | 1330 | SOURST_E_333_Full_Protein |
| 931 | SOURST_E_233_Trimmed_CDS | 1331 | SOURST_E_333_Trimmed_CDS |
| 932 | SOURST_E_233_Trimmed_Protein | 1332 | SOURST_E_333_Trimmed_Protein |
| 933 | SOURST_E_234_Full_CDS | 1333 | SOURST_E_334_Full_CDS |

FIG. 3 (Cont.)

| | | | |
|---|---|---|---|
| 934 | SOURST_E_234_Full_Protein | 1334 | SOURST_E_334_Full_Protein |
| 935 | SOURST_E_234_Trimmed_CDS | 1335 | SOURST_E_334_Trimmed_CDS |
| 936 | SOURST_E_234_Trimmed_Protein | 1336 | SOURST_E_334_Trimmed_Protein |
| 937 | SOURST_E_235_Full_CDS | 1337 | SOURST_E_335_Full_CDS |
| 938 | SOURST_E_235_Full_Protein | 1338 | SOURST_E_335_Full_Protein |
| 939 | SOURST_E_235_Trimmed_CDS | 1339 | SOURST_E_335_Trimmed_CDS |
| 940 | SOURST_E_235_Trimmed_Protein | 1340 | SOURST_E_335_Trimmed_Protein |
| 941 | SOURST_E_236_Full_CDS | 1341 | SOURST_E_336_Full_CDS |
| 942 | SOURST_E_236_Full_Protein | 1342 | SOURST_E_336_Full_Protein |
| 943 | SOURST_E_236_Trimmed_CDS | 1343 | SOURST_E_336_Trimmed_CDS |
| 944 | SOURST_E_236_Trimmed_Protein | 1344 | SOURST_E_336_Trimmed_Protein |
| 945 | SOURST_E_237_Full_CDS | 1345 | SOURST_E_337_Full_CDS |
| 946 | SOURST_E_237_Full_Protein | 1346 | SOURST_E_337_Full_Protein |
| 947 | SOURST_E_237_Trimmed_CDS | 1347 | SOURST_E_337_Trimmed_CDS |
| 948 | SOURST_E_237_Trimmed_Protein | 1348 | SOURST_E_337_Trimmed_Protein |
| 949 | SOURST_E_238_Full_CDS | 1349 | SOURST_E_338_Full_CDS |
| 950 | SOURST_E_238_Full_Protein | 1350 | SOURST_E_338_Full_Protein |
| 951 | SOURST_E_238_Trimmed_CDS | 1351 | SOURST_E_338_Trimmed_CDS |
| 952 | SOURST_E_238_Trimmed_Protein | 1352 | SOURST_E_338_Trimmed_Protein |
| 953 | SOURST_E_239_Full_CDS | 1353 | SOURST_E_339_Full_CDS |
| 954 | SOURST_E_239_Full_Protein | 1354 | SOURST_E_339_Full_Protein |
| 955 | SOURST_E_239_Trimmed_CDS | 1355 | SOURST_E_339_Trimmed_CDS |
| 956 | SOURST_E_239_Trimmed_Protein | 1356 | SOURST_E_339_Trimmed_Protein |
| 957 | SOURST_E_240_Full_CDS | 1357 | SOURST_E_340_Full_CDS |
| 958 | SOURST_E_240_Full_Protein | 1358 | SOURST_E_340_Full_Protein |
| 959 | SOURST_E_240_Trimmed_CDS | 1359 | SOURST_E_340_Trimmed_CDS |
| 960 | SOURST_E_240_Trimmed_Protein | 1360 | SOURST_E_340_Trimmed_Protein |
| 961 | SOURST_E_241_Full_CDS | 1361 | SOURST_E_341_Full_CDS |
| 962 | SOURST_E_241_Full_Protein | 1362 | SOURST_E_341_Full_Protein |
| 963 | SOURST_E_241_Trimmed_CDS | 1363 | SOURST_E_341_Trimmed_CDS |
| 964 | SOURST_E_241_Trimmed_Protein | 1364 | SOURST_E_341_Trimmed_Protein |
| 965 | SOURST_E_242_Full_CDS | 1365 | SOURST_E_342_Full_CDS |
| 966 | SOURST_E_242_Full_Protein | 1366 | SOURST_E_342_Full_Protein |
| 967 | SOURST_E_242_Trimmed_CDS | 1367 | SOURST_E_342_Trimmed_CDS |
| 968 | SOURST_E_242_Trimmed_Protein | 1368 | SOURST_E_342_Trimmed_Protein |
| 969 | SOURST_E_243_Full_CDS | 1369 | SOURST_E_343_Full_CDS |
| 970 | SOURST_E_243_Full_Protein | 1370 | SOURST_E_343_Full_Protein |
| 971 | SOURST_E_243_Trimmed_CDS | 1371 | SOURST_E_343_Trimmed_CDS |
| 972 | SOURST_E_243_Trimmed_Protein | 1372 | SOURST_E_343_Trimmed_Protein |
| 973 | SOURST_E_244_Full_CDS | 1373 | SOURST_E_344_Full_CDS |
| 974 | SOURST_E_244_Full_Protein | 1374 | SOURST_E_344_Full_Protein |

FIG. 3 (Cont.)

| 975 | SOURST_E_244_Trimmed_CDS | 1375 | SOURST_E_344_Trimmed_CDS |
|---|---|---|---|
| 976 | SOURST_E_244_Trimmed_Protein | 1376 | SOURST_E_344_Trimmed_Protein |
| 977 | SOURST_E_245_Full_CDS | 1377 | SOURST_E_345_Full_CDS |
| 978 | SOURST_E_245_Full_Protein | 1378 | SOURST_E_345_Full_Protein |
| 979 | SOURST_E_245_Trimmed_CDS | 1379 | SOURST_E_345_Trimmed_CDS |
| 980 | SOURST_E_245_Trimmed_Protein | 1380 | SOURST_E_345_Trimmed_Protein |
| 981 | SOURST_E_246_Full_CDS | 1381 | SOURST_E_346_Full_CDS |
| 982 | SOURST_E_246_Full_Protein | 1382 | SOURST_E_346_Full_Protein |
| 983 | SOURST_E_246_Trimmed_CDS | 1383 | SOURST_E_346_Trimmed_CDS |
| 984 | SOURST_E_246_Trimmed_Protein | 1384 | SOURST_E_346_Trimmed_Protein |
| 985 | SOURST_E_247_Full_CDS | 1385 | SOURST_E_347_Full_CDS |
| 986 | SOURST_E_247_Full_Protein | 1386 | SOURST_E_347_Full_Protein |
| 987 | SOURST_E_247_Trimmed_CDS | 1387 | SOURST_E_347_Trimmed_CDS |
| 988 | SOURST_E_247_Trimmed_Protein | 1388 | SOURST_E_347_Trimmed_Protein |
| 989 | SOURST_E_248_Full_CDS | 1389 | SOURST_E_348_Full_CDS |
| 990 | SOURST_E_248_Full_Protein | 1390 | SOURST_E_348_Full_Protein |
| 991 | SOURST_E_248_Trimmed_CDS | 1391 | SOURST_E_348_Trimmed_CDS |
| 992 | SOURST_E_248_Trimmed_Protein | 1392 | SOURST_E_348_Trimmed_Protein |
| 993 | SOURST_E_249_Full_CDS | 1393 | SOURST_E_349_Full_CDS |
| 994 | SOURST_E_249_Full_Protein | 1394 | SOURST_E_349_Full_Protein |
| 995 | SOURST_E_249_Trimmed_CDS | 1395 | SOURST_E_349_Trimmed_CDS |
| 996 | SOURST_E_249_Trimmed_Protein | 1396 | SOURST_E_349_Trimmed_Protein |
| 997 | SOURST_E_250_Full_CDS | 1397 | SOURST_E_350_Full_CDS |
| 998 | SOURST_E_250_Full_Protein | 1398 | SOURST_E_350_Full_Protein |
| 999 | SOURST_E_250_Trimmed_CDS | 1399 | SOURST_E_350_Trimmed_CDS |
| 1000 | SOURST_E_250_Trimmed_Protein | 1400 | SOURST_E_350_Trimmed_Protein |
| 1001 | SOURST_E_251_Full_CDS | 1401 | SOURST_E_351_Full_CDS |
| 1002 | SOURST_E_251_Full_Protein | 1402 | SOURST_E_351_Full_Protein |
| 1003 | SOURST_E_251_Trimmed_CDS | 1403 | SOURST_E_351_Trimmed_CDS |
| 1004 | SOURST_E_251_Trimmed_Protein | 1404 | SOURST_E_351_Trimmed_Protein |
| 1005 | SOURST_E_252_Full_CDS | 1405 | SOURST_E_352_Full_CDS |
| 1006 | SOURST_E_252_Full_Protein | 1406 | SOURST_E_352_Full_Protein |
| 1007 | SOURST_E_252_Trimmed_CDS | 1407 | SOURST_E_352_Trimmed_CDS |
| 1008 | SOURST_E_252_Trimmed_Protein | 1408 | SOURST_E_352_Trimmed_Protein |
| 1009 | SOURST_E_253_Full_CDS | 1409 | SOURST_E_353_Full_CDS |
| 1010 | SOURST_E_253_Full_Protein | 1410 | SOURST_E_353_Full_Protein |
| 1011 | SOURST_E_253_Trimmed_CDS | 1411 | SOURST_E_353_Trimmed_CDS |
| 1012 | SOURST_E_253_Trimmed_Protein | 1412 | SOURST_E_353_Trimmed_Protein |
| 1013 | SOURST_E_254_Full_CDS | 1413 | SOURST_E_354_Full_CDS |
| 1014 | SOURST_E_254_Full_Protein | 1414 | SOURST_E_354_Full_Protein |
| 1015 | SOURST_E_254_Trimmed_CDS | 1415 | SOURST_E_354_Trimmed_CDS |

FIG. 3 (Cont.)

| 1016 | SOURST_E_254_Trimmed_Protein | 1416 | SOURST_E_354_Trimmed_Protein |
|---|---|---|---|
| 1017 | SOURST_E_255_Full_CDS | 1417 | SOURST_E_355_Full_CDS |
| 1018 | SOURST_E_255_Full_Protein | 1418 | SOURST_E_355_Full_Protein |
| 1019 | SOURST_E_255_Trimmed_CDS | 1419 | SOURST_E_355_Trimmed_CDS |
| 1020 | SOURST_E_255_Trimmed_Protein | 1420 | SOURST_E_355_Trimmed_Protein |
| 1021 | SOURST_E_256_Full_CDS | 1421 | SOURST_E_356_Full_CDS |
| 1022 | SOURST_E_256_Full_Protein | 1422 | SOURST_E_356_Full_Protein |
| 1023 | SOURST_E_256_Trimmed_CDS | 1423 | SOURST_E_356_Trimmed_CDS |
| 1024 | SOURST_E_256_Trimmed_Protein | 1424 | SOURST_E_356_Trimmed_Protein |
| 1025 | SOURST_E_257_Full_CDS | 1425 | SOURST_E_357_Full_CDS |
| 1026 | SOURST_E_257_Full_Protein | 1426 | SOURST_E_357_Full_Protein |
| 1027 | SOURST_E_257_Trimmed_CDS | 1427 | SOURST_E_357_Trimmed_CDS |
| 1028 | SOURST_E_257_Trimmed_Protein | 1428 | SOURST_E_357_Trimmed_Protein |
| 1029 | SOURST_E_258_Full_CDS | 1429 | SOURST_E_358_Full_CDS |
| 1030 | SOURST_E_258_Full_Protein | 1430 | SOURST_E_358_Full_Protein |
| 1031 | SOURST_E_258_Trimmed_CDS | 1431 | SOURST_E_358_Trimmed_CDS |
| 1032 | SOURST_E_258_Trimmed_Protein | 1432 | SOURST_E_358_Trimmed_Protein |
| 1033 | SOURST_E_259_Full_CDS | 1433 | SOURST_E_359_Full_CDS |
| 1034 | SOURST_E_259_Full_Protein | 1434 | SOURST_E_359_Full_Protein |
| 1035 | SOURST_E_259_Trimmed_CDS | 1435 | SOURST_E_359_Trimmed_CDS |
| 1036 | SOURST_E_259_Trimmed_Protein | 1436 | SOURST_E_359_Trimmed_Protein |
| 1037 | SOURST_E_260_Full_CDS | 1437 | SOURST_E_360_Full_CDS |
| 1038 | SOURST_E_260_Full_Protein | 1438 | SOURST_E_360_Full_Protein |
| 1039 | SOURST_E_260_Trimmed_CDS | 1439 | SOURST_E_360_Trimmed_CDS |
| 1040 | SOURST_E_260_Trimmed_Protein | 1440 | SOURST_E_360_Trimmed_Protein |
| 1041 | SOURST_E_261_Full_CDS | 1441 | SOURST_E_361_Full_CDS |
| 1042 | SOURST_E_261_Full_Protein | 1442 | SOURST_E_361_Full_Protein |
| 1043 | SOURST_E_261_Trimmed_CDS | 1443 | SOURST_E_361_Trimmed_CDS |
| 1044 | SOURST_E_261_Trimmed_Protein | 1444 | SOURST_E_361_Trimmed_Protein |
| 1045 | SOURST_E_262_Full_CDS | 1445 | SOURST_E_362_Full_CDS |
| 1046 | SOURST_E_262_Full_Protein | 1446 | SOURST_E_362_Full_Protein |
| 1047 | SOURST_E_262_Trimmed_CDS | 1447 | SOURST_E_362_Trimmed_CDS |
| 1048 | SOURST_E_262_Trimmed_Protein | 1448 | SOURST_E_362_Trimmed_Protein |
| 1049 | SOURST_E_263_Full_CDS | 1449 | SOURST_E_363_Full_CDS |
| 1050 | SOURST_E_263_Full_Protein | 1450 | SOURST_E_363_Full_Protein |
| 1051 | SOURST_E_263_Trimmed_CDS | 1451 | SOURST_E_363_Trimmed_CDS |
| 1052 | SOURST_E_263_Trimmed_Protein | 1452 | SOURST_E_363_Trimmed_Protein |
| 1053 | SOURST_E_264_Full_CDS | 1453 | SOURST_E_364_Full_CDS |
| 1054 | SOURST_E_264_Full_Protein | 1454 | SOURST_E_364_Full_Protein |
| 1055 | SOURST_E_264_Trimmed_CDS | 1455 | SOURST_E_364_Trimmed_CDS |
| 1056 | SOURST_E_264_Trimmed_Protein | 1456 | SOURST_E_364_Trimmed_Protein |

FIG. 3 (Cont.)

| 1057 | SOURST_E_265_Full_CDS | 1457 | SOURST_E_365_Full_CDS |
|---|---|---|---|
| 1058 | SOURST_E_265_Full_Protein | 1458 | SOURST_E_365_Full_Protein |
| 1059 | SOURST_E_265_Trimmed_CDS | 1459 | SOURST_E_365_Trimmed_CDS |
| 1060 | SOURST_E_265_Trimmed_Protein | 1460 | SOURST_E_365_Trimmed_Protein |
| 1061 | SOURST_E_266_Full_CDS | 1461 | SOURST_E_366_Full_CDS |
| 1062 | SOURST_E_266_Full_Protein | 1462 | SOURST_E_366_Full_Protein |
| 1063 | SOURST_E_266_Trimmed_CDS | 1463 | SOURST_E_366_Trimmed_CDS |
| 1064 | SOURST_E_266_Trimmed_Protein | 1464 | SOURST_E_366_Trimmed_Protein |
| 1065 | SOURST_E_267_Full_CDS | 1465 | SOURST_E_367_Full_CDS |
| 1066 | SOURST_E_267_Full_Protein | 1466 | SOURST_E_367_Full_Protein |
| 1067 | SOURST_E_267_Trimmed_CDS | 1467 | SOURST_E_367_Trimmed_CDS |
| 1068 | SOURST_E_267_Trimmed_Protein | 1468 | SOURST_E_367_Trimmed_Protein |
| 1069 | SOURST_E_268_Full_CDS | 1469 | SOURST_E_368_Full_CDS |
| 1070 | SOURST_E_268_Full_Protein | 1470 | SOURST_E_368_Full_Protein |
| 1071 | SOURST_E_268_Trimmed_CDS | 1471 | SOURST_E_368_Trimmed_CDS |
| 1072 | SOURST_E_268_Trimmed_Protein | 1472 | SOURST_E_368_Trimmed_Protein |
| 1073 | SOURST_E_269_Full_CDS | 1473 | SOURST_E_369_Full_CDS |
| 1074 | SOURST_E_269_Full_Protein | 1474 | SOURST_E_369_Full_Protein |
| 1075 | SOURST_E_269_Trimmed_CDS | 1475 | SOURST_E_369_Trimmed_CDS |
| 1076 | SOURST_E_269_Trimmed_Protein | 1476 | SOURST_E_369_Trimmed_Protein |
| 1077 | SOURST_E_270_Full_CDS | 1477 | SOURST_E_370_Full_CDS |
| 1078 | SOURST_E_270_Full_Protein | 1478 | SOURST_E_370_Full_Protein |
| 1079 | SOURST_E_270_Trimmed_CDS | 1479 | SOURST_E_370_Trimmed_CDS |
| 1080 | SOURST_E_270_Trimmed_Protein | 1480 | SOURST_E_370_Trimmed_Protein |
| 1081 | SOURST_E_271_Full_CDS | 1481 | SOURST_E_371_Full_CDS |
| 1082 | SOURST_E_271_Full_Protein | 1482 | SOURST_E_371_Full_Protein |
| 1083 | SOURST_E_271_Trimmed_CDS | 1483 | SOURST_E_371_Trimmed_CDS |
| 1084 | SOURST_E_271_Trimmed_Protein | 1484 | SOURST_E_371_Trimmed_Protein |
| 1085 | SOURST_E_272_Full_CDS | 1485 | SOURST_E_372_Full_CDS |
| 1086 | SOURST_E_272_Full_Protein | 1486 | SOURST_E_372_Full_Protein |
| 1087 | SOURST_E_272_Trimmed_CDS | 1487 | SOURST_E_372_Trimmed_CDS |
| 1088 | SOURST_E_272_Trimmed_Protein | 1488 | SOURST_E_372_Trimmed_Protein |
| 1089 | SOURST_E_273_Full_CDS | 1489 | SOURST_E_373_Full_CDS |
| 1090 | SOURST_E_273_Full_Protein | 1490 | SOURST_E_373_Full_Protein |
| 1091 | SOURST_E_273_Trimmed_CDS | 1491 | SOURST_E_373_Trimmed_CDS |
| 1092 | SOURST_E_273_Trimmed_Protein | 1492 | SOURST_E_373_Trimmed_Protein |
| 1093 | SOURST_E_274_Full_CDS | 1493 | SOURST_E_374_Full_CDS |
| 1094 | SOURST_E_274_Full_Protein | 1494 | SOURST_E_374_Full_Protein |
| 1095 | SOURST_E_274_Trimmed_CDS | 1495 | SOURST_E_374_Trimmed_CDS |
| 1096 | SOURST_E_274_Trimmed_Protein | 1496 | SOURST_E_374_Trimmed_Protein |
| 1097 | SOURST_E_275_Full_CDS | 1497 | SOURST_E_375_Full_CDS |

FIG. 3 (Cont.)

| | | | |
|---|---|---|---|
| 1098 | SOURST_E_275_Full_Protein | 1498 | SOURST_E_375_Full_Protein |
| 1099 | SOURST_E_275_Trimmed_CDS | 1499 | SOURST_E_375_Trimmed_CDS |
| 1100 | SOURST_E_275_Trimmed_Protein | 1500 | SOURST_E_375_Trimmed_Protein |
| 1101 | SOURST_E_276_Full_CDS | 1501 | SOURST_E_376_Full_CDS |
| 1102 | SOURST_E_276_Full_Protein | 1502 | SOURST_E_376_Full_Protein |
| 1103 | SOURST_E_276_Trimmed_CDS | 1503 | SOURST_E_376_Trimmed_CDS |
| 1104 | SOURST_E_276_Trimmed_Protein | 1504 | SOURST_E_376_Trimmed_Protein |
| 1105 | SOURST_E_277_Full_CDS | 1505 | SOURST_E_377_Full_CDS |
| 1106 | SOURST_E_277_Full_Protein | 1506 | SOURST_E_377_Full_Protein |
| 1107 | SOURST_E_277_Trimmed_CDS | 1507 | SOURST_E_377_Trimmed_CDS |
| 1108 | SOURST_E_277_Trimmed_Protein | 1508 | SOURST_E_377_Trimmed_Protein |
| 1109 | SOURST_E_278_Full_CDS | 1509 | SOURST_E_378_Full_CDS |
| 1110 | SOURST_E_278_Full_Protein | 1510 | SOURST_E_378_Full_Protein |
| 1111 | SOURST_E_278_Trimmed_CDS | 1511 | SOURST_E_378_Trimmed_CDS |
| 1112 | SOURST_E_278_Trimmed_Protein | 1512 | SOURST_E_378_Trimmed_Protein |
| 1113 | SOURST_E_279_Full_CDS | 1513 | SOURST_E_379_Full_CDS |
| 1114 | SOURST_E_279_Full_Protein | 1514 | SOURST_E_379_Full_Protein |
| 1115 | SOURST_E_279_Trimmed_CDS | 1515 | SOURST_E_379_Trimmed_CDS |
| 1116 | SOURST_E_279_Trimmed_Protein | 1516 | SOURST_E_379_Trimmed_Protein |
| 1117 | SOURST_E_280_Full_CDS | 1517 | SOURST_E_380_Full_CDS |
| 1118 | SOURST_E_280_Full_Protein | 1518 | SOURST_E_380_Full_Protein |
| 1119 | SOURST_E_280_Trimmed_CDS | 1519 | SOURST_E_380_Trimmed_CDS |
| 1120 | SOURST_E_280_Trimmed_Protein | 1520 | SOURST_E_380_Trimmed_Protein |
| 1121 | SOURST_E_281_Full_CDS | 1521 | SOURST_E_381_Full_CDS |
| 1122 | SOURST_E_281_Full_Protein | 1522 | SOURST_E_381_Full_Protein |
| 1123 | SOURST_E_281_Trimmed_CDS | 1523 | SOURST_E_381_Trimmed_CDS |
| 1124 | SOURST_E_281_Trimmed_Protein | 1524 | SOURST_E_381_Trimmed_Protein |
| 1125 | SOURST_E_282_Full_CDS | 1525 | SOURST_E_382_Full_CDS |
| 1126 | SOURST_E_282_Full_Protein | 1526 | SOURST_E_382_Full_Protein |
| 1127 | SOURST_E_282_Trimmed_CDS | 1527 | SOURST_E_382_Trimmed_CDS |
| 1128 | SOURST_E_282_Trimmed_Protein | 1528 | SOURST_E_382_Trimmed_Protein |
| 1129 | SOURST_E_283_Full_CDS | 1529 | SOURST_E_383_Full_CDS |
| 1130 | SOURST_E_283_Full_Protein | 1530 | SOURST_E_383_Full_Protein |
| 1131 | SOURST_E_283_Trimmed_CDS | 1531 | SOURST_E_383_Trimmed_CDS |
| 1132 | SOURST_E_283_Trimmed_Protein | 1532 | SOURST_E_383_Trimmed_Protein |
| 1133 | SOURST_E_284_Full_CDS | 1533 | SOURST_E_384_Full_CDS |
| 1134 | SOURST_E_284_Full_Protein | 1534 | SOURST_E_384_Full_Protein |
| 1135 | SOURST_E_284_Trimmed_CDS | 1535 | SOURST_E_384_Trimmed_CDS |
| 1136 | SOURST_E_284_Trimmed_Protein | 1536 | SOURST_E_384_Trimmed_Protein |
| 1137 | SOURST_E_285_Full_CDS | 1537 | SOURST_E_385_Full_CDS |
| 1138 | SOURST_E_285_Full_Protein | 1538 | SOURST_E_385_Full_Protein |

FIG. 3 (Cont.)

| | | | |
|---|---|---|---|
| 1139 | SOURST_E_285_Trimmed_CDS | 1539 | SOURST_E_385_Trimmed_CDS |
| 1140 | SOURST_E_285_Trimmed_Protein | 1540 | SOURST_E_385_Trimmed_Protein |
| 1141 | SOURST_E_286_Full_CDS | 1541 | SOURST_E_386_Full_CDS |
| 1142 | SOURST_E_286_Full_Protein | 1542 | SOURST_E_386_Full_Protein |
| 1143 | SOURST_E_286_Trimmed_CDS | 1543 | SOURST_E_386_Trimmed_CDS |
| 1144 | SOURST_E_286_Trimmed_Protein | 1544 | SOURST_E_386_Trimmed_Protein |
| 1145 | SOURST_E_287_Full_CDS | 1545 | SOURST_E_387_Full_CDS |
| 1146 | SOURST_E_287_Full_Protein | 1546 | SOURST_E_387_Full_Protein |
| 1147 | SOURST_E_287_Trimmed_CDS | 1547 | SOURST_E_387_Trimmed_CDS |
| 1148 | SOURST_E_287_Trimmed_Protein | 1548 | SOURST_E_387_Trimmed_Protein |
| 1149 | SOURST_E_288_Full_CDS | 1549 | SOURST_E_388_Full_CDS |
| 1150 | SOURST_E_288_Full_Protein | 1550 | SOURST_E_388_Full_Protein |
| 1151 | SOURST_E_288_Trimmed_CDS | 1551 | SOURST_E_388_Trimmed_CDS |
| 1152 | SOURST_E_288_Trimmed_Protein | 1552 | SOURST_E_388_Trimmed_Protein |
| 1153 | SOURST_E_289_Full_CDS | 1553 | SOURST_E_389_Full_CDS |
| 1154 | SOURST_E_289_Full_Protein | 1554 | SOURST_E_389_Full_Protein |
| 1155 | SOURST_E_289_Trimmed_CDS | 1555 | SOURST_E_389_Trimmed_CDS |
| 1156 | SOURST_E_289_Trimmed_Protein | 1556 | SOURST_E_389_Trimmed_Protein |
| 1157 | SOURST_E_290_Full_CDS | 1557 | SOURST_E_390_Full_CDS |
| 1158 | SOURST_E_290_Full_Protein | 1558 | SOURST_E_390_Full_Protein |
| 1159 | SOURST_E_290_Trimmed_CDS | 1559 | SOURST_E_390_Trimmed_CDS |
| 1160 | SOURST_E_290_Trimmed_Protein | 1560 | SOURST_E_390_Trimmed_Protein |
| 1161 | SOURST_E_291_Full_CDS | 1561 | SOURST_E_391_Full_CDS |
| 1162 | SOURST_E_291_Full_Protein | 1562 | SOURST_E_391_Full_Protein |
| 1163 | SOURST_E_291_Trimmed_CDS | 1563 | SOURST_E_391_Trimmed_CDS |
| 1164 | SOURST_E_291_Trimmed_Protein | 1564 | SOURST_E_391_Trimmed_Protein |
| 1165 | SOURST_E_292_Full_CDS | 1565 | SOURST_E_392_Full_CDS |
| 1166 | SOURST_E_292_Full_Protein | 1566 | SOURST_E_392_Full_Protein |
| 1167 | SOURST_E_292_Trimmed_CDS | 1567 | SOURST_E_392_Trimmed_CDS |
| 1168 | SOURST_E_292_Trimmed_Protein | 1568 | SOURST_E_392_Trimmed_Protein |
| 1169 | SOURST_E_293_Full_CDS | 1569 | SOURST_E_393_Full_CDS |
| 1170 | SOURST_E_293_Full_Protein | 1570 | SOURST_E_393_Full_Protein |
| 1171 | SOURST_E_293_Trimmed_CDS | 1571 | SOURST_E_393_Trimmed_CDS |
| 1172 | SOURST_E_293_Trimmed_Protein | 1572 | SOURST_E_393_Trimmed_Protein |
| 1173 | SOURST_E_294_Full_CDS | 1573 | SOURST_E_394_Full_CDS |
| 1174 | SOURST_E_294_Full_Protein | 1574 | SOURST_E_394_Full_Protein |
| 1175 | SOURST_E_294_Trimmed_CDS | 1575 | SOURST_E_394_Trimmed_CDS |
| 1176 | SOURST_E_294_Trimmed_Protein | 1576 | SOURST_E_394_Trimmed_Protein |
| 1177 | SOURST_E_295_Full_CDS | 1577 | SOURST_E_395_Full_CDS |
| 1178 | SOURST_E_295_Full_Protein | 1578 | SOURST_E_395_Full_Protein |
| 1179 | SOURST_E_295_Trimmed_CDS | 1579 | SOURST_E_395_Trimmed_CDS |

FIG. 3 (Cont.)

| | | | |
|---|---|---|---|
| 1180 | SOURST_E_295_Trimmed_Protein | 1580 | SOURST_E_395_Trimmed_Protein |
| 1181 | SOURST_E_296_Full_CDS | 1581 | SOURST_E_396_Full_CDS |
| 1182 | SOURST_E_296_Full_Protein | 1582 | SOURST_E_396_Full_Protein |
| 1183 | SOURST_E_296_Trimmed_CDS | 1583 | SOURST_E_396_Trimmed_CDS |
| 1184 | SOURST_E_296_Trimmed_Protein | 1584 | SOURST_E_396_Trimmed_Protein |
| 1185 | SOURST_E_297_Full_CDS | 1585 | SOURST_E_397_Full_CDS |
| 1186 | SOURST_E_297_Full_Protein | 1586 | SOURST_E_397_Full_Protein |
| 1187 | SOURST_E_297_Trimmed_CDS | 1587 | SOURST_E_397_Trimmed_CDS |
| 1188 | SOURST_E_297_Trimmed_Protein | 1588 | SOURST_E_397_Trimmed_Protein |
| 1189 | SOURST_E_298_Full_CDS | 1589 | SOURST_E_398_Full_CDS |
| 1190 | SOURST_E_298_Full_Protein | 1590 | SOURST_E_398_Full_Protein |
| 1191 | SOURST_E_298_Trimmed_CDS | 1591 | SOURST_E_398_Trimmed_CDS |
| 1192 | SOURST_E_298_Trimmed_Protein | 1592 | SOURST_E_398_Trimmed_Protein |
| 1193 | SOURST_E_299_Full_CDS | 1593 | SOURST_E_399_Full_CDS |
| 1194 | SOURST_E_299_Full_Protein | 1594 | SOURST_E_399_Full_Protein |
| 1195 | SOURST_E_299_Trimmed_CDS | 1595 | SOURST_E_399_Trimmed_CDS |
| 1196 | SOURST_E_299_Trimmed_Protein | 1596 | SOURST_E_399_Trimmed_Protein |
| 1197 | SOURST_E_300_Full_CDS | 1597 | SOURST_E_400_Full_CDS |
| 1198 | SOURST_E_300_Full_Protein | 1598 | SOURST_E_400_Full_Protein |
| 1199 | SOURST_E_300_Trimmed_CDS | 1599 | SOURST_E_400_Trimmed_CDS |
| 1200 | SOURST_E_300_Trimmed_Protein | 1600 | SOURST_E_400_Trimmed_Protein |

PLANT PATHOGEN EFFECTOR AND DISEASE RESISTANCE GENE IDENTIFICATION, COMPOSITIONS, AND METHODS OF USE

FIELD

The compositions and methods are related to plant breeding and methods of identifying and selecting disease resistance genes and plant pathogen effector genes. Provided are methods to identify novel genes that encode plant pathogen effector proteins and proteins providing plant resistance to various diseases and uses thereof. These disease resistant genes are useful in the production of resistant plants through breeding, transgenic modification, or genome editing.

REFERENCE TO A SEQUENCE LISTING SUBMITTED AS A TEXT FILE VIA EFS-WEB

The official copy of the sequence listing is submitted concurrently with the specification as a text file via EFS-Web, in compliance with the American Standard Code for Information Interchange (ASCII), with a file name of 8052_Seq_List.txt, a creation date of Feb. 23, 2021, and a size of 1.629 mb. The sequence listing filed via EFS-Web is part of the specification and is hereby incorporated in its entirety by reference herein.

BACKGROUND

Much work has been done on the mechanisms of disease resistance in plants. Some mechanisms of resistance are non-pathogen specific in nature, or so-called "non-host resistance." These may be based on cell wall structure or similar protective mechanisms. However, while plants lack an immune system with circulating antibodies and the other attributes of a mammalian immune system, they do have other mechanisms to specifically protect against pathogens. The most important and best studied of these are the plant disease resistance genes, or "R genes." One of very many reviews of this resistance mechanism and the R genes can be found in Bekhadir et al., (2004), *Current Opinion in Plant Biology* 7:391-399. There are 5 recognized classes of R genes: intracellular proteins with a nucleotide-binding site (NBS or NB-ARC) and a leucine-rich repeat (LRR); transmembrane proteins with an extracellular LRR domain (TM-LRR); transmembrane and extracellular LRR with a cytoplasmic kinase domain (TM-CK-LRR); membrane signal anchored protein with a coiled-coil cytoplasmic domain (MSAP-CC); and membrane or wall associated kinases with an N-terminal myristylation site (MAK-N or WAK) (See, for example: Cohn, et al., (2001), *Immunology*, 13:55-62; Dangl, et al. (2001), *Nature*, 411:826-833). There is a continuous need for disease-resistant plants and methods to find disease resistant genes, therefore, there is a need for a faster method of identification of disease resistance genes with greater throughput.

SUMMARY

Compositions and methods useful in identifying and selecting plant disease resistance genes, or "R genes," are provided herein. The compositions and methods are useful in selecting resistant plants, creating transgenic resistant plants, and/or creating resistant genome edited plants. Plants having newly conferred or enhanced resistance various plant diseases as compared to control plants are also provided herein.

In some embodiments, a maize or soybean protoplast comprises a predicted pathogen effector gene, a luciferase gene, and a potential maize disease resistance gene, wherein the predicted pathogen effector gene is predicted from a computational analysis. Optionally, the predicted pathogen effector gene and the luciferase reporter gene are both expressed from a single expression vector. In another embodiment, a plant comprises a dsRNA targeting a pathogen effector protein, wherein the pathogen effector protein was identified or validated through a luciferase reporter protoplast assay. In some embodiments, a protoplast comprises as plant pathogen effector comprising an amino acid sequence of at least 95% sequence identity, when compared to SEQ ID NOs: 2, 4, 10-23, 25, 27, 29, 31, 33, 35, 37, 39, 41, 43, 45, 47, 49, 51, 53, 55, 57, 59, 61, 63, 65, 67, 69, 71, 73, 75, 77, 79, 81, 83, 85, 87, 89, 91, 93, 95, 97, 99, 101, 103, 105, 107, 109, 111, 113, 115, 117, 119, 121, 123, 125, 127, 129, 131, 133, 135, 137, 139, 141, 143, 145, 147, 149, 151, 153, 155, 157, 159, 161, 163, 165, 167, 169, 171, 173, 175, 177, 179, 181, 183, 185, 189, 191, 193, 195, 197, 199, 201, 203, 205, 207, 209, 211, 213, 215, 217, 219, 221, 223, 225, 227, 229, 231, 233, 235, 237, 239, 241, 243, 245, 247, 249, 251, 253, 255, 257, 259, 261, 263, 265, 267, 269, 271, 273, 275, 277, 279, 281, 283, 285, 289, 291, 293, 295, 297, 299, 301, 303, 305, 307, 309, 311, 313, 315, 317, 319, 321, 323, 325, 327, 329, 331, 333, 335, 337, 339, 341, 343, 345, 347, 349, 351, 353, 355, 357, 359, 361, 363, 365, 367, 369, 371, 373, 375, 377, 379, 381, 383, 385, 387, 389, 391, 393, 395, 397, 399, 401, 403, 405, 407, 409, 411, 413, 415, 417, 419, 421, 423, 425, 427, 429, 431, 433, 435, 437, 439, 441, 443, 445, 447, 449, 451, 453, 455, 457, 459, 461, 463, 465, 467, 469, 471, 473, 475, 477, 479, 481, 483, 485, 487, 489, 491, 493, 495, 497, 499, 501, 503, 505, 507, 509, 511, 513, 515, 517, 519, 521, 523, 525, 527, 529, 531, 533, 535, 537, 539, 541, 543, 545, 547, 549, 551, 553, 555, 557, 559, 561, 563, 565, 567, 569, 571, 573, 575, 577, 579, 581, 583, 585, 587, 589, 591, 593, 595, 597, 599, 601, 603, 605, 607, 609, 611, 613, 615, 617, 619, 621, 623, 625, 627, 629, 631, 633, 635, 637, 639, 641, 643, 645, 647, 649, 651, 653, 655, 657, 659, 661, 663, 665, 667, 669, 671, 673, 675, 677, 679, 681, 683, 685, 687, 689, 691, 693, 695, 697, 699, 701, 703, 705, 707, 709, 711, 713, 715, 717, 719, 721, 723, 725, 727, 729, 731, 733, 735, 737, 739, 741, 743, 745, 747, 749, 751, 753, 755, 757, 759, 761, 763, 765, 767, 769, 771, 773, 775, 777, 779, 781, 783, 785, 787, 789, 791, 793, 795, 797, 799, 801, 803, 805, 807, 809, 811, 813, 815, 817, 819, 821, 823, 825, 827, 829, 831, 833, 835, 837, 839, 841, 843, 845, 847, 849, 851, 853, 855, 857, 859, 861, 863, 865, 867, 869, 871, 873, 875, 877, 879, 881, 883, 885, 887, 889, 891, 893, 895, 897, 899, 901, 903, 905, 907, 909, 911, 913, 915, 917, 919, 921, 923, 925, 927, 929, 931, 933, 935, 937, 939, 941, 943, 945, 947, 949, 951, 953, 955, 957, 959, 961, 963, 965, 967, 969, 971, 973, 975, 977, 979, 981, 983, 985, 987, 989, 991, 993, 995, 997, 999, 1001, 1003, 1005, 1007, 1009, 1011, 1013, 1015, 1017, 1019, 1021, 1023, 1025, 1027, 1029, 1031, 1033, 1035, 1037, 1039, 1041, 1043, 1045, 1047, 1049, 1051, 1053, 1055, 1057, 1059, 1061, 1063, 1065, 1067, 1069, 1071, 1073, 1075, 1077, 1079, 1081, 1083, 1085, 1087, 1089, 1091, 1093, 1095, 1097, 1099, 1101, 1103, 1105, 1107, 1109, 1111, 1113, 1115, 1117, 1119, 1121, 1123, 1125, 1127, 1129, 1131, 1133, 1135, 1137, 1139, 1141, 1143, 1145, 1147, 1149, 1151, 1153, 1155, 1157, 1159, 1161, 1163, 1165, 1167, 1169, 1171, 1173, 1175, 1177, 1179, 1181, 1183, 1185, 1187, 1189, 1191, 1193, 1195, 1197, 1199, 1201, 1203, 1205, 1207, 1209, 1211, 1213, 1215, 1217, 1219, 1221, 1223, 1225, 1227, 1229, 1231, 1233, 1235, 1237, 1239, 1241, 1243, 1245, 1247, 1249, 1251, 1253, 1255, 1257, 1259, 1261, 1263, 1265, 1267, 1269, 1271, 1273, 1275, 1277, 1279, 1281, 1283, 1285, 1287, 1289, 1291, 1293, 1295, 1297, 1299, 1301, 1303, 1305, 1307, 1309, 1311, 1313, 1315, 1317, 1319, 1321, 1323, 1325, 1327, 1329, 1331, 1333, 1335, 1337, 1339, 1341, 1343, 1345, 1347, 1349, 1351, 1353, 1355, 1357, 1359, 1361, 1363, 1365, 1367, 1369, 1371, 1373, 1375, 1377, 1379, 1381, 1383, 1385, 1387, 1389, 1391, 1393, 1395, 1397, 1399, 1401, 1403, 1405, 1407, 1409, 1411, 1413, 1415, 1417, 1419, 1421, 1423, 1425, 1427, 1429, 1431, 1433, 1435, 1437, 1439, 1441, 1443, 1445, 1447, 1449, 1451, 1453, 1455, 1457, 1459, 1461, 1463, 1465, 1467, 1469, 1471, 1473, 1475, 1477, 1479, 1481, 1483, 1485, 1487, 1489, 1491, 1493, 1495, 1497, 1499, 1501, 1503, 1505, 1507, 1509, 1511, 1513, 1515, 1517, 1519, 1521, 1523, 1525, 1527, 1529, 1531, 1533, 1535, 1537, 1539, 1541, 1543, 1545, 1547, 1549, 1551, 1553, 1555, 1557, 1559, 1561, 1563, 1565, 1567, 1569, 1571, 1573, 1575, 1577, 1579, 1581, 1583, 1585, 1587, 1589, 1591, 1593, 1595, 1597, 1599, 1601, 1603, 1605, 1607, 1609, 1611, 1613, 1615, 1617, 1619, 1626-1628, or 1631.

In some embodiments, a plant pathogen effector comprises a polynucleotide operably linked to at least one regulatory sequence wherein said polynucleotide comprises a nucleic acid sequence encoding an amino acid sequence of at least 90% or at least 95% sequence identity, when compared to SEQ ID NO: 2, 4, 10-23, 25, 27, 29, 31, 33, 35, 37, 39, 41, 43, 45, 47, 49, 51, 53, 55, 57, 59, 61, 63, 65, 67, 69, 71, 73, 75, 77, 79, 81, 83, 85, 87, 89, 91, 93, 95, 97, 99, 101, 103, 105, 107, 109, 111, 113, 115, 117, 119, 121, 123, 125, 127, 129, 131, 133, 135, 137, 139, 141, 143, 145, 147, 149, 151, 153, 155, 157, 159, 161, 163, 165, 167, 169, 171, 173, 175, 177, 179, 181, 183, 185, 189, 191, 193, 195, 197, 199, 201, 203, 205, 207, 209, 211, 213, 215, 217, 219, 221, 223, 225, 227, 229, 231, 233, 235, 237, 239, 241, 243, 245, 247, 249, 251, 253, 255, 257, 259, 261, 263, 265, 267, 269, 271, 273, 275, 277, 279, 281, 283, 285, 289, 291, 293, 295, 297, 299, 301, 303, 305, 307, 309, 311, 313, 315, 317, 319, 321, 323, 325, 327, 329, 331, 333, 335, 337, 339, 341, 343, 345, 347, 349, 351, 353, 355, 357, 359, 361, 363, 365, 367, 369, 371, 373, 375, 377, 379, 381, 383, 385, 387, 389, 391, 393, 395, 397, 399, 401, 403, 405, 407, 409, 411, 413, 415, 417, 419, 421, 423, 425, 427, 429, 431, 433, 435, 437, 439, 441, 443, 445, 447, 449, 451, 453, 455, 457, 459, 461, 463, 465, 467, 469, 471, 473, 475, 477, 479, 481, 483, 485, 487, 489, 491, 493, 495, 497, 499, 501, 503, 505, 507, 509, 511, 513, 515, 517, 519, 521, 523, 525, 527, 529, 531, 533, 535, 537, 539, 541, 543, 545, 547, 549, 551, 553, 555, 557, 559, 561, 563, 565, 567, 569, 571, 573, 575, 577, 579, 581, 583, 585, 587, 589, 591, 593, 595, 597, 599, 601, 603, 605, 607, 609, 611, 613, 615, 617, 619, 621, 623, 625, 627, 629, 631, 633, 635, 637, 639, 641, 643, 645, 647, 649, 651, 653, 655, 657, 659, 661, 663, 665, 667, 669, 671, 673, 675, 677, 679, 681, 683, 685, 687, 689, 691, 693, 695, 697, 699, 701, 703, 705, 707, 709, 711, 713, 715, 717, 719, 721, 723, 725, 727, 729, 731, 733, 735, 737, 739, 741, 743, 745, 747, 749, 751, 753, 755, 757, 759, 761, 763, 765, 767, 769, 771, 773, 775, 777, 779, 781, 783, 785, 787, 789, 791, 793, 795, 797, 799, 801, 803, 805, 807, 809, 811, 813, 815, 817, 819, 821, 823, 825, 827, 829, 831, 833, 835, 837, 839, 841, 843, 845, 847, 849, 851, 853, 855, 857, 859, 861, 863, 865, 867, 869, 871, 873, 875, 877, 879, 881, 883, 885, 887, 889, 891, 893, 895, 897, 899, 901, 903, 905, 907, 909, 911, 913, 915, 917, 919, 921, 923, 925, 927, 929, 931, 933, 935, 937, 939, 941, 943, 945, 947, 949, 951, 953, 955, 957, 959, 961, 963, 965, 967, 969, 971, 973, 975, 977, 979, 981, 983, 985, 987, 989, 991, 993, 995, 997, 999, 1001, 1003, 1005, 1007, 1009, 1011, 1013, 1015, 1017, 1019, 1021, 1023, 1025, 1027, 1029, 1031, 1033, 1035, 1037, 1039, 1041, 1043, 1045, 1047, 1049, 1051, 1053, 1055, 1057, 1059, 1061, 1063, 1065, 1067, 1069, 1071, 1073, 1075, 1077, 1079, 1081, 1083, 1085, 1087, 1089, 1091, 1093, 1095, 1097, 1099, 1101, 1103, 1105, 1107, 1109, 1111, 1113, 1115, 1117, 1119, 1121, 1123, 1125, 1127, 1129, 1131, 1133, 1135, 1137, 1139, 1141, 1143, 1145, 1147, 1149, 1151, 1153, 1155, 1157, 1159, 1161, 1163, 1165, 1167, 1169, 1171, 1173, 1175, 1177, 1179, 1181, 1183, 1185, 1187, 1189, 1191, 1193, 1195, 1197, 1199, 1201, 1203, 1205, 1207, 1209, 1211, 1213, 1215, 1217, 1219, 1221, 1223, 1225, 1227, 1229, 1231, 1233, 1235, 1237, 1239, 1241, 1243, 1245, 1247, 1249, 1251, 1253, 1255, 1257, 1259, 1261, 1263, 1265, 1267, 1269, 1271, 1273, 1275, 1277, 1279, 1281, 1283, 1285, 1287, 1289, 1291, 1293, 1295, 1297, 1299, 1301, 1303, 1305, 1307, 1309, 1311, 1313, 1315, 1317, 1319, 1321, 1323, 1325, 1327, 1329, 1331, 1333, 1335, 1337, 1339, 1341, 1343, 1345, 1347, 1349, 1351, 1353, 1355, 1357, 1359, 1361, 1363, 1365, 1367, 1369, 1371, 1373, 1375, 1377, 1379, 1381, 1383, 1385, 1387, 1389, 1391, 1393, 1395, 1397, 1399, 1401, 1403, 1405, 1407, 1409, 1411, 1413, 1415, 1417, 1419, 1421, 1423, 1425, 1427, 1429, 1431, 1433, 1435, 1437, 1439, 1441, 1443, 1445, 1447, 1449, 1451, 1453, 1455, 1457, 1459, 1461, 1463, 1465, 1467, 1469, 1471, 1473, 1475, 1477, 1479, 1481, 1483, 1485, 1487, 1489, 1491, 1493, 1495, 1497, 1499, 1501, 1503, 1505, 1507, 1509, 1511, 1513, 1515, 1517, 1519, 1521, 1523, 1525, 1527, 1529, 1531, 1533, 1535, 1537, 1539, 1541, 1543, 1545, 1547, 1549, 1551, 1553, 1555, 1557, 1559, 1561, 1563, 1565, 1567, 1569, 1571, 1573, 1575, 1577, 1579, 1581, 1583, 1585, 1587, 1589, 1591, 1593, 1595, 1597, 1599, 1601, 1603, 1605, 1607, 1609, 1611, 1613, 1615, 1617, 1619, 1626-1628, or 1631. In some embodiments, the polynucleotide encoding SEQ ID NO: 2 or 4 comprises a nucleic acid sequence having at least 95% sequence identity to SEQ ID NO: 1 or 3.

In one embodiment, methods for identifying and/or selecting R genes are presented. In some embodiments, the methods comprise a) identifying potential effector proteins from a plant pathogen using computational analysis; b) transfecting at least one potential effector gene with a luciferase reporter gene into a maize protoplast; and c) measuring luciferase activity after transfection of the effector and luciferase reporter genes and optionally, transfecting an NLR or other disease resistance gene into the protoplast. In some embodiments, the effector gene and the luciferase reporter gene are both expressed from a single construct. In a further embodiment, the method comprises identifying a disease resistance gene that interacts with the plant pathogen effector. In some aspects, the plant protoplast is derived from a maize plant or a soybean plant. A maize plant or a soybean plant may be susceptible or resistant to the plant pathogen that produces the potential effector.

In some embodiments, a method for identifying a novel mode of action of a disease resistance gene comprising a) transfecting at least one allele of a validated plant pathogen effector gene and a luciferase reporter gene into a maize protoplast, wherein the maize protoplast is derived from a maize plant resistant to the plant pathogen; b) measuring luciferase activity; and c) selecting maize plants showing no activity in the presence of the effector protein and the luciferase reporter gene, wherein the lack of activity indicates the resistant maize plant acts in a different manner than interacting with the plant pathogen effector protein. In some embodiments the effector gene and the luciferase reporter gene are both expressed from a single construct. In some embodiments, more than one protoplast are tested which are derived from more than one maize line. In another embodiment, the method further comprises identifying a resistance gene or QTL in the selected maize plant resistant to the plant pathogen.

In some embodiments, a method of validating a causal disease resistance gene comprising a) identifying at least one potential gene in a disease resistance loci; b) transfecting a potential resistant gene from the disease resistance loci, a plant pathogen effector gene, and a luciferase gene into a maize protoplast, wherein the maize protoplast is derived from a maize plant susceptible to the plant pathogen; c) measuring luciferase activity; and d) selecting a gene that produces a hypersensitive response in the presence of the plant pathogen effector, wherein the plant pathogen effector gene has been validated as a plant pathogen effector for the disease correlated with the disease resistance loci.

In some embodiments, a method of validating a causal disease resistance gene comprising a) identifying at least one potential gene in a disease resistance loci in a disease resistance plant; b) transfecting at least one allele of a plant pathogen effector gene and a luciferase gene into a maize protoplast, wherein the maize protoplast is derived from the disease resistance plant; c) measuring luciferase activity; d) selecting a plant that produces luciferase activity in the presence of the effector gene and luciferase reporter gene; e) transfecting a potential resistant gene from the disease resistance loci of the disease resistant plant, a plant pathogen effector gene, and a luciferase gene into a maize protoplast, wherein the maize protoplast is derived from a maize plant susceptible to the plant pathogen; f) measuring luciferase activity; and g) selecting a gene that produces a hypersensitive response in the presence of the plant pathogen effector. In some embodiments, the plant pathogen effector gene has been validated as a plant pathogen effector for the disease correlated with the disease resistance loci. In another embodiment, disease resistant donor plant is a maize plant or a soybean plant.

In some embodiments, a method of selecting a disease resistant donor plant comprising a) transfecting at least one allele of a plant pathogen effector gene and a luciferase gene into a maize protoplast, wherein the maize protoplast is derived from a plant resistant to the plant pathogen; b) measuring luciferase activity; and c) selecting a maize plant that produces a hypersensitive response in the presence of the plant pathogen effector. In some embodiments, the plant pathogen effector gene has been validated as a plant pathogen effector for the disease correlated with the disease resistance loci. In another embodiment, disease resistant donor plant is a maize plant or a soybean plant.

In some embodiments, a method to identify homologous plant pathogen effectors comprising a) transfecting first allele of a plant pathogen effector gene and a luciferase gene into a maize protoplast; b) measuring luciferase activity; c) selecting a maize plant that produces a hypersensitive response in the presence of the plant pathogen effector; d) transfecting a second allele of a plant pathogen effector and a luciferase gene into a selected maize plant derived protoplast; and e) measuring luciferase activity. In some embodiments, the maize protoplast is derived from a disease resistant maize plant. In further embodiment, the method comprises transfecting at least one more different allele of a plant pathogen effector and a luciferase reporter gene into the selected maize protoplast. In some embodiments, the second allele of a plant pathogen effector was identified from a field population of plant pathogens, or the second allele of a plant pathogen effector indicates the increase in resistance in a field.

In some embodiments, a method of breeding a plant for disease resistance comprising a) transfecting at least one allele of a plant pathogen effector gene and a luciferase gene into a maize protoplast, wherein the maize protoplast is derived from at least one maize plant resistant to the plant pathogen; b) measuring luciferase activity; c) Selecting a maize plant that produces a hypersensitive response in the presence of the plant pathogen effector. In further embodiment, the method comprises crossing the selected maize plant with a second maize plant. In some embodiments, the second allele of a plant pathogen effector was identified from a field population of plant pathogens, or the second allele of a plant pathogen effector indicates the increase in resistance in a field.

In some embodiments, a method to monitor effectiveness of a disease resistance gene comprising a) transfecting a plant pathogen effector gene from a field derived pathogen strain and a luciferase gene into a maize protoplast, wherein the maize protoplast is derived from at least one maize plant resistant to the plant pathogen; b) measuring luciferase activity; c) transfecting a second allele of the plant pathogen effector gene from the same field derived pathogen strains and a luciferase reporter gene into the maize protoplast; d) measuring luciferase activity; and e) comparing luciferase activity from the first and second plant pathogen effector gene alleles.

In some embodiments, a method to identify non-host resistance genes comprising a) transfecting at least one plant pathogen effector gene and a luciferase gene into a non-host protoplast, wherein the non-host protoplast is derived from at least one plant that shows no phenotypic changes in response to the plant pathogen; b) measuring luciferase activity; and c) selecting a non-host plant that has a protoplast that produces a hypersensitive response in the presence of the plant pathogen effector. In further embodiment, the identifying a causal gene for the non-host resistance to the plant pathogen effector.

DESCRIPTION OF THE DRAWINGS

FIG. 3 shows a table of bioinformatically identified effectors.

DETAILED DESCRIPTION

Figure 1:
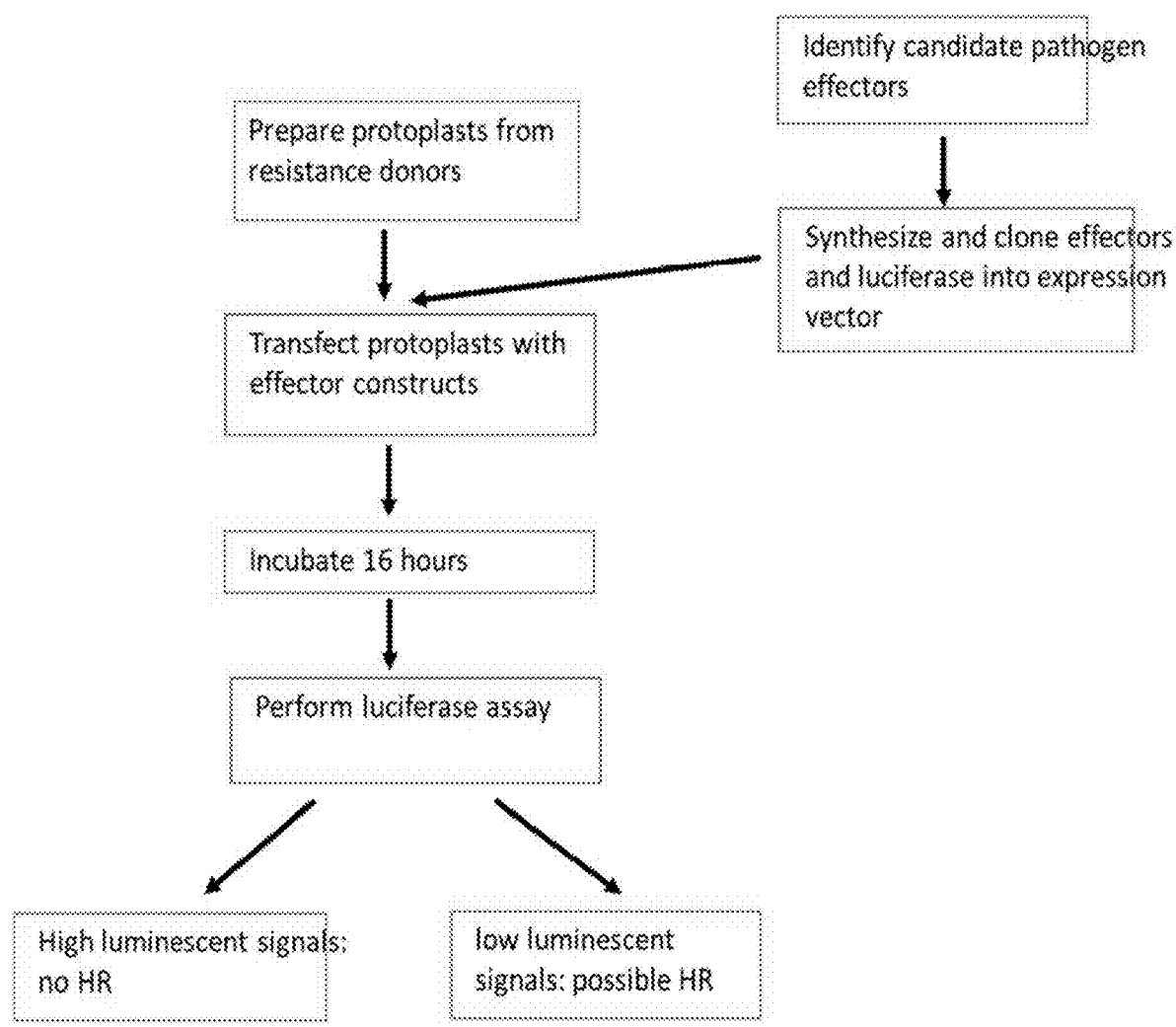
FIG. 1 shows an overall process flow chart for embodiments of a pathogen effector-protoplast luciferase assay.
Figure 2:
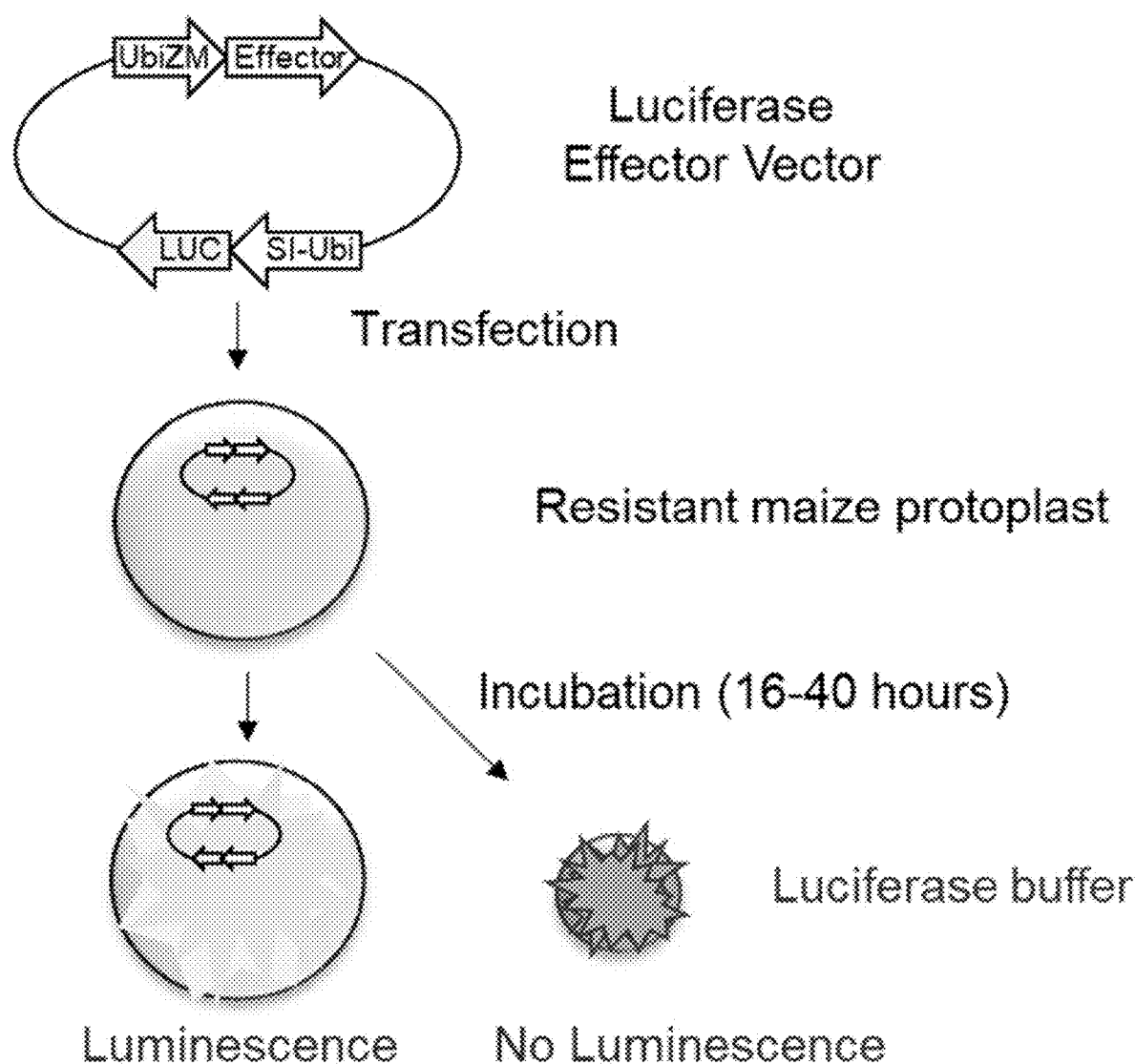
FIG. 2 shows the process for transfection of a plant pathogen effector and a luciferase reporter gene on one construct into a resistant maize protoplast and measuring luciferase activity to determine if the effector elicits a hypersensitive response in the resistant maize protoplast.

As used herein the singular forms "a", "and", and "the" include plural referents unless the context clearly dictates otherwise. Thus, for example, reference to "a cell" includes a plurality of such cells and reference to "the protein" includes reference to one or more proteins and equivalents thereof, and so forth. All technical and scientific terms used herein have the same meaning as commonly understood to one of ordinary skill in the art to which this disclosure belongs unless clearly indicated otherwise.

For successful colonization or infection of host plants, plant pathogens must block host defenses or immune responses. The first line of defense in the plant immune system is a basal defense response that is triggered by pathogen-associated molecular patterns (PAMPs), conserved molecular features among pathogens (e.g. chitin for fungi). PAMP-triggered immunity (PTI) involves cell surface pattern recognition receptors (PRRs). Pathogens secrete effectors, which are generally small unique protein with no known functions, to modulate host cell physiology, suppress PTI and promote susceptibility. In turn, plants have developed a second line of defense, effector-triggered immunity (ETI), which involves the detection of specific avirulence effectors by intracellular receptors. These intracellular immune receptors are nucleotide-binding domain and leucine-rich repeat (NLR) proteins. NLRs recognize their cognate effectors either through direct interaction or through indirect detection. This recognition usually triggers the hypersensitive response (HR), a programmed cell death and the hallmark of ETI.

The NBS-LRR ("NLR") group of R-genes is the largest class of R-genes discovered to date. In *Arabidopsis thaliana*, over 150 are predicted to be present in the genome (Meyers, et al., (2003), Plant Cell, 15:809-834; Monosi, et al., (2004), Theoretical and Applied Genetics, 109:1434-1447), while in rice, approximately 500 NLR genes have been predicted (Monosi, (2004) supra). The NBS-LRR class of R genes is comprised of two subclasses. Class 1 NLR genes contain a TIR-Toll/Interleukin-1 like domain at their N' terminus; which to date have only been found in dicots (Meyers, (2003) supra; Monosi, (2004) supra). The second class of NBS-LRR contain either a coiled-coil domain or an (nt) domain at their N terminus (Bai, et al. (2002) Genome Research, 12:1871-1884; Monosi, (2004) supra; Pan, et al., (2000), Journal of Molecular Evolution, 50:203-213). Class 2 NBS-LRR have been found in both dicot and monocot species. (Bai, (2002) supra; Meyers, (2003) supra; Monosi, (2004) supra; Pan, (2000) supra).

The NBS domain of the gene appears to have a role in signaling in plant defense mechanisms (van der Biezen, et al., (1998), Current Biology: CB, 8:R226-R227). The LRR region appears to be the region that interacts with the pathogen AVR products (Michelmore, et al., (1998), Genome Res., 8:1113-1130; Meyers, (2003) supra). This LRR region in comparison with the NB-ARC (NBS) domain is under a much greater selection pressure to diversify (Michelmore, (1998) supra; Meyers, (2003) supra; Palomino, et al., (2002), Genome Research, 12:1305-1315). LRR domains are found in other contexts as well; these 20-29-residue motifs are present in tandem arrays in a number of proteins with diverse functions, such as hormone-receptor interactions, enzyme inhibition, cell adhesion and cellular trafficking. A number of recent studies revealed the involvement of LRR proteins in early mammalian development, neural development, cell polarization, regulation of gene expression and apoptosis signaling.

A resistance gene of the embodiments of the present disclosure encodes a novel R gene. The most numerous R genes correspond to the NBS-LRR type. There have also been many identified WAK type R genes. While multiple NBS-LRR genes have been described, they may differ widely in their response to different pathogens and exact action.

Positional cloning (or map-based cloning) has been the major method in identifying causal genes responsible for variations in disease resistance. In this approach, a resistance line is crossed to a susceptible line to generate a mapping population segregating for resistance and susceptibility. Linkage mapping is performed with genotyping and phenotyping data to detect disease QTL (Quantitative Trait Loci), or a disease resistance loci. A major disease QTL is "mendenlized" through back-crossing to the susceptible parents and validated. A validated QTL is then fine mapped into a small interval with a large segregating population (typically with over 3000 individuals). Sequences covering the QTL interval are obtained from the resistance line via BAC clone identification/sequencing or genome sequencing. The genome sequence is annotated, candidate genes identified and tested in transgenic plants. The candidate gene conferring resistance in transgenic plants is the causal gene underlying the disease QTL.

As used to herein, "disease resistant" or "have resistance to a disease" refers to a plant showing increase resistance to a disease compared to a control plant, which is a susceptible plant. Disease resistance may manifest in fewer and/or smaller lesions, increased plant health, increased yield, increased root mass, increased plant vigor, less or no discoloration, increased growth, reduced necrotic area, or reduced wilting.

Disease affecting maize plants include, but are not limited to, bacterial leaf blight and stalk rot; bacterial leaf spot; bacterial stripe; chocolate spot; goss's bacterial wilt and blight; holcus spot; purple leaf sheath; seed rot-seedling blight; bacterial wilt; corn stunt; anthracnose leaf blight; anthracnose stalk rot; aspergillus ear and kernel rot; banded leaf and sheath spot; black bundle disease; black kernel rot; borde blanco; brown spot; black spot; stalk rot; cephalosporium kernel rot; charcoal rot; corticium ear rot; curvularia leaf spot; didymella leaf spot; diplodia ear rot and stalk rot; diplodia ear rot; seed rot; corn seedling blight; diplodia leaf spot or leaf streak; downy mildews; brown stripe downy mildew; crazy top downy mildew; green ear downy mildew; graminicola downy mildew; java downy mildew; philippine downy mildew; sorghum downy mildew; spontaneum downy mildew; sugarcane downy mildew; dry ear rot; ergot; horse's tooth; corn eyespot; fusarium ear and stalk rot; fusarium blight; seedling root rot; gibberella ear and stalk rot; gray ear rot; gray leaf spot; cercospora leaf spot; helminthosporium root rot; hormodendrum ear rot; cladosporium rot; hyalothyridium leaf spot; late wilt; northern leaf blight; white blast; crown stalk rot; corn stripe; northern leaf spot; helminthosporium ear rot; penicillium ear rot; corn blue eye; blue mold; phaeocytostroma stalk rot and root rot; phaeosphaeria leaf spot; physalospora ear rot; botryosphaeria ear rot; pyrenochaeta stalk rot and root rot; pythium root rot; pythium stalk rot; red kernel disease; rhizoctonia ear rot; sclerotial rot; rhizoctonia root rot and stalk rot; rostratum leaf spot; common corn rust; southern corn rust; tropical corn rust; sclerotium ear rot; southern blight; selenophoma leaf spot; sheath rot; shuck rot; silage mold; common smut; false smut; head smut; southern corn leaf blight and stalk rot; southern leaf spot; tar spot; trichoderma ear rot and root rot; white ear rot, root and stalk rot; yellow leaf blight; zonate leaf spot; american wheat striate (wheat striate mosaic); barley stripe mosaic; barley yellow dwarf; brome mosaic; cereal chlorotic mottle; lethal necrosis (maize lethal necrosis disease); cucumber mosaic; johnsongrass mosaic; maize bushy stunt; maize chlorotic dwarf; maize chlorotic mottle; maize dwarf mosaic; maize leaf fleck; maize pellucid ringspot; maize rayado fino; maize red leaf and red stripe; maize red stripe; maize ring mottle; maize rough dwarf; maize sterile stunt; maize streak; maize stripe; maize tassel abortion; maize vein enation; maize wallaby ear; maize white leaf; maize white line mosaic; millet red leaf; and northern cereal mosaic.

Disease affecting rice plants include, but are not limited to, bacterial blight; bacterial leaf streak; foot rot; grain rot; sheath brown rot; blast; brown spot; crown sheath rot; downy mildew; eyespot; false smut; kernel smut; leaf smut; leaf scald; narrow brown leaf spot; root rot; seedling blight; sheath blight; sheath rot; sheath spot; alternaria leaf spot; and stem rot.

Disease affecting soybean plants include, but are not limited to, alternaria leaf spot; anthracnose; black leaf blight; black root rot; brown spot; brown stem rot; charcoal rot; choanephora leaf blight; downy mildew; drechslera blight; frogeye leaf spot; leptosphaerulina leaf spot; mycoleptodiscus root rot; neocosmospora stem rot; phomopsis seed decay; phytophthora root and stem rot; phyllosticta leaf spot; phymatotrichum root rot; pod and stem blight; powdery mildew; purple seed stain; pyrenochaeta leaf spot; pythium rot; red crown rot; dactuliophora leaf spot; rhizoctonia aerial blight; rhizoctonia root and stem rot; rust; scab; sclerotinia stem rot; sclerotium blight; stem canker; stemphylium leaf blight; sudden death syndrome; target spot; yeast spot; lance nematode; lesion nematode; pin nematode; reniform nematode; ring nematode; root-knot nematode; sheath nematode; cyst nematode; spiral nematode; sting nematode; stubby root nematode; stunt nematode; alfalfa mosaic; bean pod mottle; bean yellow mosaic; brazilian bud blight; chlorotic mottle; yellow mosaic; peanut mottle; peanut stripe; peanut stunt; chlorotic mottle; crinkle leaf; dwarf; severe stunt; and tobacco ringspot or bud blight.

Disease affecting canola plants include, but are not limited to, bacterial black rot; bacterial leaf spot; bacterial pod rot; bacterial soft rot; scab; crown gall; alternaria black spot; anthracnose; black leg; black mold rot; black root; brown girdling root rot; cercospora leaf spot; clubroot; downy mildew; fusarium wilt; gray mold; head rot; leaf spot; light leaf spot; pod rot; powdery mildew; ring spot; root rot; sclerotinia stem rot; seed rot, damping-off; root gall smut; southern blight; verticillium wilt; white blight; white leaf spot; staghead; yellows; crinkle virus; mosaic virus; yellows virus;

Disease affecting sunflower plants include, but are not limited to, apical chlorosis; bacterial leaf spot; bacterial wilt; crown gall; erwinia stalk rot and head rot; lternaria leaf blight, stem spot and head rot; botrytis head rot; charcoal rot; downy mildew; fusarium stalk rot; fusarium wilt; myrothecium leaf and stem spot; phialophora yellows; phoma black stem; phomopsis brown stem canker; phymatotrichum root rot; phytophthora stem rot; powdery mildew; pythium seedling blight and root rot; rhizoctonia seedling blight; rhizopus head rot; sunflower rust; sclerotium basal stalk and root rot; septoria leaf spot; verticillium wilt; white rust; yellow rust; dagger; pin; lesion; reniform; root knot; and chlorotic mottle;

Disease affecting sorghum plants include, but are not limited to, bacterial leaf spot; bacterial leaf streak; bacterial leaf stripe; acremonium wilt; anthracnose; charcoal rot; crazy top downy mildew; damping-off and seed rot; ergot; fusarium head blight, root and stalk rot; grain storage mold; gray leaf spot; latter leaf spot; leaf blight; milo disease; oval leaf spot; pokkah boeng; pythium root rot; rough leaf spot; rust; seedling blight and seed rot; smut, covered kernel; smut, head; smut, loose kernel; sooty stripe; downy mildew; tar spot; target leaf spot; and zonate leaf spot and sheath blight.

A plant having disease resistance may have 5, 10, 15, 20, 25, 30, 35, 40, 45, 50, 55, 60, 65, 70, 75, 80, 85, 90, 95, or 100% increased resistance to a disease compared to a control plant. In some embodiments, a plant may have 5, 10, 15, 20, 25, 30, 35, 40, 45, 50, 55, 60, 65, 70, 75, 80, 85, 90, 95, or 100% increased plant health in the presence of a disease compared to a control plant As used herein, the term "clustering" or "clustering approach" means pooling and clustering sequences in a location-agnostic manner using a nearest neighbor joining algorithm, hierarchical clustering such as Ward's method, a maximum likelihood method, or any other clustering algorithm or method.

The term "crossed" or "cross" refers to a sexual cross and involved the fusion of two haploid gametes via pollination to produce diploid progeny (e.g., cells, seeds or plants). The term encompasses both the pollination of one plant by another and selfing (or self-pollination, e.g., when the pollen and ovule are from the same plant).

An "elite line" is any line that has resulted from breeding and selection for superior agronomic performance.

An "exotic strain," a "tropical line," or an "exotic germplasm" is a strain derived from a plant not belonging to an available elite line or strain of germplasm. In the context of a cross between two plants or strains of germplasm, an exotic germplasm is not closely related by descent to the elite germplasm with which it is crossed. Most commonly, the exotic germplasm is not derived from any known elite line, but rather is selected to introduce novel genetic elements (typically novel alleles) into a breeding program.

A "favorable allele" is the allele at a particular locus (a marker, a QTL, a gene etc.) that confers, or contributes to, an agronomically desirable phenotype, e.g., disease resistance, and that allows the identification of plants with that agronomically desirable phenotype. A favorable allele of a marker is a marker allele that segregates with the favorable phenotype.

"Genetic markers" are nucleic acids that are polymorphic in a population and where the alleles of which can be detected and distinguished by one or more analytic methods, e.g., RFLP, AFLP, isozyme, SNP, SSR, and the like. The term also refers to nucleic acid sequences complementary to the genomic sequences, such as nucleic acids used as probes. Markers corresponding to genetic polymorphisms between members of a population can be detected by methods well-established in the art. These include, e.g., PCR-based sequence specific amplification methods, detection of restriction fragment length polymorphisms (RFLP), detection of isozyme markers, detection of polynucleotide polymorphisms by allele specific hybridization (ASH), detection of amplified variable sequences of the plant genome, detection of self-sustained sequence replication, detection of simple sequence repeats (SSRs), detection of single nucleotide polymorphisms (SNPs), or detection of amplified fragment length polymorphisms (AFLPs). Well established methods are also known for the detection of expressed sequence tags (ESTs) and SSR markers derived from EST sequences and randomly amplified polymorphic DNA (RAPD).

"Germplasm" refers to genetic material of or from an individual (e.g., a plant), a group of individuals (e.g., a plant line, variety or family), or a clone derived from a line, variety, species, or culture, or more generally, all individuals within a species or for several species (e.g., maize germplasm collection or Andean germplasm collection). The germplasm can be part of an organism or cell, or can be separate from the organism or cell. In general, germplasm provides genetic material with a specific molecular makeup that provides a physical foundation for some or all of the hereditary qualities of an organism or cell culture. As used herein, germplasm includes cells, seed or tissues from which new plants may be grown, or plant parts, such as leafs, stems, pollen, or cells, that can be cultured into a whole plant.

A "haplotype" is the genotype of an individual at a plurality of genetic loci, i.e. a combination of alleles. Typically, the genetic loci described by a haplotype are physically and genetically linked, i.e., on the same chromosome segment.

The term "heterogeneity" is used to indicate that individuals within the group differ in genotype at one or more specific loci.

The heterotic response of material, or "heterosis", can be defined by performance which exceeds the average of the parents (or high parent) when crossed to other dissimilar or unrelated groups.

A "heterotic group" comprises a set of genotypes that perform well when crossed with genotypes from a different heterotic group (Hallauer et al. (1998) Corn breeding, p. 463-564. In G. F. Sprague and J. W. Dudley (ed.) *Corn and corn improvement*). Inbred lines are classified into heterotic groups, and are further subdivided into families within a heterotic group, based on several criteria such as pedigree, molecular marker-based associations, and performance in hybrid combinations (Smith et al. (1990) *Theor. Appl. Gen.* 80:833-840). The two most widely used heterotic groups in the United States are referred to as "Iowa Stiff Stalk Synthetic" (also referred to herein as "stiff stalk") and "Lancaster" or "Lancaster Sure Crop" (sometimes referred to as NSS, or non-Stiff Stalk).

Some heterotic groups possess the traits needed to be a female parent, and others, traits for a male parent. For example, in maize, yield results from public inbreds released from a population called BSSS (Iowa Stiff Stalk Synthetic population) has resulted in these inbreds and their derivatives becoming the female pool in the central Corn Belt. BSSS inbreds have been crossed with other inbreds, e.g. SD 105 and Maiz Amargo, and this general group of materials has become known as Stiff Stalk Synthetics (SSS) even though not all of the inbreds are derived from the original BSSS population (Mikel and Dudley (2006) *Crop Sci:* 46:1193-1205). By default, all other inbreds that combine well with the SSS inbreds have been assigned to the male pool, which for lack of a better name has been designated as NSS, i.e. Non-Stiff Stalk. This group includes several major heterotic groups such as Lancaster Surecrop, Iodent, and Leaming Corn.

The term "homogeneity" indicates that members of a group have the same genotype at one or more specific loci.

The term "hybrid" refers to the progeny obtained between the crossing of at least two genetically dissimilar parents.

The term "inbred" refers to a line that has been bred for genetic homogeneity.

The term "indel" refers to an insertion or deletion, wherein one line may be referred to as having an inserted nucleotide or piece of DNA relative to a second line, or the second line may be referred to as having a deleted nucleotide or piece of DNA relative to the first line.

The term "introgression" refers to the transmission of a desired allele of a genetic locus from one genetic background to another. For example, introgression of a desired allele at a specified locus can be transmitted to at least one progeny via a sexual cross between two parents of the same species, where at least one of the parents has the desired allele in its genome. Alternatively, for example, transmission of an allele can occur by recombination between two donor genomes, e.g., in a fused protoplast, where at least one of the donor protoplasts has the desired allele in its genome. The desired allele can be, e.g., detected by a marker that is associated with a phenotype, at a QTL, a transgene, or the like. In any case, offspring comprising the desired allele can be repeatedly backcrossed to a line having a desired genetic background and selected for the desired allele, to result in the allele becoming fixed in a selected genetic background.

The process of "introgressing" is often referred to as "backcrossing" when the process is repeated two or more times.

A "line" or "strain" is a group of individuals of identical parentage that are generally inbred to some degree and that are generally homozygous and homogeneous at most loci (isogenic or near isogenic). A "subline" refers to an inbred subset of descendants that are genetically distinct from other similarly inbred subsets descended from the same progenitor.

As used herein, the term "linkage" is used to describe the degree with which one marker locus is associated with another marker locus or some other locus. The linkage relationship between a molecular marker and a locus affecting a phenotype is given as a "probability" or "adjusted probability". Linkage can be expressed as a desired limit or range. For example, in some embodiments, any marker is linked (genetically and physically) to any other marker when the markers are separated by less than 50, 40, 30, 25, 20, or 15 map units (or cM) of a single meiosis map (a genetic map based on a population that has undergone one round of meiosis, such as e.g. an $F_2$; the IBM2 maps consist of multiple meiosis). In some aspects, it is advantageous to define a bracketed range of linkage, for example, between 10 and 20 cM, between 10 and 30 cM, or between 10 and 40 cM. The more closely a marker is linked to a second locus, the better an indicator for the second locus that marker becomes. Thus, "closely linked loci" such as a marker locus and a second locus display an inter-locus recombination frequency of 10% or less, preferably about 9% or less, still more preferably about 8% or less, yet more preferably about 7% or less, still more preferably about 6% or less, yet more preferably about 5% or less, still more preferably about 4% or less, yet more preferably about 3% or less, and still more preferably about 2% or less. In highly preferred embodiments, the relevant loci display a recombination frequency of about 1% or less, e.g., about 0.75% or less, more preferably about 0.5% or less, or yet more preferably about 0.25% or less. Two loci that are localized to the same chromosome, and at such a distance that recombination between the two loci occurs at a frequency of less than 10% (e.g., about 9%, 8%, 7%, 6%, 5%, 4%, 3%, 2%, 1%, 0.75%, 0.5%, 0.25%, or less) are also said to be "in proximity to" each other. Since one cM is the distance between two markers that show a 1% recombination frequency, any marker is closely linked (genetically and physically) to any other marker that is in close proximity, e.g., at or less than 10 cM distant. Two closely linked markers on the same chromosome can be positioned 9, 8, 7, 6, 5, 4, 3, 2, 1, 0.75, 0.5 or 0.25 cM or less from each other.

The term "linkage disequilibrium" refers to a non-random segregation of genetic loci or traits (or both). In either case, linkage disequilibrium implies that the relevant loci are within sufficient physical proximity along a length of a chromosome so that they segregate together with greater than random (i.e., non-random) frequency. Markers that show linkage disequilibrium are considered linked. Linked loci co-segregate more than 50% of the time, e.g., from about 51% to about 100% of the time. In other words, two markers that co-segregate have a recombination frequency of less than 50% (and by definition, are separated by less than 50 cM on the same linkage group.) As used herein, linkage can be between two markers, or alternatively between a marker and a locus affecting a phenotype. A marker locus can be "associated with" (linked to) a trait. The degree of linkage of a marker locus and a locus affecting a phenotypic trait is measured, e.g., as a statistical probability of co-segregation of that molecular marker with the phenotype (e.g., an F statistic or LOD score).

Linkage disequilibrium is most commonly assessed using the measure $r^2$, which is calculated using the formula described by Hill, W. G. and Robertson, A, Theor. Appl. Genet. 38:226-231(1968). When $r^2=1$, complete LD exists between the two marker loci, meaning that the markers have not been separated by recombination and have the same allele frequency. The $r^2$ value will be dependent on the population used. Values for $r^2$ above ⅓ indicate sufficiently strong LD to be useful for mapping (Ardlie et al., Nature Reviews Genetics 3:299-309 (2002)). Hence, alleles are in linkage disequilibrium when $r^2$ values between pairwise marker loci are greater than or equal to 0.33, 0.4, 0.5, 0.6, 0.7, 0.8, 0.9, or 1.0.

As used herein, "linkage equilibrium" describes a situation where two markers independently segregate, i.e., sort among progeny randomly. Markers that show linkage equilibrium are considered unlinked (whether or not they lie on the same chromosome).

A "locus" is a position on a chromosome, e.g. where a nucleotide, gene, sequence, or marker is located.

The "logarithm of odds (LOD) value" or "LOD score" (Risch, Science 255:803-804 (1992)) is used in genetic interval mapping to describe the degree of linkage between two marker loci. A LOD score of three between two markers indicates that linkage is 1000 times more likely than no linkage, while a LOD score of two indicates that linkage is 100 times more likely than no linkage. LOD scores greater than or equal to two may be used to detect linkage. LOD scores can also be used to show the strength of association between marker loci and quantitative traits in "quantitative trait loci" mapping. In this case, the LOD score's size is dependent on the closeness of the marker locus to the locus affecting the quantitative trait, as well as the size of the quantitative trait effect.

The term "plant" includes whole plants, plant cells, plant protoplast, plant cell or tissue culture from which plants can be regenerated, plant calli, plant clumps and plant cells that are intact in plants or parts of plants, such as seeds, flowers, cotyledons, leaves, stems, buds, roots, root tips and the like. As used herein, a "modified plant" means any plant that has a genetic change due to human intervention. A modified plant may have genetic changes introduced through plant transformation, genome editing, or conventional plant breeding A "marker" is a means of finding a position on a genetic or physical map, or else linkages among markers and trait loci (loci affecting traits). The position that the marker detects may be known via detection of polymorphic alleles and their genetic mapping, or else by hybridization, sequence match or amplification of a sequence that has been physically mapped. A marker can be a DNA marker (detects DNA polymorphisms), a protein (detects variation at an encoded polypeptide), or a simply inherited phenotype (such as the 'waxy' phenotype). A DNA marker can be developed from genomic nucleotide sequence or from expressed nucleotide sequences (e.g., from a spliced RNA or a cDNA). Depending on the DNA marker technology, the marker will consist of complementary primers flanking the locus and/or complementary probes that hybridize to polymorphic alleles at the locus. A DNA marker, or a genetic marker, can also be used to describe the gene, DNA sequence or nucleotide on the chromosome itself (rather than the components used to detect the gene or DNA sequence) and is often used when that DNA marker is associated with a particular trait in human genetics (e.g. a marker for breast cancer). The term marker locus is the locus (gene, sequence or nucleotide) that the marker detects.

Markers that detect genetic polymorphisms between members of a population are well-established in the art. Markers can be defined by the type of polymorphism that they detect and also the marker technology used to detect the polymorphism. Marker types include but are not limited to, e.g., detection of restriction fragment length polymorphisms (RFLP), detection of isozyme markers, randomly amplified polymorphic DNA (RAPD), amplified fragment length polymorphisms (AFLPs), detection of simple sequence repeats (SSRs), detection of amplified variable sequences of the plant genome, detection of self-sustained sequence replication, or detection of single nucleotide polymorphisms (SNPs). SNPs can be detected e.g. via DNA sequencing, PCR-based sequence specific amplification methods, detection of polynucleotide polymorphisms by allele specific hybridization (ASH), dynamic allele-specific hybridization (DASH), molecular beacons, microarray hybridization, oligonucleotide ligase assays, Flap endonucleases, 5' endonucleases, primer extension, single strand conformation polymorphism (SSCP) or temperature gradient gel electrophoresis (TGGE). DNA sequencing, such as the pyrosequencing technology has the advantage of being able to detect a series of linked SNP alleles that constitute a haplotype. Haplotypes tend to be more informative (detect a higher level of polymorphism) than SNPs.

A "marker allele", alternatively an "allele of a marker locus", can refer to one of a plurality of polymorphic nucleotide sequences found at a marker locus in a population.

"Marker assisted selection" (of MAS) is a process by which individual plants are selected based on marker genotypes.

"Marker assisted counter-selection" is a process by which marker genotypes are used to identify plants that will not be selected, allowing them to be removed from a breeding program or planting.

A "marker haplotype" refers to a combination of alleles at a marker locus.

A "marker locus" is a specific chromosome location in the genome of a species where a specific marker can be found. A marker locus can be used to track the presence of a second linked locus, e.g., one that affects the expression of a phenotypic trait. For example, a marker locus can be used to monitor segregation of alleles at a genetically or physically linked locus.

The term "molecular marker" may be used to refer to a genetic marker, as defined above, or an encoded product thereof (e.g., a protein) used as a point of reference when identifying a linked locus. A marker can be derived from genomic nucleotide sequences or from expressed nucleotide sequences (e.g., from a spliced RNA, a cDNA, etc.), or from an encoded polypeptide. The term also refers to nucleic acid sequences complementary to or flanking the marker sequences, such as nucleic acids used as probes or primer pairs capable of amplifying the marker sequence. A "molecular marker probe" is a nucleic acid sequence or molecule that can be used to identify the presence of a marker locus, e.g., a nucleic acid probe that is complementary to a marker locus sequence. Alternatively, in some aspects, a marker probe refers to a probe of any type that is able to distinguish (i.e., genotype) the particular allele that is present at a marker locus. Nucleic acids are "complementary" when they specifically hybridize in solution. Some of the markers described herein are also referred to as hybridization markers when located on an indel region, such as the non-collinear region described herein. This is because the insertion region is, by definition, a polymorphism vis a vis a plant without the insertion. Thus, the marker need only indicate whether the indel region is present or absent. Any suitable marker detection technology may be used to identify such a hybridization marker, e.g. SNP technology is used in the examples provided herein.

An allele "negatively" correlates with a trait when it is linked to it and when presence of the allele is an indicator that a desired trait or trait form will not occur in a plant comprising the allele.

The term "phenotype", "phenotypic trait", or "trait" can refer to the observable expression of a gene or series of genes. The phenotype can be observable to the naked eye, or by any other means of evaluation known in the art, e.g., weighing, counting, measuring (length, width, angles, etc.), microscopy, biochemical analysis, or an electromechanical assay. In some cases, a phenotype is directly controlled by a single gene or genetic locus, i.e., a "single gene trait" or a "simply inherited trait". In the absence of large levels of environmental variation, single gene traits can segregate in a population to give a "qualitative" or "discrete" distribution, i.e. the phenotype falls into discrete classes. In other cases, a phenotype is the result of several genes and can be considered a "multigenic trait" or a "complex trait". Multigenic traits segregate in a population to give a "quantitative" or "continuous" distribution, i.e. the phenotype cannot be separated into discrete classes. Both single gene and multigenic traits can be affected by the environment in which they are being expressed, but multigenic traits tend to have a larger environmental component.

A "physical map" of the genome is a map showing the linear order of identifiable landmarks (including genes, markers, etc.) on chromosome DNA. However, in contrast to genetic maps, the distances between landmarks are absolute (for example, measured in base pairs or isolated and overlapping contiguous genetic fragments) and not based on genetic recombination (that can vary in different populations).

A "polymorphism" is a variation in the DNA between two or more individuals within a population. A polymorphism preferably has a frequency of at least 1% in a population. A useful polymorphism can include a single nucleotide polymorphism (SNP), a simple sequence repeat (SSR), or an insertion/deletion polymorphism, also referred to herein as an "indel".

A "production marker" or "production SNP marker" is a marker that has been developed for high-throughput purposes. Production SNP markers are developed to detect specific polymorphisms and are designed for use with a variety of chemistries and platforms.

The term "quantitative trait locus" or "QTL" refers to a region of DNA that is associated with the differential expression of a quantitative phenotypic trait in at least one genetic background, e.g., in at least one breeding population. The region of the QTL encompasses or is closely linked to the gene or genes that affect the trait in question.

A "reference sequence" or a "consensus sequence" is a defined sequence used as a basis for sequence comparison. The reference sequence for a marker is obtained by sequencing a number of lines at the locus, aligning the nucleotide sequences in a sequence alignment program (e.g. Sequencher), and then obtaining the most common nucleotide sequence of the alignment. Polymorphisms found among the individual sequences are annotated within the consensus sequence. A reference sequence is not usually an exact copy of any individual DNA sequence, but represents an amalgam of available sequences and is useful for designing primers and probes to polymorphisms within the sequence.

An "unfavorable allele" of a marker is a marker allele that segregates with the unfavorable plant phenotype, therefore providing the benefit of identifying plants that can be removed from a breeding program or planting.

The term "yield" refers to the productivity per unit area of a particular plant product of commercial value. Yield is affected by both genetic and environmental factors. "Agronomics", "agronomic traits", and "agronomic performance" refer to the traits (and underlying genetic elements) of a given plant variety that contribute to yield over the course of growing season. Individual agronomic traits include emergence vigor, vegetative vigor, stress tolerance, disease resistance or tolerance, herbicide resistance, branching, flowering, seed set, seed size, seed density, standability, threshability and the like. Yield is, therefore, the final culmination of all agronomic traits.

Marker loci that demonstrate statistically significant co-segregation with a disease resistance trait that confers broad resistance against a specified disease or diseases are provided herein. Detection of these loci or additional linked loci and the resistance gene may be used in marker assisted selection as part of a breeding program to produce plants that have resistance to a disease or diseases.

Genetic Mapping

It has been recognized for quite some time that specific genetic loci correlating with particular phenotypes, such as disease resistance, can be mapped in an organism's genome. The plant breeder can advantageously use molecular markers to identify desired individuals by detecting marker alleles that show a statistically significant probability of co-segregation with a desired phenotype, manifested as linkage disequilibrium. By identifying a molecular marker or clusters of molecular markers that co-segregate with a trait of interest, the breeder is able to rapidly select a desired phenotype by selecting for the proper molecular marker allele (a process called marker-assisted selection, or MAS).

A variety of methods well known in the art are available for detecting molecular markers or clusters of molecular markers that co-segregate with a trait of interest, such as a disease resistance trait. The basic idea underlying these methods is the detection of markers, for which alternative genotypes (or alleles) have significantly different average phenotypes. Thus, one makes a comparison among marker loci of the magnitude of difference among alternative genotypes (or alleles) or the level of significance of that difference. Trait genes are inferred to be located nearest the marker(s) that have the greatest associated genotypic difference. Two such methods used to detect trait loci of interest are: 1) Population-based association analysis (i.e. association mapping) and 2) Traditional linkage analysis.

Association Mapping

Understanding the extent and patterns of linkage disequilibrium (LD) in the genome is a prerequisite for developing efficient association approaches to identify and map quantitative trait loci (QTL). Linkage disequilibrium (LD) refers to the non-random association of alleles in a collection of individuals. When LD is observed among alleles at linked loci, it is measured as LD decay across a specific region of a chromosome. The extent of the LD is a reflection of the recombinational history of that region. The average rate of LD decay in a genome can help predict the number and density of markers that are required to undertake a genome-wide association study and provides an estimate of the resolution that can be expected.

Association or LD mapping aims to identify significant genotype-phenotype associations. It has been exploited as a powerful tool for fine mapping in outcrossing species such as humans (Corder et al. (1994) "Protective effect of apolipoprotein-E type-2 allele for late-onset Alzheimer-disease," Nat Genet 7:180-184; Hastbacka et al. (1992) "Linkage disequilibrium mapping in isolated founder populations: diastrophic dysplasia in Finland," Nat Genet 2:204-211; Kerem et al. (1989) "Identification of the cystic fibrosis gene: genetic analysis," Science 245:1073-1080) and maize (Remington et al., (2001) "Structure of linkage disequilibrium and phenotype associations in the maize genome,"Proc Natl Acad Sci USA 98:11479-11484; Thornsberry et al. (2001) "Dwarf8 polymorphisms associate with variation in flowering time," Nat Genet 28:286-289; reviewed by Flint-Garcia et al. (2003) "Structure of linkage disequilibrium in plants," Annu Rev Plant Biol. 54:357-374), where recombination among heterozygotes is frequent and results in a rapid decay of LD. In inbreeding species where recombination among homozygous genotypes is not genetically detectable, the extent of LD is greater (i.e., larger blocks of linked markers are inherited together) and this dramatically enhances the detection power of association mapping (Wall and Pritchard (2003) "Haplotype blocks and linkage disequilibrium in the human genome," Nat Rev Genet 4:587-597).

The recombinational and mutational history of a population is a function of the mating habit as well as the effective size and age of a population. Large population sizes offer enhanced possibilities for detecting recombination, while older populations are generally associated with higher levels of polymorphism, both of which contribute to observably accelerated rates of LD decay. On the other hand, smaller effective population sizes, e.g., those that have experienced a recent genetic bottleneck, tend to show a slower rate of LD decay, resulting in more extensive haplotype conservation (Flint-Garcia et al. (2003) "Structure of linkage disequilibrium in plants," Annu Rev Plant Biol. 54:357-374).

Elite breeding lines provide a valuable starting point for association analyses. Association analyses use quantitative phenotypic scores (e.g., disease tolerance rated from one to nine for each line) in the analysis (as opposed to looking only at tolerant versus resistant allele frequency distributions in intergroup allele distribution types of analysis). The availability of detailed phenotypic performance data collected by breeding programs over multiple years and environments for a large number of elite lines provides a valuable dataset for genetic marker association mapping analyses. This paves the way for a seamless integration between research and application and takes advantage of historically accumulated data sets. However, an understanding of the relationship between polymorphism and recombination is useful in developing appropriate strategies for efficiently extracting maximum information from these resources.

This type of association analysis neither generates nor requires any map data, but rather is independent of map position. This analysis compares the plants' phenotypic score with the genotypes at the various loci. Subsequently, any suitable map (for example, a composite map) can optionally be used to help observe distribution of the identified QTL markers and/or QTL marker clustering using previously determined map locations of the markers.

Traditional Linkage Analysis

The same principles underlie traditional linkage analysis; however, LD is generated by creating a population from a small number of founders. The founders are selected to maximize the level of polymorphism within the constructed population, and polymorphic sites are assessed for their level of cosegregation with a given phenotype. A number of statistical methods have been used to identify significant marker-trait associations. One such method is an interval mapping approach (Lander and Botstein, Genetics 121:185-199 (1989), in which each of many positions along a genetic map (say at 1 cM intervals) is tested for the likelihood that a gene controlling a trait of interest is located at that position. The genotype/phenotype data are used to calculate for each test position a LOD score (log of likelihood ratio). When the LOD score exceeds a threshold value, there is significant evidence for the location of a gene controlling the trait of interest at that position on the genetic map (which will fall between two particular marker loci).

Marker loci that demonstrate statistically significant co-segregation with a disease resistance trait, as determined by traditional linkage analysis and by whole genome association analysis, are provided herein. Detection of these loci or additional linked loci can be used in marker assisted breeding programs to produce plants having disease resistance.

Activities in marker assisted breeding programs may include but are not limited to: selecting among new breeding populations to identify which population has the highest frequency of favorable nucleic acid sequences based on historical genotype and agronomic trait associations, selecting favorable nucleic acid sequences among progeny in breeding populations, selecting among parental lines based on prediction of progeny performance, and advancing lines in germplasm improvement activities based on presence of favorable nucleic acid sequences.

Markers and Linkage Relationships

A common measure of linkage is the frequency with which traits cosegregate. This can be expressed as a percentage of cosegregation (recombination frequency) or in centiMorgans (cM). The cM is a unit of measure of genetic recombination frequency. One cM is equal to a 1% chance that a trait at one genetic locus will be separated from a trait at another locus due to crossing over in a single generation (meaning the traits segregate together 99% of the time). Because chromosomal distance is approximately proportional to the frequency of crossing over events between traits, there is an approximate physical distance that correlates with recombination frequency.

Marker loci are themselves traits and can be assessed according to standard linkage analysis by tracking the marker loci during segregation. Thus, one cM is equal to a 1% chance that a marker locus will be separated from another locus, due to crossing over in a single generation.

The closer a marker is to a gene controlling a trait of interest, the more effective and advantageous that marker is as an indicator for the desired trait. Closely linked loci display an inter-locus cross-over frequency of about 10% or less, preferably about 9% or less, still more preferably about 8% or less, yet more preferably about 7% or less, still more preferably about 6% or less, yet more preferably about 5% or less, still more preferably about 4% or less, yet more preferably about 3% or less, and still more preferably about 2% or less. In highly preferred embodiments, the relevant loci (e.g., a marker locus and a target locus) display a recombination frequency of about 1% or less, e.g., about 0.75% or less, more preferably about 0.5% or less, or yet more preferably about 0.25% or less. Thus, the loci are about 10 cM, 9 cM, 8 cM, 7 cM, 6 cM, 5 cM, 4 cM, 3 cM, 2 cM, 1 cM, 0.75 cM, 0.5 cM or 0.25 cM or less apart. Put another way, two loci that are localized to the same chromosome, and at such a distance that recombination between the two loci occurs at a frequency of less than 10% (e.g., about 9%, 8%, 7%, 6%, 5%, 4%, 3%, 2%, 1%, 0.75%, 0.5%, 0.25%, or less) are said to be "proximal to" each other.

Although particular marker alleles can co-segregate with the disease resistance trait, it is important to note that the marker locus is not necessarily responsible for the expression of the disease resistance phenotype. For example, it is not a requirement that the marker polynucleotide sequence be part of a gene that is responsible for the disease resistant phenotype (for example, is part of the gene open reading frame). The association between a specific marker allele and the disease resistance trait is due to the original "coupling" linkage phase between the marker allele and the allele in the ancestral line from which the allele originated. Eventually, with repeated recombination, crossing over events between the marker and genetic locus can change this orientation. For this reason, the favorable marker allele may change depending on the linkage phase that exists within the parent having resistance to the disease that is used to create segregating populations. This does not change the fact that the marker can be used to monitor segregation of the phenotype. It only changes which marker allele is considered favorable in a given segregating population.

Methods presented herein include detecting the presence of one or more marker alleles associated with disease resistance in a plant and then identifying and/or selecting plants that have favorable alleles at those marker loci. Markers have been identified herein as being associated with the disease resistance trait and hence can be used to predict disease resistance in a plant. Any marker within 50 cM, 40 cM, 30 cM, 20 cM, 15 cM, 10 cM, 9 cM, 8 cM, 7 cM, 6 cM, 5 cM, 4 cM, 3 cM, 2 cM, 1 cM, 0.75 cM, 0.5 cM or 0.25 cM (based on a single meiosis based genetic map) could also be used to predict disease resistance in a plant.

Marker Assisted Selection

Molecular markers can be used in a variety of plant breeding applications (e.g. see Staub et al. (1996) *Hortscience* 31: 729-741; Tanksley (1983) *Plant Molecular Biology Reporter.* 1: 3-8). One of the main areas of interest is to increase the efficiency of backcrossing and introgressing genes using marker-assisted selection (MAS). A molecular marker that demonstrates linkage with a locus affecting a desired phenotypic trait provides a useful tool for the selection of the trait in a plant population. This is particularly true where the phenotype is hard to assay. Since DNA marker assays are less laborious and take up less physical space than field phenotyping, much larger populations can be assayed, increasing the chances of finding a recombinant with the target segment from the donor line moved to the recipient line. The closer the linkage, the more useful the marker, as recombination is less likely to occur between the marker and the gene causing the trait, which can result in false positives. Having flanking markers decreases the chances that false positive selection will occur as a double recombination event would be needed. The ideal situation is to have a marker in the gene itself, so that recombination cannot occur between the marker and the gene. In some embodiments, the methods disclosed herein produce a marker in a disease resistance gene, wherein the gene was identified by inferring genomic location from clustering of conserved domains or a clustering analysis.

When a gene is introgressed by MAS, it is not only the gene that is introduced but also the flanking regions (Gepts. (2002). *Crop Sci;* 42: 1780-1790). This is referred to as "linkage drag." In the case where the donor plant is highly unrelated to the recipient plant, these flanking regions carry additional genes that may code for agronomically undesirable traits. This "linkage drag" may also result in reduced yield or other negative agronomic characteristics even after multiple cycles of backcrossing into the elite line. This is also sometimes referred to as "yield drag." The size of the flanking region can be decreased by additional backcrossing, although this is not always successful, as breeders do not have control over the size of the region or the recombination breakpoints (Young et al. (1998) *Genetics* 120:579-585). In classical breeding it is usually only by chance that recombinations are selected that contribute to a reduction in the size of the donor segment (Tanksley et al. (1989). *Biotechnology* 7: 257-264). Even after 20 backcrosses in backcrosses of this type, one may expect to find a sizeable piece of the donor chromosome still linked to the gene being selected. With markers however, it is possible to select those rare individuals that have experienced recombination near the gene of interest. In 150 backcross plants, there is a 95% chance that at least one plant will have experienced a crossover within 1 cM of the gene, based on a single meiosis map distance. Markers will allow unequivocal identification of those individuals. With one additional backcross of 300 plants, there would be a 95% chance of a crossover within 1 cM single meiosis map distance of the other side of the gene, generating a segment around the target gene of less than 2 cM based on a single meiosis map distance. This can be accomplished in two generations with markers, while it would have required on average 100 generations without markers (See Tanksley et al., supra). When the exact location of a gene is known, flanking markers surrounding the gene can be utilized to select for recombinations in different population sizes. For example, in smaller population sizes, recombinations may be expected further away from the gene, so more distal flanking markers would be required to detect the recombination.

The key components to the implementation of MAS are: (i) Defining the population within which the marker-trait association will be determined, which can be a segregating population, or a random or structured population; (ii) monitoring the segregation or association of polymorphic markers relative to the trait, and determining linkage or association using statistical methods; (iii) defining a set of desirable markers based on the results of the statistical analysis, and (iv) the use and/or extrapolation of this information to the current set of breeding germplasm to enable marker-based selection decisions to be made. The markers described in this disclosure, as well as other marker types such as SSRs and FLPs, can be used in marker assisted selection protocols.

SSRs can be defined as relatively short runs of tandemly repeated DNA with lengths of 6 bp or less (Tautz (1989) *Nucleic Acid Research* 17: 6463-6471; Wang et al. (1994) *Theoretical and Applied Genetics,* 88:1-6) Polymorphisms arise due to variation in the number of repeat units, probably caused by slippage during DNA replication (Levinson and Gutman (1987) *Mol Biol Evol* 4: 203-221). The variation in repeat length may be detected by designing PCR primers to the conserved non-repetitive flanking regions (Weber and May (1989) *Am J Hum Genet.* 44:388-396). SSRs are highly suited to mapping and MAS as they are multi-allelic, codominant, reproducible and amenable to high throughput automation (Rafalski et al. (1996) Generating and using DNA markers in plants. In: *Non-mammalian genomic analysis: a practical guide*. Academic press. pp 75-135).

Various types of SSR markers can be generated, and SSR profiles can be obtained by gel electrophoresis of the amplification products. Scoring of marker genotype is based on the size of the amplified fragment.

Various types of FLP markers can also be generated. Most commonly, amplification primers are used to generate fragment length polymorphisms. Such FLP markers are in many ways similar to SSR markers, except that the region amplified by the primers is not typically a highly repetitive region. Still, the amplified region, or amplicon, will have sufficient variability among germplasm, often due to insertions or deletions, such that the fragments generated by the amplification primers can be distinguished among polymorphic individuals, and such indels are known to occur frequently in maize (Bhattramakki et al. (2002). *Plant Mol Biol* 48, 539-547; Rafalski (2002b), supra).

SNP markers detect single base pair nucleotide substitutions. Of all the molecular marker types, SNPs are the most abundant, thus having the potential to provide the highest genetic map resolution (Bhattramakki et al. 2002 *Plant Molecular Biology* 48:539-547). SNPs can be assayed at an even higher level of throughput than SSRs, in a so-called 'ultra-high-throughput' fashion, as SNPs do not require large amounts of DNA and automation of the assay may be straight-forward. SNPs also have the promise of being relatively low-cost systems. These three factors together make SNPs highly attractive for use in MAS. Several methods are available for SNP genotyping, including but not limited to, hybridization, primer extension, oligonucleotide ligation, nuclease cleavage, minisequencing, and coded spheres. Such methods have been reviewed in: Gut (2001) *Hum Mutat* 17 pp. 475-492; Shi (2001) *Clin Chem* 47, pp. 164-172; Kwok (2000) *Pharmacogenomics* 1, pp. 95-100; and Bhattramakki and Rafalski (2001) Discovery and application of single nucleotide polymorphism markers in plants. In: R. J. Henry, Ed, *Plant Genotyping: The DNA Fingerprinting of Plants*, CABI Publishing, Wallingford. A wide range of commercially available technologies utilize these and other methods to interrogate SNPs including Masscode™ (Qiagen), INVADER®. (Third Wave Technologies) and Invader PLUS®, SNAPSHOT®. (Applied Biosystems), TAQMAN®. (Applied Biosystems) and BEADARRAYS®. (Illumina).

A number of SNPs together within a sequence, or across linked sequences, can be used to describe a haplotype for any particular genotype (Ching et al. (2002), *BMC Genet.* 3:19 pp Gupta et al. 2001, Rafalski (2002b), *Plant Science* 162:329-333). Haplotypes can be more informative than single SNPs and can be more descriptive of any particular genotype. For example, a single SNP may be allele "T" for a specific line or variety with disease resistance, but the allele "T" might also occur in the breeding population being utilized for recurrent parents. In this case, a haplotype, e.g. a combination of alleles at linked SNP markers, may be more informative. Once a unique haplotype has been assigned to a donor chromosomal region, that haplotype can be used in that population or any subset thereof to determine whether an individual has a particular gene. See, for example, WO2003054229. Using automated high throughput marker detection platforms known to those of ordinary skill in the art makes this process highly efficient and effective.

Many of the markers presented herein can readily be used as single nucleotide polymorphic (SNP) markers to select for the R gene. Using PCR, the primers are used to amplify DNA segments from individuals (preferably inbred) that represent the diversity in the population of interest. The PCR products are sequenced directly in one or both directions. The resulting sequences are aligned and polymorphisms are identified. The polymorphisms are not limited to single nucleotide polymorphisms (SNPs), but also include indels, CAPS, SSRs, and VNTRs (variable number of tandem repeats). Specifically, with respect to the fine map information described herein, one can readily use the information provided herein to obtain additional polymorphic SNPs (and other markers) within the region amplified by the primers disclosed herein. Markers within the described map region can be hybridized to BACs or other genomic libraries, or electronically aligned with genome sequences, to find new sequences in the same approximate location as the described markers.

In addition to SSR's, FLPs and SNPs, as described above, other types of molecular markers are also widely used, including but not limited to expressed sequence tags (ESTs), SSR markers derived from EST sequences, randomly amplified polymorphic DNA (RAPD), and other nucleic acid based markers.

Isozyme profiles and linked morphological characteristics can, in some cases, also be indirectly used as markers. Even though they do not directly detect DNA differences, they are often influenced by specific genetic differences. However, markers that detect DNA variation are far more numerous and polymorphic than isozyme or morphological markers (Tanksley (1983) *Plant Molecular Biology Reporter* 1:3-8).

Sequence alignments or contigs may also be used to find sequences upstream or downstream of the specific markers listed herein. These new sequences, close to the markers described herein, are then used to discover and develop functionally equivalent markers. For example, different physical and/or genetic maps are aligned to locate equivalent markers not described within this disclosure but that are within similar regions. These maps may be within the species, or even across other species that have been genetically or physically aligned.

In general, MAS uses polymorphic markers that have been identified as having a significant likelihood of co-segregation with a trait such as the disease resistance trait. Such markers are presumed to map near a gene or genes that give the plant its disease resistant phenotype, and are considered indicators for the desired trait, or markers. Plants are tested for the presence of a desired allele in the marker, and plants containing a desired genotype at one or more loci are expected to transfer the desired genotype, along with a desired phenotype, to their progeny. Thus, plants with disease resistance can be selected for by detecting one or more marker alleles, and in addition, progeny plants derived from those plants can also be selected. Hence, a plant containing a desired genotype in a given chromosomal region (i.e. a genotype associated with disease resistance) is obtained and then crossed to another plant. The progeny of such a cross would then be evaluated genotypically using one or more markers and the progeny plants with the same genotype in a given chromosomal region would then be selected as having disease resistance.

The SNPs could be used alone or in combination (i.e. a SNP haplotype) to select for a favorable resistant gene allele associated with the disease resistance.

The skilled artisan would expect that there might be additional polymorphic sites at marker loci in and around a chromosome marker identified by the methods disclosed herein, wherein one or more polymorphic sites is in linkage disequilibrium (LD) with an allele at one or more of the polymorphic sites in the haplotype and thus could be used in a marker assisted selection program to introgress a gene allele or genomic fragment of interest. Two particular alleles at different polymorphic sites are said to be in LD if the presence of the allele at one of the sites tends to predict the presence of the allele at the other site on the same chromosome (Stevens, *Mol. Diag.* 4:309-17 (1999)). The marker loci can be located within 5 cM, 2 cM, or 1 cM (on a single meiosis based genetic map) of the disease resistance trait QTL.

The skilled artisan would understand that allelic frequency (and hence, haplotype frequency) can differ from one germplasm pool to another. Germplasm pools vary due to maturity differences, heterotic groupings, geographical distribution, etc. As a result, SNPs and other polymorphisms may not be informative in some germplasm pools.

Plant Compositions

Plants identified and/or selected by any of the methods described above are also of interest.

Proteins and Variants and Fragments Thereof

R gene polypeptides are encompassed by the disclosure. "R gene polypeptide" and "R gene protein" as used herein interchangeably refers to a polypeptide(s) having a disease resistance activity. A variety of R gene polypeptides are contemplated.

"Sufficiently identical" is used herein to refer to an amino acid sequence that has at least about 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% or greater sequence identity. In some embodiments the sequence identity is against the full length sequence of a polypeptide. The term "about" when used herein in context with percent sequence identity means+/−1.0%.

A "recombinant protein" is used herein to refer to a protein that is no longer in its natural environment, for example in vitro or in a recombinant bacterial or plant host cell; a protein that is expressed from a polynucleotide that has been edited from its native version; or a protein that is expressed from a polynucleotide in a different genomic position relative to the native sequence.

"Substantially free of cellular material" as used herein refers to a polypeptide including preparations of protein having less than about 30%, 20%, 10% or 5% (by dry weight) of non-target protein (also referred to herein as a "contaminating protein").

"Fragments" or "biologically active portions" include polypeptide or polynucleotide fragments comprising sequences sufficiently identical to an R gene polypeptide or polynucleotide, respectively, and that exhibit disease resistance when expressed in a plant.

"Variants" as used herein refers to proteins or polypeptides having an amino acid sequence that is at least about 50%, 55%, 60%, 65%, 70%, 75%, 80%, 81%, 82%, 83%, 84%, 85%, 86%, 87%, 88%, 89%, 90%, 91%, 92%, 93%, 94%, 95%, 96%, 97%, 98%, 99% or greater identical to the parental amino acid sequence.

Methods for such manipulations are generally known in the art. For example, amino acid sequence variants of a polypeptide can be prepared by mutations in the DNA. This may also be accomplished by one of several forms of mutagenesis, such as for example site-specific double strand break technology, and/or in directed evolution. In some aspects, the changes encoded in the amino acid sequence will not substantially affect the function of the protein. Such variants will possess the desired activity. However, it is understood that the ability of an R gene polypeptide to confer disease resistance may be improved by the use of such techniques upon the compositions of this disclosure.

Nucleic Acid Molecules and Variants and Fragments Thereof

Isolated or recombinant nucleic acid molecules comprising nucleic acid sequences encoding R gene polypeptides or biologically active portions thereof, as well as nucleic acid molecules sufficient for use as hybridization probes to identify nucleic acid molecules encoding proteins with regions of sequence homology are provided. As used herein, the term "nucleic acid molecule" refers to DNA molecules (e.g., recombinant DNA, cDNA, genomic DNA, plastid DNA, mitochondrial DNA) and RNA molecules (e.g., mRNA) and analogs of the DNA or RNA generated using nucleotide analogs. The nucleic acid molecule can be single-stranded or double-stranded, but preferably is double-stranded DNA.

An "isolated" nucleic acid molecule (or DNA) is used herein to refer to a nucleic acid sequence (or DNA) that is no longer in its natural environment, for example in vitro. A "recombinant" nucleic acid molecule (or DNA) is used herein to refer to a nucleic acid sequence (or DNA) that is in a recombinant bacterial or plant host cell; has been edited from its native sequence; or is located in a different location than the native sequence. In some embodiments, an "isolated" or "recombinant" nucleic acid is free of sequences (preferably protein encoding sequences) that naturally flank the nucleic acid (i.e., sequences located at the 5' and 3' ends of the nucleic acid) in the genomic DNA of the organism from which the nucleic acid is derived. For purposes of the disclosure, "isolated" or "recombinant" when used to refer to nucleic acid molecules excludes isolated chromosomes. For example, in various embodiments, the recombinant nucleic acid molecules encoding R gene polypeptides can contain less than about 5 kb, 4 kb, 3 kb, 2 kb, 1 kb, 0.5 kb or 0.1 kb of nucleic acid sequences that naturally flank the nucleic acid molecule in genomic DNA of the cell from which the nucleic acid is derived.

In some embodiments an isolated nucleic acid molecule encoding R gene polypeptides has one or more change in the nucleic acid sequence compared to the native or genomic nucleic acid sequence. In some embodiments the change in the native or genomic nucleic acid sequence includes but is not limited to: changes in the nucleic acid sequence due to the degeneracy of the genetic code; changes in the nucleic acid sequence due to the amino acid substitution, insertion, deletion and/or addition compared to the native or genomic sequence; removal of one or more intron; deletion of one or more upstream or downstream regulatory regions; and deletion of the 5' and/or 3' untranslated region associated with the genomic nucleic acid sequence. In some embodiments the nucleic acid molecule encoding an R gene polypeptide is a non-genomic sequence.

A variety of polynucleotides that encode R gene polypeptides or related proteins are contemplated. Such polynucleotides are useful for production of R gene polypeptides in host cells when operably linked to a suitable promoter, transcription termination and/or polyadenylation sequences. Such polynucleotides are also useful as probes for isolating homologous or substantially homologous polynucleotides that encode R gene polypeptides or related proteins.

"Complement" is used herein to refer to a nucleic acid sequence that is sufficiently complementary to a given nucleic acid sequence such that it can hybridize to the given nucleic acid sequence to thereby form a stable duplex. "Polynucleotide sequence variants" is used herein to refer to a nucleic acid sequence that except for the degeneracy of the genetic code encodes the same polypeptide.

In some embodiments the nucleic acid molecule encoding the R gene polypeptide is a non-genomic nucleic acid sequence. As used herein a "non-genomic nucleic acid sequence" or "non-genomic nucleic acid molecule" or "non-genomic polynucleotide" refers to a nucleic acid molecule that has one or more change in the nucleic acid sequence compared to a native or genomic nucleic acid sequence. In some embodiments the change to a native or genomic nucleic acid molecule includes but is not limited to: changes in the nucleic acid sequence due to the degeneracy of the genetic code; optimization of the nucleic acid sequence for expression in plants; changes in the nucleic acid sequence to introduce at least one amino acid substitution, insertion, deletion and/or addition compared to the native or genomic sequence; removal of one or more intron associated with the genomic nucleic acid sequence; insertion of one or more heterologous introns; deletion of one or more upstream or downstream regulatory regions associated with the genomic nucleic acid sequence; insertion of one or more heterologous upstream or downstream regulatory regions; deletion of the 5' and/or 3' untranslated region associated with the genomic nucleic acid sequence; insertion of a heterologous 5' and/or 3' untranslated region; and modification of a polyadenylation site. In some embodiments the non-genomic nucleic acid molecule is a synthetic nucleic acid sequence.

Nucleic acid molecules that are fragments of these nucleic acid sequences encoding R gene polypeptides are also encompassed by the embodiments. "Fragment" as used herein refers to a portion of the nucleic acid sequence encoding an R gene polypeptide. A fragment of a nucleic acid sequence may encode a biologically active portion of an R gene polypeptide or it may be a fragment that can be used as a hybridization probe or PCR primer using methods disclosed below. Nucleic acid molecules that are fragments of a nucleic acid sequence encoding an R gene polypeptide comprise at least about 150, 180, 210, 240, 270, 300, 330, 360, 400, 450, or 500 contiguous nucleotides or up to the number of nucleotides present in a full-length nucleic acid sequence encoding a R gene polypeptide identified by the methods disclosed herein, depending upon the intended use. "Contiguous nucleotides" is used herein to refer to nucleotide residues that are immediately adjacent to one another. Fragments of the nucleic acid sequences of the embodiments will encode protein fragments that retain the biological activity of the R gene polypeptide and, hence, retain disease resistance. "Retains disease resistance" is used herein to refer to a polypeptide having at least about 10%, at least about 30%, at least about 50%, at least about 70%, 80%, 90%, 95% or higher of the disease resistance of the full-length R gene polypeptide.

"Percent (%) sequence identity" with respect to a reference sequence (subject) is determined as the percentage of amino acid residues or nucleotides in a candidate sequence (query) that are identical with the respective amino acid residues or nucleotides in the reference sequence, after aligning the sequences and introducing gaps, if necessary, to achieve the maximum percent sequence identity, and not considering any amino acid conservative substitutions as part of the sequence identity. Alignment for purposes of determining percent sequence identity can be achieved in various ways that are within the skill in the art, for instance, using publicly available computer software such as BLAST, BLAST-2. Those skilled in the art can determine appropriate parameters for aligning sequences, including any algorithms needed to achieve maximal alignment over the full length of the sequences being compared. The percent identity between the two sequences is a function of the number of identical positions shared by the sequences (e.g., percent identity of query sequence=number of identical positions between query and subject sequences/total number of positions of query sequence×100).

The embodiments also encompass nucleic acid molecules encoding R gene polypeptide variants. "Variants" of the R gene polypeptide encoding nucleic acid sequences include those sequences that encode the R gene polypeptides identified by the methods disclosed herein, but that differ conservatively because of the degeneracy of the genetic code as well as those that are sufficiently identical as discussed above. Naturally occurring allelic variants can be identified with the use of well-known molecular biology techniques, such as polymerase chain reaction (PCR) and hybridization techniques as outlined below. Variant nucleic acid sequences also include synthetically derived nucleic acid sequences that have been generated, for example, by using site-directed mutagenesis but which still encode the R gene polypeptides disclosed herein.

The skilled artisan will further appreciate that changes can be introduced by mutation of the nucleic acid sequences thereby leading to changes in the amino acid sequence of the encoded R gene polypeptides, without altering the biological activity of the proteins. Thus, variant nucleic acid molecules can be created by introducing one or more nucleotide substitutions, additions and/or deletions into the corresponding nucleic acid sequence disclosed herein, such that one or more amino acid substitutions, additions or deletions are introduced into the encoded protein. Mutations can be introduced by standard techniques, such as site-directed mutagenesis and PCR-mediated mutagenesis. Such variant nucleic acid sequences are also encompassed by the present disclosure.

Alternatively, variant nucleic acid sequences can be made by introducing mutations randomly along all or part of the coding sequence, such as by saturation mutagenesis, and the resultant mutants can be screened for ability to confer activity to identify mutants that retain activity. Following mutagenesis, the encoded protein can be expressed recombinantly, and the activity of the protein can be determined using standard assay techniques.

The polynucleotides of the disclosure and fragments thereof are optionally used as substrates for a variety of recombination and recursive recombination reactions, in addition to standard cloning methods as set forth in, e.g., Ausubel, Berger and Sambrook, i.e., to produce additional polypeptide homologues and fragments thereof with desired properties. A variety of such reactions are known. Methods for producing a variant of any nucleic acid listed herein comprising recursively recombining such polynucleotide with a second (or more) polynucleotide, thus forming a library of variant polynucleotides are also embodiments of the disclosure, as are the libraries produced, the cells comprising the libraries and any recombinant polynucleotide produced by such methods. Additionally, such methods optionally comprise selecting a variant polynucleotide from such libraries based on activity, as is wherein such recursive recombination is done in vitro or in vivo.

A variety of diversity generating protocols, including nucleic acid recursive recombination protocols are available and fully described in the art. The procedures can be used separately, and/or in combination to produce one or more variants of a nucleic acid or set of nucleic acids, as well as variants of encoded proteins. Individually and collectively, these procedures provide robust, widely applicable ways of generating diversified nucleic acids and sets of nucleic acids (including, e.g., nucleic acid libraries) useful, e.g., for the engineering or rapid evolution of nucleic acids, proteins, pathways, cells and/or organisms with new and/or improved characteristics.

While distinctions and classifications are made in the course of the ensuing discussion for clarity, it will be appreciated that the techniques are often not mutually exclusive. Indeed, the various methods can be used singly or in combination, in parallel or in series, to access diverse sequence variants.

The result of any of the diversity generating procedures described herein can be the generation of one or more nucleic acids, which can be selected or screened for nucleic acids with or which confer desirable properties or that encode proteins with or which confer desirable properties. Following diversification by one or more of the methods herein or otherwise available to one of skill, any nucleic acids that are produced can be selected for a desired activity or property, e.g. such activity at a desired pH, etc. This can include identifying any activity that can be detected, for example, in an automated or automatable format, by any of the assays in the art. A variety of related (or even unrelated) properties can be evaluated, in serial or in parallel, at the discretion of the practitioner.

The nucleotide sequences of the embodiments can also be used to isolate corresponding sequences from a different source. In this manner, methods such as PCR, hybridization, and the like can be used to identify such sequences based on their sequence homology to the sequences identified by the methods disclosed herein. Sequences that are selected based on their sequence identity to the entire sequences set forth herein or to fragments thereof are encompassed by the embodiments. Such sequences include sequences that are orthologs of the sequences. The term "orthologs" refers to genes derived from a common ancestral gene and which are found in different species as a result of speciation. Genes found in different species are considered orthologs when their nucleotide sequences and/or their encoded protein sequences share substantial identity as defined elsewhere herein.

In a PCR approach, oligonucleotide primers can be designed for use in PCR reactions to amplify corresponding DNA sequences from cDNA or genomic DNA extracted from any organism of interest. Methods for designing PCR primers and PCR cloning are generally known in the art and are disclosed in Sambrook, et al., (1989) *Molecular Cloning: A Laboratory Manual* (2d ed., Cold Spring Harbor Laboratory Press, Plainview, New York), hereinafter "Sambrook". See also, Innis, et al., eds. (1990) *PCR Protocols: A Guide to Methods and Applications* (Academic Press, New York); Innis and Gelfand, eds. (1995) *PCR Strategies* (Academic Press, New York); and Innis and Gelfand, eds. (1999) *PCR Methods Manual* (Academic Press, New York). Known methods of PCR include, but are not limited to, methods using paired primers, nested primers, single specific primers, degenerate primers, gene-specific primers, vector-specific primers, partially-mismatched primers, and the like.

In hybridization methods, all or part of the nucleic acid sequence can be used to screen cDNA or genomic libraries. Methods for construction of such cDNA and genomic libraries are generally known in the art and are disclosed in Sambrook and Russell, (2001), supra. The so-called hybridization probes may be genomic DNA fragments, cDNA fragments, RNA fragments or other oligonucleotides and may be labeled with a detectable group such as 32P or any other detectable marker, such as other radioisotopes, a fluorescent compound, an enzyme or an enzyme co-factor. Probes for hybridization can be made by labeling synthetic oligonucleotides based on the known polypeptide-encoding nucleic acid sequences disclosed herein. Degenerate primers designed on the basis of conserved nucleotides or amino acid residues in the nucleic acid sequence or encoded amino acid sequence can additionally be used. The probe typically comprises a region of nucleic acid sequence that hybridizes under stringent conditions to at least about 12, at least about 25, at least about 50, 75, 100, 125, 150, 175 or 200 consecutive nucleotides of nucleic acid sequences encoding polypeptides or a fragment or variant thereof. Methods for the preparation of probes for hybridization and stringency conditions are generally known in the art and are disclosed in Sambrook and Russell, (2001), supra.

Nucleotide Constructs, Expression Cassettes and Vectors

The use of the term "nucleotide constructs" herein is not intended to limit the embodiments to nucleotide constructs comprising DNA. Those of ordinary skill in the art will recognize that nucleotide constructs, particularly polynucleotides and oligonucleotides composed of ribonucleotides and combinations of ribonucleotides and deoxyribonucleotides, may also be employed in the methods disclosed herein. The nucleotide constructs, nucleic acids, and nucleotide sequences of the embodiments additionally encompass all complementary forms of such constructs, molecules, and sequences. Further, the nucleotide constructs, nucleotide molecules, and nucleotide sequences of the embodiments encompass all nucleotide constructs, molecules, and sequences which can be employed in the methods of the embodiments for transforming plants including, but not limited to, those comprised of deoxyribonucleotides, ribonucleotides, and combinations thereof. Such deoxyribonucleotides and ribonucleotides include both naturally occurring molecules and synthetic analogues. The nucleotide constructs, nucleic acids, and nucleotide sequences of the embodiments also encompass all forms of nucleotide constructs including, but not limited to, single-stranded forms, double-stranded forms, hairpins, stem-and-loop structures and the like.

A further embodiment relates to a transformed organism such as an organism selected from plant cells, bacteria, yeast, baculovirus, protozoa, nematodes and algae. The transformed organism comprises a DNA molecule of the embodiments, an expression cassette comprising the DNA molecule or a vector comprising the expression cassette, which may be stably incorporated into the genome of the transformed organism.

The sequences of the embodiments are provided in DNA constructs for expression in the organism of interest. The construct will include 5' and 3' regulatory sequences operably linked to a sequence of the embodiments. The term "operably linked" as used herein refers to a functional linkage between a promoter and a second sequence, wherein the promoter sequence initiates and mediates transcription of the DNA sequence corresponding to the second sequence. Generally, operably linked means that the nucleic acid sequences being linked are contiguous and where necessary to join two protein coding regions in the same reading frame. The construct may additionally contain at least one additional gene to be cotransformed into the organism. Alternatively, the additional gene(s) can be provided on multiple DNA constructs.

Such a DNA construct is provided with a plurality of restriction sites for insertion of the polypeptide gene sequence of the disclosure to be under the transcriptional regulation of the regulatory regions. The DNA construct may additionally contain selectable marker genes.

The DNA construct will generally include in the 5' to 3' direction of transcription: a transcriptional and translational initiation region (i.e., a promoter), a DNA sequence of the embodiments, and a transcriptional and translational termination region (i.e., termination region) functional in the organism serving as a host. The transcriptional initiation region (i.e., the promoter) may be native, analogous, foreign or heterologous to the host organism and/or to the sequence of the embodiments. Additionally, the promoter may be the natural sequence or alternatively a synthetic sequence. The term "foreign" as used herein indicates that the promoter is not found in the native organism into which the promoter is introduced. Where the promoter is "foreign" or "heterologous" to the sequence of the embodiments, it is intended that the promoter is not the native or naturally occurring promoter for the operably linked sequence of the embodiments. As used herein, a chimeric gene comprises a coding sequence operably linked to a transcription initiation region that is heterologous to the coding sequence. Where the promoter is a native or natural sequence, the expression of the operably linked sequence is altered from the wild-type expression, which results in an alteration in phenotype.

In some embodiments the DNA construct comprises a polynucleotide encoding an R gene polypeptide of the embodiments. In some embodiments the DNA construct comprises a polynucleotide encoding a fusion protein comprising an R gene polypeptide of the embodiments.

In some embodiments the DNA construct may also include a transcriptional enhancer sequence. As used herein, the term an "enhancer" refers to a DNA sequence which can stimulate promoter activity, and may be an innate element of the promoter or a heterologous element inserted to enhance the level or tissue-specificity of a promoter. Various enhancers are known in the art including for example, introns with gene expression enhancing properties in plants (US Patent Application Publication Number 2009/0144863, the ubiquitin intron (i.e., the maize ubiquitin intron 1 (see, for example, NCBI sequence S94464)), the omega enhancer or the omega prime enhancer (Gallie, et al., (1989) *Molecular Biology of RNA* ed. Cech (Liss, New York) 237-256 and Gallie, et al., (1987) *Gene* 60:217-25), the CaMV 35S enhancer (see, e.g., Benfey, et al., (1990) *EMBO J.* 9:1685-96) and the enhancers of U.S. Pat. No. 7,803,992 may also be used. The above list of transcriptional enhancers is not meant to be limiting. Any appropriate transcriptional enhancer can be used in the embodiments.

The termination region may be native with the transcriptional initiation region, may be native with the operably linked DNA sequence of interest, may be native with the plant host or may be derived from another source (i.e., foreign or heterologous to the promoter, the sequence of interest, the plant host or any combination thereof).

Convenient termination regions are available from the Ti-plasmid of *A. tumefaciens*, such as the octopine synthase and nopaline synthase termination regions. See also, Guerineau, et al., (1991) *Mol. Gen. Genet.* 262:141-144; Proudfoot, (1991) *Cell* 64:671-674; Sanfacon, et al., (1991) *Genes Dev.* 5:141-149; Mogen, et al., (1990) *Plant Cell* 2:1261-1272; Munroe, et al., (1990) *Gene* 91:151-158; Ballas, et al., (1989) *Nucleic Acids Res.* 17:7891-7903 and Joshi, et al., (1987) *Nucleic Acid Res.* 15:9627-9639.

Where appropriate, a nucleic acid may be optimized for increased expression in the host organism. Thus, where the host organism is a plant, the synthetic nucleic acids can be synthesized using plant-preferred codons for improved expression. See, for example, Campbell and Gowri, (1990) *Plant Physiol.* 92:1-11 for a discussion of host-preferred usage. For example, although nucleic acid sequences of the embodiments may be expressed in both monocotyledonous and dicotyledonous plant species, sequences can be modified to account for the specific preferences and GC content preferences of monocotyledons or dicotyledons as these preferences have been shown to differ (Murray et al. (1989) *Nucleic Acids Res.* 17:477-498). Thus, the plant-preferred for a particular amino acid may be derived from known gene sequences from plants.

Additional sequence modifications are known to enhance gene expression in a cellular host. These include elimination of sequences encoding spurious polyadenylation signals, exon-intron splice site signals, transposon-like repeats, and other well-characterized sequences that may be deleterious to gene expression. The GC content of the sequence may be adjusted to levels average for a given cellular host, as calculated by reference to known genes expressed in the host cell. The term "host cell" as used herein refers to a cell which contains a vector and supports the replication and/or expression of the expression vector is intended. Host cells may be prokaryotic cells such as *E. coli* or eukaryotic cells such as yeast, insect, amphibian or mammalian cells or monocotyledonous or dicotyledonous plant cells. An example of a monocotyledonous host cell is a maize host cell. When possible, the sequence is modified to avoid predicted hairpin secondary mRNA structures.

In preparing the expression cassette, the various DNA fragments may be manipulated so as to provide for the DNA sequences in the proper orientation and, as appropriate, in the proper reading frame. Toward this end, adapters or linkers may be employed to join the DNA fragments or other manipulations may be involved to provide for convenient restriction sites, removal of superfluous DNA, removal of restriction sites or the like. For this purpose, in vitro mutagenesis, primer repair, restriction, annealing, resubstitutions, e.g., transitions and transversions, may be involved.

A number of promoters can be used in the practice of the embodiments. The promoters can be selected based on the desired outcome. The nucleic acids can be combined with constitutive, tissue-preferred, inducible or other promoters for expression in the host organism.

In some aspects, a DNA construct may encode a double stranded RNA targeting an effector protein transcript, producing a reduction in effector protein translation. In some embodiments, the reduction in effector protein produces a disease resistance phenotype in a plant or plant cell. A wide variety of eukaryotic organisms, including plants, animals, and fungi, have evolved several RNA-silencing pathways to protect their cells and genomes against invading nucleic acids, such as viruses or transposons, and to regulate gene expression during development or in response to external stimuli (for review, see Baulcombe (2005) *Trends Biochem. Sci.* 30:290-93; Meins et al. (2005) *Annu. Rev. Cell Dev. Biol.* 21:297-318). In plants, RNA-silencing pathways have been shown to control a variety of developmental processes including flowering time, leaf morphology, organ polarity, floral morphology, and root development (reviewed by Mallory and Vaucheret (2006) *Nat. Genet.* 38:S31-36). All RNA-silencing systems involve the processing of double-stranded RNA (dsRNA) into small RNAs of 21 to 25 nucleotides (nt) by an RNaseIII-like enzyme known as Dicer or Dicer-like in plants (Bernstein et al. (2001) *Nature* 409:363-66; Xie et al. (2004) *PLOS Biol.* 2 E104:0642-52; Xie et al. (2005) *Proc. Natl. Acad. Sci. USA* 102:12984-89; Dunoyer et al. (2005) *Nat. Genet.* 37:1356-60). These small RNAs are incorporated into silencing effector complexes containing an Argonaute protein (for review, see Meister and Tuschl (2004) *Nature* 431:343-49).

Plant Transformation

The methods of the embodiments involve introducing a polypeptide or polynucleotide into a plant. "Introducing" is as used herein means presenting to the plant the polynucleotide or polypeptide in such a manner that the sequence gains access to the interior of a cell of the plant. The methods of the embodiments do not depend on a particular method for introducing a polynucleotide or polypeptide into a plant, only that the polynucleotide(s) or polypeptide(s) gains access to the interior of at least one cell of the plant. Methods for introducing polynucleotide(s) or polypeptide(s) into plants are known in the art including, but not limited to, stable transformation methods, transient transformation methods, and virus-mediated methods.

"Stable transformation" as used herein means that the nucleotide construct introduced into a plant integrates into the genome of the plant and is capable of being inherited by the progeny thereof. "Transient transformation" as used herein means that a polynucleotide is introduced into the plant and does not integrate into the genome of the plant or a polypeptide is introduced into a plant. "Plant" as used herein refers to whole plants, plant organs (e.g., leaves, stems, roots, etc.), seeds, plant cells, propagules, embryos and progeny of the same. Plant cells can be differentiated or undifferentiated (e.g. callus, suspension culture cells, protoplasts, leaf cells, root cells, phloem cells and pollen).

Transformation protocols as well as protocols for introducing nucleotide sequences into plants may vary depending on the type of plant or plant cell, i.e., monocot or dicot, targeted for transformation. Suitable methods of introducing nucleotide sequences into plant cells and subsequent insertion into the plant genome include microinjection (Crossway, et al., (1986) *Biotechniques* 4:320-334), electroporation (Riggs, et al., (1986) *Proc. Natl. Acad. Sci. USA* 83:5602-5606), *Agrobacterium*-mediated transformation (U.S. Pat. Nos. 5,563,055 and 5,981,840), direct gene transfer (Paszkowski, et al., (1984) *EMBO J.* 3:2717-2722) and ballistic particle acceleration (see, for example, U.S. Pat. Nos. 4,945,050; 5,879,918; 5,886,244 and 5,932,782; Tomes, et al., (1995) in *Plant Cell, Tissue, and Organ Culture: Fundamental Methods*, ed. Gamborg and Phillips, (Springer-Verlag, Berlin) and McCabe, et al., (1988) *Bio/technology* 6:923-926) and Lec1 transformation (WO 00/28058). For potato transformation see, Tu, et al., (1998) *Plant Molecular Biology* 37:829-838 and Chong, et al., (2000) *Transgenic Research* 9:71-78. Additional transformation procedures can be found in Weissinger, et al., (1988) *Ann. Rev. Genet.* 22:421-477; Sanford, et al., (1987) *Particulate Science and Technology* 5:27-37 (onion); Christou, et al., (1988) *Plant Physiol.* 87:671-674 (soybean); McCabe, et al., (1988) *Bio/Technology* 6:923-926 (soybean); Finer and McMullen, (1991) *In Vitro Cell Dev. Biol.* 27P:175-182 (soybean); Singh, et al., (1998) *Theor. Appl. Genet.* 96:319-324 (soybean); Datta, et al., (1990) *Biotechnology* 8:736-740 (rice); Klein, et al., (1988) *Proc. Natl. Acad. Sci. USA* 85:4305-4309 (maize); Klein, et al., (1988) *Biotechnology* 6:559-563 (maize); U.S. Pat. Nos. 5,240,855; 5,322,783 and 5,324,646; Klein, et al., (1988)*Plant Physiol.* 91:440-444 (maize); Fromm, et al., (1990) *Biotechnology* 8:833-839 (maize); Hooykaas-Van Slogteren, et al., (1984) *Nature* (London) 311:763-764; U.S. Pat. No. 5,736,369 (cereals); Bytebier, et al., (1987) *Proc. Natl. Acad. Sci. USA* 84:5345-5349 (Liliaceae); De Wet, et al., (1985) in *The Experimental Manipulation of Ovule Tissues*, ed. Chapman, et al., (Longman, New York), pp. 197-209 (pollen); Kaeppler, et al., (1990) *Plant Cell Reports* 9:415-418 and Kaeppler, et al., (1992) *Theor. Appl. Genet.* 84:560-566 (whisker-mediated transformation); D'Halluin, et al., (1992) *Plant Cell* 4:1495-1505 (electroporation); Li, et al., (1993) *Plant Cell Reports* 12:250-255 and Christou and Ford, (1995) *Annals of Botany* 75:407-413 (rice); Osjoda, et al., (1996) *Nature Biotechnology* 14:745-750 (maize via *Agrobacterium tumefaciens*).

Methods to Introduce Genome Editing Technologies into Plants

In some embodiments, polynucleotide compositions can be introduced into the genome of a plant using genome editing technologies, or previously introduced polynucleotides in the genome of a plant may be edited using genome editing technologies. For example, the identified polynucleotides can be introduced into a desired location in the genome of a plant through the use of double-stranded break technologies such as TALENs, meganucleases, zinc finger nucleases, CRISPR-Cas, and the like. For example, the identified polynucleotides can be introduced into a desired location in a genome using a CRISPR-Cas system, for the purpose of site-specific insertion. The desired location in a plant genome can be any desired target site for insertion, such as a genomic region amenable for breeding or may be a target site located in a genomic window with an existing trait of interest. Existing traits of interest could be either an endogenous trait or a previously introduced trait.

In some embodiments, where an R allele has been identified in a genome, genome editing technologies may be used to alter or modify the polynucleotide sequence. Site specific modifications that can be introduced into the desired R gene allele polynucleotide include those produced using any method for introducing site specific modification, including, but not limited to, through the use of gene repair oligonucleotides (e.g. US Publication 2013/0019349), or through the use of double-stranded break technologies such as TALENs, meganucleases, zinc finger nucleases, CRISPR-Cas, and the like. Such technologies can be used to modify the previously introduced polynucleotide through the insertion, deletion or substitution of nucleotides within the introduced polynucleotide. Alternatively, double-stranded break technologies can be used to add additional nucleotide sequences to the introduced polynucleotide. Additional sequences that may be added include, additional expression elements, such as enhancer and promoter sequences. In another embodiment, genome editing technologies may be used to position additional disease resistant proteins in close proximity to the R gene polynucleotide compositions within the genome of a plant, in order to generate molecular stacks disease resistant proteins.

An "altered target site," "altered target sequence," "modified target site," and "modified target sequence" are used interchangeably herein and refer to a target sequence as disclosed herein that comprises at least one alteration when compared to non-altered target sequence. Such "alterations" include, for example: (i) replacement of at least one nucleotide, (ii) a deletion of at least one nucleotide, (iii) an insertion of at least one nucleotide, or (iv) any combination of (i)-(iii).

In some embodiments, an effector sequence is used to survey a plant pest population to identify allele diversity and allele frequency of the effector in a field pest population. In further embodiments, a plant comprising an R-gene that interacts with the effector is deployed based on the allele specific data. In some embodiments, the effector sequence comprises any one of SEQ ID NO: 1626-1628, or 1631.

EXAMPLES

The following examples are offered to illustrate, but not to limit, the claimed subject matter. It is understood that the examples and embodiments described herein are for illustrative purposes only, and persons skilled in the art will recognize various reagents or parameters that can be altered without departing from the spirit of the disclosure or the scope of the appended claims.

Example 1. Identify Putative Pathogen Effectors

A list of putative *Puccinia polysora* effectors were generated by computational analysis. RNA-seq reads from *Puccinia polysora* infected maize leaves were mapped against the *Puccinia polysora* genome with Tophat2 using the default parameters (See Kim, D., Pertea, G., Trapnell, C. et al. TopHat2: accurate alignment of transcriptomes in the presence of insertions, deletions and gene fusions. *Genome Biol* 14, R36 (2013) doi:10.1186/gb-2013-14-4-r36). Alignments were then passed to Stringtie to assemble transcript models using default parameters (See Pertea, M., Pertea, G., Antonescu, C. et al. StringTie enables improved reconstruction of a transcriptome from RNA-seq reads. *Nat Biotechnol* 33, 290-295 (2015) doi:10.1038/nbt.3122). Transcript models were further supplemented with a PAC-BIO Iso-seq library from germinating *Puccinia polysora* spores. Using custom Python scripts, the longest possible protein was predicted from all transcript models. The resulting proteins were analyzed for features associated with pathogen effectors utilizing the following criteria and software: presence of signal peptide (SignalP, see Nielsen H. (2017) Predicting Secretory Proteins with SignalP. In: Kihara D. (eds) Protein Function Prediction. Methods in Molecular Biology, vol 1611. Humana Press, New York, NY), lack of transmembrane domain (TMHMM, see Anders Krogh, Bjorn Larsson, Gunnar von Heijne, Erik L. L Sonnhammer, Predicting transmembrane protein topology with a hidden markov model: application to complete genomes 11 Edited by F. Cohen, Journal of Molecular Biology, Volume 305, Issue 3, 2001, Pages 567-580), small size (custom Python script), small effector-associated motifs (custom Python script), conserved effector-associated domains (HMMer, see Reddy, S. Multiple Alignment Using Hidden Markov Models. ISMB-95 Proceedings, pp. 114-120 (1995)), expression in infected maize leaf samples (Salmon, see Patro R, Duggal G, Love M I, Irizarry R A, Kingsford C. Salmon provides fast and bias-aware quantification of transcript expression. *Nat Methods*. 2017; 14(4):417-419. doi:10.1038/nmeth.4197), as well as a machine learning-based prediction (EffectorP, see Sperschneider, J., Gardiner, D. M., Dodds, P. N., Tini, F., Covarelli, L., Singh, K. B., Manners, J. M. and Taylor, J. M. (2016), EffectorP: predicting fungal effector proteins from secretomes using machine learning. New Phytol, 210: 743-761. doi:10.1111/nph.13794). The putative effectors identified in FIG. 3 are used for the subsequent screening.

Example 2. Generate Effector Over-Expression Vectors

The signal peptide sequence was predicted for each putative *Puccinia polysora* effector and trimmed off the sequence. The effector sequences are optimized for expression in maize, based on codon usage preference and GC content. The maize codon-optimized sequences are then synthesized and cloned into vectors containing two expression cassettes, one containing the effector sequence and another containing the luciferase reporter gene. Both the effector and luciferase are under the control of strong constitutive promoters.

Example 3. Identify and Confirm Effectors Recognized Disease Resistance Genes

A protoplast-based system is used to screen for effectors which can cause rapid protoplast death (indicated by a significant reduction in luciferase activity, presumably caused by HR).

Maize seeds are sown and watered in flats of a propagation mix and allowed to germinate under light for four to six days at 26° C. After shoots emerged, flats are transferred to dark for four to six days. Plants are ready for protoplast isolation after the second leaf is about 10-15 cm above the first leaf.

For each plant, the green tip of the second leaf (about 1-2 cm) is removed. The next 6-8 cm of the leaf blade is collected. A stack 10-15 leaves is cut (with a new, clean razor blade) into 0.5 mm stripes without bruising or wounding the leaves. The leaf strips are immediately submerged into a digestion solution. The leaves are vacuum infiltrated in the digestion solution for 30 minutes at room temperature (RT). The digestion is continued without vacuum for two hours with gentle shaking (40 RPM) on a platform shaker. The shaking is increased to 60 RPM for 10 minutes to release the protoplasts into the solution.

The digestion solution containing protoplasts is filtered through a nylon mesh (40 μm), and washed with mannitol solution. The solution is then centrifuged at 70×g for 3 minutes to pellet the protoplasts, and remove as much of the supernatant as possible. The protoplasts are washed with mannitol solution and centrifuged two more times. After the last wash, the protoplasts are resuspended in a small amount of MMg solution (5-10 mL). Sample yield is calculated using a hemocytometer or an automated cell counter.

20 uL of plasmid DNA is added to 200 uL protoplast solution and mixed gently, then added 220 ul of PEG solution. The mixture is incubated at room temperature for about 15 minutes. The PEG reaction is diluted with 1 mL of WI solution, and mixed and stop the transfection. The mixture is centrifuged at 100×g for two minutes and the supernatant is removed. The protoplasts are resuspended and incubated overnight.

After 16 and 40 hours of incubation, protoplasts are resuspended in solution by inverting the microfuge tube or by gentle pipetting. 50 μl of PROMEGA Steady-Glo are added to 50 μl of protoplast solution and allowed to mix for at least 5 minutes. Luciferase luminescence is quantified using the Steady-Glo program on a 1 PROMEGA GloMax Explorer microplate reader.

Each effector construct is introduced into protoplasts from Inbred A. One of the putative effectors tested, Effector 32 (SEQ ID NO: 2), was identified and confirmed to induce cell death in Inbred A, which contains the SCR resistance gene NLR03 (SEQ ID NO: 9). Effector 32 also induced cell death in CML496. When protoplasts from a susceptible line were co-transfected with both NLR03 and Effector 32, a similar cell death was observed. NLR03 recognized Effector 32 in both Inbred A and CML496, which triggers a hypersensitive response ("HR") and results in a cell death resistance response (See Tables 1 and 2).

TABLE 1

Effector 32 triggers HR in Inbred A protoplasts

| Maize Genotype | Genes | Average luciferase reads |
|---|---|---|
| Inbred A | AvrSr35 | 1,385,777.78 |
| Inbred A | AvrSr35 + Sr35 | 10,763.89 |
| Inbred A | GFP | 2,506,000.00 |
| Inbred A | SCR Effector32 | 64,527.78 |

TABLE 2

Effector 32 triggers HR in CML496 protoplasts

| Maize Genotype | Genes | Average luciferase reads |
|---|---|---|
| CML496 | AvrSr35 | 1,397,666.67 |
| CML496 | AvrSr35 + Sr35 | 10,315.78 |
| CML496 | GFP | 2,171,111.11 |
| CML496 | SCR Effector32 | 96,004.44 |

Example 4. Confirm Recognition and Interaction of Between *Puccinia polysora* Effector 32 and NLR03

Recognition of pathogen effectors by R proteins leads to effector-triggered immunity (ETI), often culminating in a HR cell death accompanied with ROS production (Jones and Dangl, 2006). *Agrobacterium*-mediated transient expression in tobacco plant (Li, 2011) was used to confirm the recognition of Effector 32 by NLR03. Effector 32 and NLR03 were cloned into a binary vector and introduced into *Agrobacterium tumefaciens*. Sr35 and AvrSr35 were used as the positive control. HR cell death (visual) and accumulated $H_2O_2$ (DAB staining) were observed when Effector 32 and NLR03 were co-expressed in *N. benthamiana*. Further co-immunoprecipitation (Co-IP) and yeast two hybrid (Y2H) were performed to check the physical interaction between Effector 32 and NLR03. The binding of Effector 32 and NLR03 was detected in Co-IP assay but not in Y2H, indicating Effector 32 directly interacts with NLR03 in planta, and the interaction may require other proteins.

TABLE 3

| Co-transfection of NLR3 and Effector 32 triggers HR in PHR03 protoplasts | | |
|---|---|---|
| Maize Genotype | Genes | Average luciferase reads |
| PHR03 | AvrSr35 | 3,277,555.56 |
| PHR03 | AvrSr35 + Sr35 | 97,661.11 |
| PHR03 | GFP + NLR3 | 3,715,111.11 |
| HC69 | SCR Effector 32 | 6,104,444.44 |
| PHR03 | SCR Effector32 + NLR3 | 154,711.11 |

Example 5. Allele-Specific Recognition of Effector 32 by NLR03

Ninety-two samples from *Puccinia polysora*-infected maize leaves were collected from multiple locations in China and the US. Effector 32 was PCR amplified and re-sequenced from the samples. After trimming away the signal peptide, a total of 15 distinct Effector 32 alleles were identified. Each of the Effector 32 allele was transfected alone or co-transfected with NLR03 into the Susceptible line protoplasts. Eight of the Effector 32 alleles reduce the luciferase activity by greater than 90%, while three of the alleles cause a less than 60% reduction (Table 4). The results suggest that while NLR03 can trigger different levels of HR by different Effector 32 alleles, and NLR03 may confer different level of resistance to isolates containing different Effector 32 alleles. The different intensity of immune responses caused by different Effector 32 alleles has been confirmed in *N. benthamiana* with selected Effector 32 alleles. Surveying effector alleles and allele frequency in a particular pathogen population would predict if a specific resistance gene is efficacious in providing resistance.

TABLE 4

| Effector 32 allele activity | | |
|---|---|---|
| Effector alleles | Protein sequence (without Signal Peptide) | 40 hour CML496 reduction % |
| Effector32-OR | SEQ ID NO: 4 | 95 |
| Effector32-A | SEQ ID NO: 10 | 92 |
| Effector32-C | SEQ ID NO: 11 | 93 |
| Effector32-E | SEQ ID NO: 12 | 98 |
| Effector32-F | SEQ ID NO: 13 | 91 |
| Effector32-G | SEQ ID NO: 14 | 22 |
| Effector32-J | SEQ ID NO: 15 | 93 |
| Effector32-M | SEQ ID NO: 16 | 82 |
| Effector32-N | SEQ ID NO: 17 | 55 |
| Effector32-O | SEQ ID NO: 18 | 58 |
| Effector32-Q | SEQ ID NO: 19 | 85 |
| Effector32-R | SEQ ID NO: 20 | 86 |
| Effector32-V | SEQ ID NO: 21 | 97 |
| Effector32-W | SEQ ID NO: 22 | 98 |
| Effector32-X | SEQ ID NO: 23 | 72 |

Example 6. Use Effector 32 to Characterize SCR Resistance Donors

Effector 32 was transfected into protoplasts from 30 SCR resistance maize inbred lines. Effector 32 triggered HR in 6 inbred lines, in addition to Inbred A and CML496, suggesting that these 6 lines contain the same or similar resistance genes which can recognize Effector 32, and the mechanism of resistance is similar among these lines. Effectors may be used to characterize diverse resistance donors and understand their mechanisms of resistance.

RNA-seq data from CML415 indicate that CML415 has a NLR (SEQ ID NO: 9, cDNA SEQ ID NO: 8) with 99.2% identity to NLR03 (SEQ ID NO: 7), cDNA SEQ ID NO: 6). Co-expressing the CML415 NLR gene and Effector 32 in maize protoplasts caused protoplast death, indicating the CML415 NLR gene can recognize Effector 32 and confer resistance to SCR.

Example 7. *Agrobacterium*-Mediated Transformation of Maize and Regeneration of Transgenic Plants For *Agrobacterium*-mediated transformation of maize with an identified R gene sequence of the disclosure, the method of Zhao is employed (U.S. Pat. No. 5,981,840, and PCT patent publication WO98/32326; the contents of which are hereby incorporated by reference). Briefly, immature embryos are isolated from maize and the embryos contacted with a suspension of *Agrobacterium* under conditions whereby the bacteria are capable of transferring the regulatory element sequence of the disclosure to at least one cell of at least one of the immature embryos (step 1: the infection step). In this step the immature embryos are immersed in an *Agrobacterium* suspension for the initiation of inoculation. The embryos are co-cultured for a time with the *Agrobac-* terium (step 2: the co-cultivation step). The immature embryos are cultured on solid medium following the infection step. Following the co-cultivation period an optional "resting" step is performed. In this resting step, the embryos are incubated in the presence of at least one antibiotic known to inhibit the growth of *Agrobacterium* without the addition of a selective agent for plant transformants (step 3: resting step). Next, inoculated embryos are cultured on medium containing a selective agent and growing transformed calli are recovered (step 4: the selection step). Plantlets are regenerated from the calli (step 5: the regeneration step) prior to transfer to the greenhouse.

Example 8. Editing R Genes

Target Site Selection

The gRNA/Cas9 Site directed nuclease system, described in WO2015026885, WO20158026887, WO2015026883, and WO2015026886 (each incorporated herein by reference), is to edit the R gene by replacing a native allele with a resistant allele. Pairs of target sites are used for removing the entire R allele from the target line, including the predicated promoter, the coding sequence, and 1 kb of 3' UTR. The DNA repair template is co-delivered with Cas9 and guide RNA plasmids.

Cas9 Vector Construction

A Cas9 gene from *Streptococcus pyogenes* M1 GAS (SF370) is maize codon optimized per standard techniques known in the art, and the potato ST-LS1 intron is introduced in order to eliminate its expression in *E. coli* and *Agrobacterium*. To facilitate nuclear localization of the Cas9 protein in maize cells, the Simian virus 40 (SV40) monopartite amino terminal nuclear localization signal is incorporated at the amino terminus of the Cas9 open reading frame. The maize optimized Cas9 gene is operably linked to a maize Ubiquitin promoter using standard molecular biological techniques. In addition to the amino terminal nuclear localization signal SV40, a C-terminal bipartitite nuclear localization signal from *Agrobacterium tumefaciens* VirD2 endonuclease was fused at the end of exon 2. The resulting sequence includes the *Zea mays* ubiquitin promoter, the 5' UTR of the ZM-ubiquitin gene, intron 1 of the ZM-ubiquitin gene, the SV40 nuclear localization signal, Cas9 exon 1 (ST1), the potato-LS1 intron, Cas9 exon 2 (ST1), the VirD2 endonuclease nuclear localization signal, and the pinII terminator.

Guide RNA Vector Construction

To direct Cas9 nuclease to the designated genomic target sites, a maize U6 polymerase III promoter (see WO2015026885, WO20158026887, WO2015026883, and WO2015026886) and its cognate U6 polymerase III termination sequences (TTTTTTTT) are used to direct initiation and termination of gRNA expression. Guide RNA variable targeting domains for R gene editing are identified, which correspond to the genomic target sites. Oligos containing the DNA encoding each of the variable nucleotide targeting domains are synthesized and cloned into a gRNA expression cassette. Each guide RNA expression cassette consists of the U6 polymerase III maize promoter operably linked to one of the DNA versions of the guide RNA followed by the cognate U6 polymerase III termination sequence. The DNA version of the guide RNA consists of the respective nucleotide variable targeting domain followed by a polynucleotide sequence capable of interacting with the double strand break inducing endonuclease.

Repair Template Vector Construction

The substitution/replacement template for CR6/CR9 contains the resistant allele of the R gene, and the substitution template contains the same resistant allele of the R gene and the homology sequences flanking the 5' and 3' in the target line. The homology arm sequences are synthesized and then cloned with substitutive R gene genomic sequences via a standard seamlessness Gibson cloning method.

Delivery of the Guide RNA/Cas9 Endonuclease System DNA to Maize

Plasmids containing the Cas9 and guide RNA expression cassettes described above are co-bombarded with plasmids containing the transformation selectable marker NPTII and the transformation enhancing developmental genes ODP2 (AP2 domain transcription factor ODP2 (Ovule development protein 2)) and Wuschel (20151030-6752 USPSP) into elite maize lines' genomes. Transformation of maize immature embryos may be performed using any method known in the art or the method described below.

In one transformation method, ears are husked and surface sterilized in 30-50% Clorox bleach plus 0.5% Micro detergent for 10 minutes and then rinsed two times with sterile water. The immature embryos are isolated and placed embryo axis side down (scutellum side up), with 25 embryos per plate, on 13224E medium for 2-4 hours and then aligned within the 2.5-cm target zone in preparation for bombardment.

DNA of plasmids is adhered to 0.6 µm (average diameter) gold pellets using a proprietary lipid-polymer mixture of TransIT®-2020 (Cat #MIR 5404, Minis Bio LLC, Madison, WI 5371). A DNA solution was prepared using 1 µg of plasmid DNA and optionally, other constructs were prepared for co-bombardment using 10 ng (0.5 µl) of each plasmid. To the pre-mixed DNA, 50 µl of prepared gold particles (30 mg/ml) and 1 µl TransIT®-2020 are added and mixed carefully. The final mixture is allowed to incubate under constant vortexing at low speed for 10 minutes. After the precipitation period, the tubes are centrifuged briefly, and liquid is removed. Gold particles are pelleted in a microfuge at 10,000 rpm for 1 min, and aqueous supernatant is removed. 120 µl of 100% EtOH is added, and the particles are resuspended by brief sonication. Then, 10 µl is spotted on to the center of each macrocarrier and allowed to dry about 2 minutes before bombardment, with a total often aliquots taken from each tube of prepared particles/DNA.

The sample plates are bombarded with a Biolistic PDA-1000/He (BIO-RAD). Embryos are 6 cm from the macrocarrier, with a gap of ⅛th of an inch between the 200 psi rupture disc and the macrocarrier. All samples receive a single shot.

Following bombardment, the embryos are incubated on the bombardment plate for ~20 hours then transferred to 13266L (rest/induction medium) for 7-9 days at temperatures ranging from 26-30° C. Embryos are then transferred to the maturation media 289H for ~21 days. Mature somatic embryos are then transferred to germination media 272G and moved to the light. In about 1 to 2 weeks plantlets containing viable shoots and roots are sampled for analysis and sent to the greenhouse where they are transferred to flats (equivalent to a 2.5" pot) containing potting soil. After 1-2 weeks, the plants are transferred to Classic 600 pots (1.6 gallon) and grown to maturity.

Media:

Bombardment medium (13224E) comprises 4.0 g/l N6 basal salts (SIGMA C-1416), 1.0 ml/l Eriksson's Vitamin Mix (1000×SIGMA-1511), 0.5 mg/l thiamine HCl, 190.0 g/l sucrose, 1.0 mg/l 2,4-D, and 2.88 g/l L-proline (brought to volume with D-I H2O following adjustment to pH 5.8 with KOH); 6.3 g/l Sigma agar (added after bringing to volume with D-I H2O); and 8.5 mg/l silver nitrate (added after sterilizing the medium and cooling to room temperature).

Selection medium (13266L) comprises 1650 mg/l ammonium Nitrate, 277.8 mg/l ammonium Sulfate, 5278 mg/l potassium nitrate, calcium chloride, anhydrous 407.4 mg/l calcium chloride, anhydrous, 234.92 mg/l magnesium sulfate, anhydrous, 410 mg/l potassium phosphate, monobasic, 8 mg/l boric acid, 8.6 mg/l, zinc sulfate·7h2o, 1.28 mg/l potassium iodide, 44.54 mg/l ferrous sulfate·7h2o, 59.46 mg/l na2edta·2h2o, 0.025 mg/l cobalt chloride·6h2o, 0.4 mg/l molybdic acid (sodium salt)·2h2o, 0.025 mg/l cupric sulfate·5h2o, 6 mg/l manganese sulfate monohydrate, 2 mg/l thiamine, 0.6 ml/l b5h minor salts 1000×, 0.4 ml/l eriksson's vitamins 1000×, 6 ml/l s&h vitamin stock 100×, 1.98 g/l 1-proline, 3.4 mg/l silver nitrate, 0.3 g/l casein hydrolysate (acid), 20 g/l sucrose, 0.6 g/l glucose, 0.8 mg/l 2.4-d, 1.2 mg/l dicamba, 6 g/l tc agar, 100 mg/l agribio carbenicillin, 25 mg/l cefotaxime, and 150 mg/l geneticin (g418)

Plant regeneration medium (289H) comprises 4.3 g/l MS salts (GIBCO 11117-074), 5.0 ml/l MS vitamins stock solution (0.100 g nicotinic acid, 0.02 g/l thiamine HCL, 0.10 g/l pyridoxine HCL, and 0.40 g/l glycine brought to volume with polished D-I H$_2$O) (Murashige and Skoog (1962) Physiol. Plant. 15:473), 100 mg/l myo-inositol, 0.5 mg/l zeatin, 60 g/l sucrose, and 1.0 ml/l of 0.1 mM abscisic acid (brought to volume with polished D-I H$_2$O after adjusting to pH 5.6); 8.0 g/l Sigma agar (added after bringing to volume with D-I H2O); and 1.0 mg/l indoleacetic acid and 150 mg/l Geneticin (G418) (added after sterilizing the medium and cooling to 60° C.).

Hormone-free medium (272G) comprises 4.3 g/l MS salts (GIBCO 11117-074), 5.0 ml/l MS vitamins stock solution (0.100 g/l nicotinic acid, 0.02 g/l thiamine HCL, 0.10 g/l pyridoxine HCL, and 0.40 g/l glycine brought to volume with polished D-I H2O), 0.1 g/l myo-inositol, and 40.0 g/l sucrose (brought to volume with polished D-I H2O after adjusting pH to 5.6); and 0.5 mg/l IBA and 150 mg/l Geneticin (G418) and 6 g/l bacto-agar (added after bringing to volume with polished D-I H2O), sterilized and cooled to 60° C.

Screening of T0 Plants and Event Characterization

To identify swap positive events, PCR is performed using Sigma Extract-N-Amp PCR ready mix. PCR is performed to assay the 5' junction using a primer pair of the R gene, while primary PCR with a primer pair was combined with secondary allele differentiation qPCR to screen the 3' junction due to high homology of the intended edited variants and the unmodified genomic sequence.

T1 Analysis

The allele swap variants are transferred to a controlled environment. Pollen from T0 plants is carried to recurrent parent plants to produce seed. T1 plants are put through more comprehensive molecular characterization to not only confirm that swaps observed in T0 plant are stably inherited but also to verify that the T1 or later generation plants are free from any foreign DNA elements used during the transformation process. First, qPCR is performed on all helper genes including Cas9, the guide RNAs, the transformation selection marker (NPTII), and the transformation enhancing genes ODP2 and WUS2 to make sure the genes segregated away from the generated mutant alleles. The T1 plants are sampled using Southern by Sequencing (SbS) analysis to further demonstrate that the plants are free of any foreign DNA.

Example 9. Screening of Plants for Disease Resistance

Gray Leaf Spot

The plants are inoculated with *Cercospora zeae-maydis* in the greenhouse and/or field. Disease scoring is done by rating plants on a 1-9 scale with 1 as the worst and 9 as the best. Check inbreds and/or hybrids with known disease response are used as a guide for the best time to score and for rating calibration. Flowering data is also taken by noting the date on which 50% of each plant showed silks and converting this to a growing degree heat unit score (GDUSLK) based upon weather data at that location.

Anthracnose Stalk Rot

The plants are grown and evaluated for response to Cg (*Colletotrichum graminicola*). Plants evaluated for resistance to Cg in the greenhouse and/or by inoculating with Cg. Late in the growing stage, the stalks are split and the progression of the disease is scored by observation of the characteristic black color of the fungus as it grows up the stalk. Disease ratings are conducted as described by Jung et al. (1994) *Theoretical and Applied Genetics*, 89:413-418). The total number of internodes discolored greater than 75% (antgr75) are recorded on the first five internodes (See FIG. 20). This provided a disease score ranging from 0 to 5, with zero indicating no internodes more than 75% discolored and 5 indicating complete discoloration of the first five internodes. The center two plots are harvested via combine at physiological maturity and grain yield in kg/ha was determined.

Northern Leaf Blight

Plants are tested in greenhouse and/or field experiments for efficacy against the northern leaf blight pathogen (*Exserohilum turcicum*). Plants are challenged with the pathogen for which the R genes are thought to provide resistance. Plants are scored as resistant or susceptible based on disease symptoms; in the field, plants will be scored on a 1-9 scale where 9 is very resistant and 1 is very susceptible.

Head Smut

The sori containing teliospores of *S. reliana* are collected from the field in the previous growing season and stored in cloth bag in a dry and well ventilated environment. Before planting, spores are removed from the sori, filtered, and then mixed with soil at a ratio of 1:1000. The mixture of soil and teliospores are used to cover maize kernels when sowing seeds to conduct artificial inoculation. Plants at maturity stage are scored for the presence/absence of sorus in either ear or tassels as an indicator for susceptibility/resistance.

Example 10. Identification and Confirmation of Putative *Exserohilum turcicum* Effectors Recognized by PH26N_NLB18

For *E. turcicum* effector discovery, RNA-seq from leaves infected with *E. turcicum* were mapped against its genome. The same criteria as described above in Example 1 was employed to discover effectors based on the gene models obtained. Computational genomics was then employed to identify putative effectors that were present in *E. turcicum* race 0 and race 1, which can be controlled by PH26N_NLB18 (a previously identified NLB resistance gene, see US Application Publication Number 2015-0376644 A1, herein incorporated by reference), but were either absent or contained non-synonymous mutations in race23N, which cannot be controlled by PH26N_NLB18. Four effectors were selected from the comparative analysis for further screening and validation.

The *Agrobacterium*-mediated transient expression system in *Nicotiana benthamiana* was used to screen for effectors which can trigger rapid cell death (HR) when co-expressed with PH26N_NLB18. The coding sequences PH26N_NLB18 and four putative effectors (NLB_031, 032, 033, 034) were synthesized and cloned into a binary vector, under the control of the soy Ubi promoter. The resulting constructs were introduced into *A. tumefaciens* strain AGL1 by electroporation (Hellens et al., 2000) and transformants were selected with kanamycin (50 mg/mL). For the infiltration, recombinant strains of *A. tumefaciens* were prepared and infiltrated into tobacco leaves as describe by Yang et al. (2000). Symptoms were scored daily, and pictures were taken 2-3 days after infiltration.

HR cell death (visual) and accumulated $H_2O_2$ (DAB staining) were only observed when PH26N_NLB18 and NLB_034 (SEQ ID NO: 1623) were co-expressed in *N. benthamiana*. Further co-immunoprecipitation (Co-IP) and yeast two hybrid (Y2H) were performed to examine the physical interaction between PH26N_NLB18 and NLB_034. The interaction between PH26N_NLB18 and NLB_034 was confirmed by both Co-IP assay and Y2H, indicating PH26N_NLB18 was able to recognize and directly interact with NLB_034 in planta to initiate immune responses.

Example 12. Allele-Specific Recognition of *E. turcicum* Effector NLB_034 by PH26N_NLB18

After trimming away the signal peptide, 3 distinct NLB_034 alleles, NLB_034A (the original allele), NLB_034B and NLB_034C, were identified from *E. turcicum* Races 0, 1 and 23N. Each of the NLB_034 alleles was co-expressed with PH26N_NLB18 in *N. benthamiana* leaves for cell death observation. While both NLB_034A and NLB_034B alleles could be recognized by PH26N_NLB18, the NLB_034C allele couldn't trigger HR cell death when co-expressed with PH26N_NLB18. Also, NLB_034C didn't interact with PH26N_NLB18 in both Co-IP and Y2H assays. The allele-specific recognition implies race-specific resistance by PH26N_NLB18. Table 5 shows the sequences identified as effectors.

TABLE 5

| NLB Effector Sequences | |
|---|---|
| SEQ ID NO: | Sequence Description |
| 1620 | NLB_034A CDS |
| 1621 | NLB_034B CDS |
| 1622 | NLB_034C CDS |
| 1623 | NLB_034A Genomic |
| 1624 | NLB_034B Genomic |
| 1625 | NLB_034C Genomic |

TABLE 5-continued

| NLB Effector Sequences | |
|---|---|
| SEQ ID NO: | Sequence Description |
| 1626 | NLB_034A Protein |
| 1627 | NLB_034B Protein |
| 1628 | NLB_034C Protein |

Example 13. Identification and Confirmation of Putative Effectors in *Colletotrichum graminicola*

The same effector discovery methods were employed to discover *C. graminicola* effectors, utilizing RNA-seq reads from maize leaves infected with *C. graminicola* mapped against its genome to obtain gene models. After employing the same computational criteria as described above (see Example 1), the top 178 effectors utilized for subsequent screening.

A pair of NLRs from maize, Rcg and Rcg1b, were previously identified to mediate resistance to the fungal pathogen *C. graminicola* (US Application Publication Number 2018-0112280 A1). Since Rcg1b contain an integrated domain (ID), it was hypothesized that the ID recognizes effector protein(s) via direct interaction. The Rcg1b ID was used as a bait to screen the 178 predicted effectors via Y2H. The coding sequence of the Rcg1b ID and the 178 putative effectors (ANTROT_1-178) were synthesized and cloned into yeast vectors (AD/BD). Paired AD and BD constructs were transformed into the yeast strain Y2HGold. Co-transformants were plated on both synthetic double dropouts medium (DDO) and triple dropouts medium (TDO) supplemented with X-a-Gal and Aureobasidin A. Interaction was considered relevant when diploid yeasts were able to grow on both DDO and TDO plates with blue color, while corresponding controls (AD or BD empty vectors) could not. Rcg1b ID showed direct binding with two candidate effectors (ANTROT_70 and ANTROT_94).

To validate the two candidates in planta, the coding sequences of Rcg1, Rcg1b, ANTROT_70 and ANTROT_94 were transferred into a binary vector and introduced into *A. tumefaciens* for co-infiltration assay in *N. benthamiana*. Co-expression of Rcg1b with ANTROT_70 was able to induce the cell death phenotype in 30-50% infiltrated tobacco leaves, while Rcg1 was unable to recognize ANTROT_70 to cause cell death. However, co-expression of Rcg1b, ANTROT_70 and Rcg1 enhances the ability of Rcg1B to recognize ANTROT_070 in *N. benthamiana*, with 60-70% of the infiltrated leaves showing the cell death phenotype. Co-IP assay reveals that Rcg1b physically interacts with both Rcg1 and ANTROT_70 while Rcg1 does not interact with ANTROT_70. These results suggest Rcg1b and ANTROT_70 directly interact with each other, while Rcg1 enhances the immune responses elicited by the Rcg1b/ANTROT_70 interaction.

TABLE 6

| ANTROT Effector Sequences | |
|---|---|
| SEQ ID NO: | Sequence Description |
| 1629 | ANTROT_70_GENOMIC |
| 1630 | ANTROT_70 CDS |
| 1631 | ANTROT_70 Protein |

SEQUENCE LISTING

The patent contains a lengthy sequence listing. A copy of the sequence listing is available in electronic form from the USPTO web site (https://seqdata.uspto.gov/docdetail?docId=US12467061B2). An electronic copy of the sequence listing will also be available from the USPTO upon request and payment of the fee set forth in 37 CFR 1.19(b)(3).

What is claimed:

1. A method of validating the presence of a gene that confers resistance to disease caused by *Puccinia polysora*, the method comprising:
   a. identifying at least one potential gene or disease resistance locus in a maize plant that confers resistance to disease caused by *Puccinia polysora*;
   b. transfecting at least one allele of a plant pathogen effector gene and a luciferase gene into a maize protoplast, wherein the maize protoplast is derived from the disease resistant plant, and wherein the pathogen effector gene encodes a polypeptide comprising an amino acid sequence of at least 95% sequence identity, when compared to any one of SEQ ID NOs: 12, 2, 4, 10, 11, and 13-23;
   c. expressing the at least one allele of a plant pathogen effector gene and the luciferase gene before measuring luciferase activity; and
   d. validating the presence of a gene in the protoplast that produces a hypersensitive response in the presence of the plant pathogen effector as indicated by reduced luciferase activity in the protoplast relative to a control protoplast which is transfected with the luciferase gene and which is not transfected with the at least one allele of a plant pathogen effector.

2. The method of claim 1, wherein the plant pathogen effector gene has been validated as a plant pathogen effector for the disease correlated with the disease resistance loci.

* * * * *